United States Patent
Watabe

(10) Patent No.: US 7,154,825 B2
(45) Date of Patent: Dec. 26, 2006

(54) OPTICAL RECORDING/REPRODUCING APPARATUS WITH APC AND ACC PROCESSES

(75) Inventor: Teruyasu Watabe, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 11/116,180

(22) Filed: Apr. 28, 2005

(65) Prior Publication Data

US 2005/0185546 A1 Aug. 25, 2005

Related U.S. Application Data

(63) Continuation-in-part of application No. 09/851,082, filed on May 9, 2001, which is a continuation-in-part of application No. 09/621,542, filed on Jul. 21, 2000, now abandoned.

(30) Foreign Application Priority Data

| Jul. 23, 1999 | (JP) | ................... | 11-208723 |
| Aug. 11, 1999 | (JP) | ................... | 11-227922 |
| May 12, 2000 | (JP) | ................... | 2000-139531 |
| Jul. 24, 2000 | (JP) | ................... | 2000-222428 |

(51) Int. Cl.
G11B 7/006 (2006.01)

(52) U.S. Cl. ................................. 369/47.51

(58) Field of Classification Search ............ 369/47.55, 369/47.51; G11B 7/0006, 7/006
See application file for complete search history.

(56) References Cited

U.S. PATENT DOCUMENTS

| 5,629,913 A | 5/1997 | Kaku et al. |
| 6,236,635 B1 | 5/2001 | Miyamoto et al. |
| 6,392,970 B1 * | 5/2002 | Fuji et al. ................... 369/47.5 |
| 6,404,713 B1 | 6/2002 | Ueki |
| 6,407,976 B1 | 6/2002 | Nagara et al. |
| 6,445,659 B1 | 9/2002 | Toda et al. |

FOREIGN PATENT DOCUMENTS

| JP | 09-171631 | 6/1997 |
| JP | 11-066594 | 3/1999 |
| JP | 11-096576 | 4/1999 |
| JP | 11-185275 | 7/1999 |

* cited by examiner

*Primary Examiner*—Aristotelis Psitos
(74) *Attorney, Agent, or Firm*—Dickstein Shapiro LLP

(57) ABSTRACT

In an optical recording/reproducing apparatus of the present invention, a semiconductor laser driver supplies a selected one of a plurality of drive currents, including at least a first-level drive current and a second-level drive current, to a semiconductor laser to control the emission of a laser beam by the laser. A current driver selectively outputs one of a plurality of increment currents to the laser driver in response to control signals, the plurality of increment currents including a first increment current supplied to the laser driver during an automatic power control process and a second increment current supplied to the laser driver during a special power setting process. A detection unit detects a first power sample signal, at a first sampling point of a laser driving current waveform, from the laser beam emitted when the first increment current is supplied to the laser driver, and detects a second power sample signal, at a second sampling point of the waveform, from the laser beam emitted when the second increment current is supplied to the laser driver. A calculation unit calculates a derivative efficiency of the laser based on the first and second power sample signals detected by the detection unit, so that the drive currents of the laser driver, supplied to the laser, are controlled based on the calculated derivative efficiency.

15 Claims, 38 Drawing Sheets

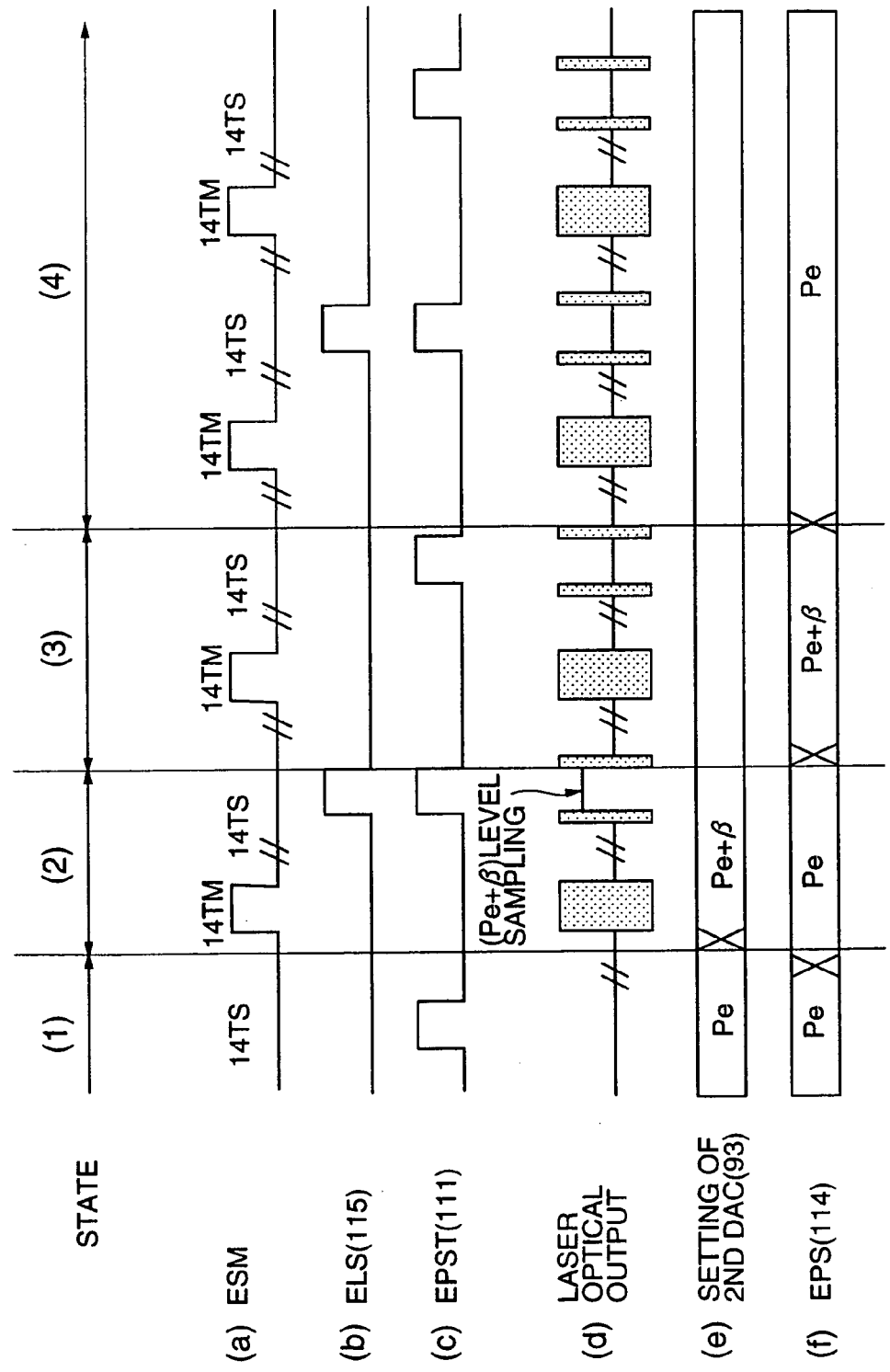

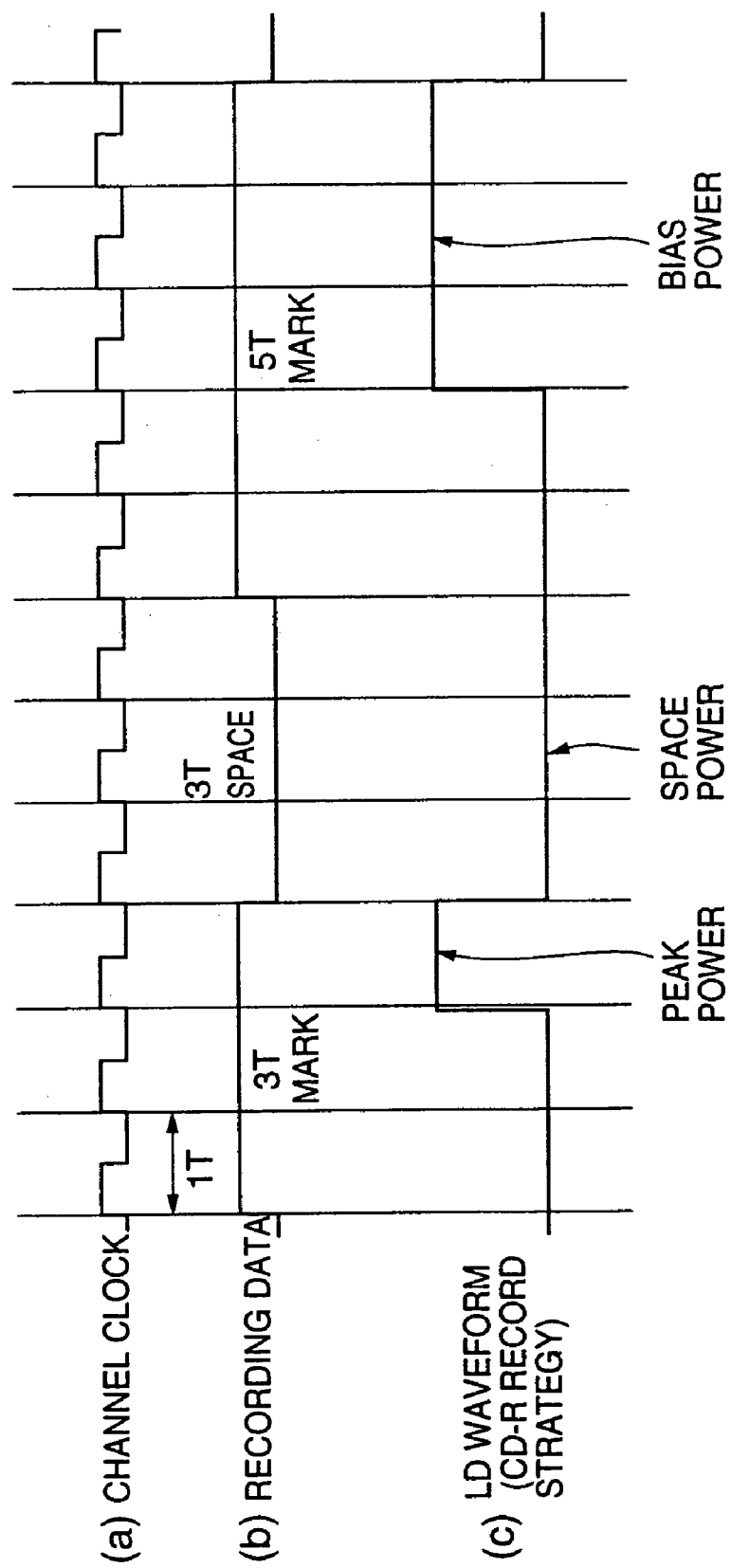

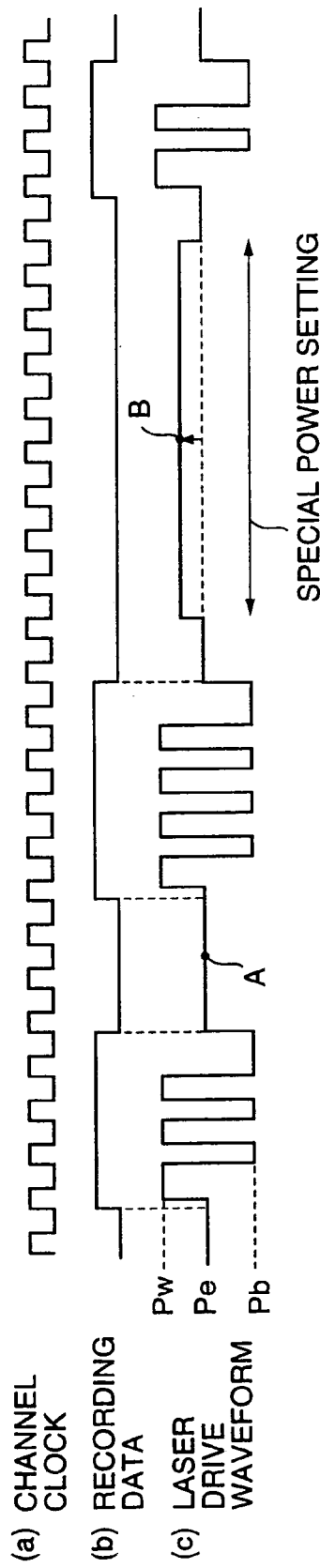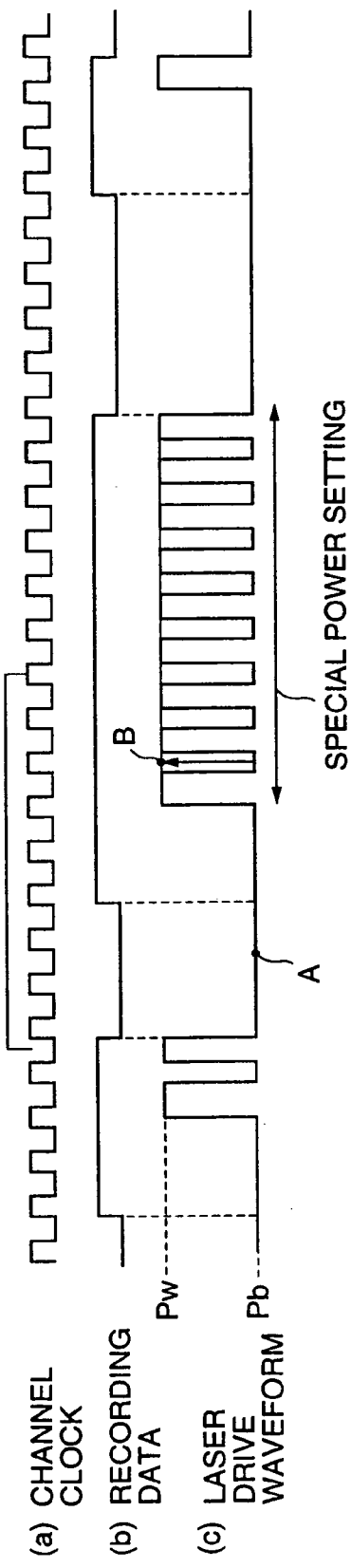

OPTICAL RECORDING/REPRODUCING APPARATUS WITH APC AND ACC PROCESSES

This is a division of U.S. patent application Ser. No. 09/851,082, filed May 9, 2001, which is a continuation-in-part of U.S. patent application Ser. No. 09/621,542, filed Jul. 21, 2000, now abandoned the entire disclosures of which are incorporated herein by reference.

BACKGROUND OF THE INVENTION

1. Field of the Invention

The present invention relates to an optical recording/reproducing apparatus which records information onto or reproduces information from a recording medium, such as an optical disk, by focusing a laser beam emitted by a semiconductor laser, on a recording layer of the recording medium.

2. Description of the Related Art

In these years, there are various optical read-only recording media, such as CD (compact disk), CD-ROM (compact disk read-only memory), DVD (digital versatile disk), etc., and optical reproducing systems, or optical disk players, which reproduce information from these recording media, are put into practical use.

In addition, the read-only recording media have their rewritable equivalents, including optical write-once read-many recording media (such as CD-R), magneto-optical recording media (such as MO), and phase-change recording media (such as DVD-rewritable). The special attention is given to the phase-change recording media (typically, DVD-rewritable disks) as mass-storage recording media in the next generation, and optical recording/reproducing systems, or optical disk drives, which record data onto and reproduce data from the phase-change media are proceeding towards practical applications.

The phase-change recording media utilize a process called the phase change technology to write and erase data. In this process, data is written to the phase-change recording disk by focusing a high-intensity laser beam on a recording layer of a phase-change material embedded in the substrate of the disk. In its original state of the phase-change material, the recording layer has a crystalline structure. The laser beam selectively heats areas of the surface portion of the disk to a high temperature. Where the beam strikes, the heat melts the crystals to a non-crystalline, or amorphous phase. These areas reflect less light than the unchanged area surrounding them.

When a weaker laser beam, used to read data from the disk, strikes the amorphous area, the beam is scattered and not picked up by the light-sensitive diode in the read head of the disk drive. With the lower reflectance, these areas become marks, representing "1"s. Areas that are not heated are more reflective areas, representing "0"s. When the read laser beam strikes the areas, it is reflected directly to the light-sensitive diode of the read head, creating an electrical current that is sent to the controller in the disk drive. The controller interprets the pattern of electrical pulses, decodes the data that they represent, checks the data for error, and sends the data to a computer.

To erase data or to change a mark back to crystalline phase, the disk drives use a lower-energy laser beam to heat marked areas to a relatively low temperature. This amount of heat is below the melting point of the phase-change material, but it still loosens up the phase change recording media so that it can recrystallize to the original state.

Apart from the magneto-optical media, the phase-change recording media do not require the application of an external magnetic field to the recording media, and it is possible to read, write, and erase data with respect to the phase-change disk by only focusing a laser beam emitted by a laser diode (LD), onto the recording layer of the disk.

If an optical recording/reproducing apparatus uses a single-pulse laser driving waveform when recording data onto the phase-change recording medium, the heating or the cooling of the recording layer of the disk is often likely to be insufficient for the formation of non-crystalline phase or crystalline phase in the recording layer, which will produce an undesired pattern or an error caused when reproducing the recorded data from the recording medium. In order to eliminate the above problem and reliably reproduce the recorded data from the recording medium without producing the undesired pattern, the optical recording/reproducing apparatus is required to use a multi-pulse laser driving waveform when recording data onto the phase-change recording medium.

A mark portion of the multi-pulse laser driving waveform includes a head-end high-level signal portion, a plurality of subsequent high-level signal portions, and a plurality of intermediate low-level signal portions between the high-level signal portions. The head-end and subsequent high-level of the drive current correspond to a peak power "Pw" for the laser beam of the laser diode to heat the recording layer of the disk to a high temperature above the melting point of the phase-change material. The intermediate low level of the drive current corresponds to a bottom power "Pb" for the laser beam of the laser diode to cool the recording layer of the disk. Suppose that a read-process power for the laser beam of the laser diode during the reading process is represented by "Pr". The peak power "Pw", the bottom power "Pb" and the read-process power "Pr" are predetermined such that they satisfy the following conditions.

$$Pw > Pb = Pr \qquad (1)$$

A space portion of the multi-pulse laser driving waveform includes a single middle-level signal portion. The middle level of the drive current corresponds to an erase power "Pe" for the laser beam of the laser diode to erase the data in the recording layer of the disk. The erase power "Pe" is predetermined such that it satisfies the following conditions.

$$Pw > Pe > Pb \qquad (2)$$

When the optical recording/reproducing apparatus uses the above-described multi-pulse laser driving waveform when recording data onto the phase-change recording medium, it is possible to eliminate the problem of the single-pulse laser driving waveform and reliably reproduce the recorded data from the recording medium without producing the undesired pattern.

Further, when recording data onto the phase-change recording medium, the optical recording/reproducing apparatus is required to properly carry out the laser power control.

Generally, the laser diodes have the light vs. current characteristics. The light output is relatively small until the current reaches a threshold current. Thereafter the optical intensity rises approximately linearly with increasing current. For digital modulation, the current to the laser diodes switches between two levels, the 0 level current being near the threshold current and the 1 level current being higher. The problems associated with typical laser diodes are that the characteristic curve bends over at high current and tends to shift and bend to the right with increasing temperature.

A method for stabilizing the optical power of a laser diode is the automatic power control (APC). The optical recording/reproducing apparatus usually executes the APC process to stabilize the optical power of the laser diode.

When the APC process is performed, part of the laser beam emitted by the laser diode is received at a photodetector (PD), and the photodetector outputs a monitoring current the amplitude of which is proportional to the optical power of the laser beam. By utilizing the monitoring current output by the photodetector, the drive current to the laser diode is controlled in the APC process.

When the APC process is performed for the reading of the phase-change recording medium, a high-frequency current is superimposed on the drive current to the laser diode so as to reduce the noises. The drive current can be assumed as being a constant current. By providing a feedback loop having frequencies that are within a relatively low frequency range, the APC process can be performed.

When the APC process is performed for the writing of the optical recording media, the recording power of the laser diode is quickly shifted between the different levels in order for the formation of marks and spaces in the recording layer of the disk. Some corrective measures must be taken for the APC process.

For CD and DVD media, the requirement that a digital sum value (DSV) of the recording data should be set to zero is met. By providing a feedback loop with the limited bandwidth that is within a relatively low frequency range, the APC process for the writing of the recording media, which is essentially the same as the APC process for the reading of the recording media, can be performed with a simple configuration of the optical recording/reproducing apparatus. However, it is difficult to provide accurate power control for the optical power of the laser diode during the writing.

For the CD-R media, the write pulse strategy shown in FIG. 11 is used by a conventional optical recording/reproducing apparatus. The writing of the CD-R media is performed with the write pulse strategy shown in FIG. 11. When a mark or a space having a maximum length of 11T (T indicates a unit length corresponding to a period of a channel clock) is recorded on the disk, the output power of the laser diode corresponding to each of the mark and the space is sampled and held by the sample/hold circuit. Even when the speed of the disk rotation is set at the quadruple speed, the required bandwidth of the photodetector and amplifier in the light-receiving module is only several MHz. It is possible to provide accurate power control by using a configuration of the optical recording/reproducing apparatus with a relatively low cost.

For the DVD-rewritable media, it is desirable to perform the above-mentioned multi-pulse laser driving. If a sample/hold circuit is used to detect the peak power of the laser diode, the required bandwidth of the light receiving module and the subsequent processing circuits becomes very large, which will not be appropriate for practical use.

However, a sample/hold circuit may be used to detect the erase power of the laser diode when a long space data is recorded on the disk. By using this method, the detection of the erase power is possible.

Further, there is a method for controlling the bottom power or the peak power of the laser diode. In this method, in order to suitably control the bottom power or the peak power of the laser diode, a derivative efficiency of the laser diode may be initially calculated prior to the start of the recording process so that the current, derived from the calculated derivative efficiency, is added to or reduced from the bottom-level drive current used to produce the erase power, so as to obtain the peak-level drive current for the peak power of the laser diode.

The above-mentioned method is effective only when the derivative efficiency of the laser diode does not change and is maintained at a constant level. If the derivative efficiency varies, the error of the peak-level drive current obtained by using the above method will not be negligible.

As disclosed in Japanese Laid-Open Patent Application No. 9-171631, there is known an optical recording/reproducing apparatus that detects the peak-power optical output of the laser diode when it is driven at the peak-level drive current in a non-pulse condition. In the above-mentioned conventional apparatus, the peak-power laser beam when the laser diode is driven at the peak-level drive current in the non-pulse condition is detected, and the erase-power laser beam when a space is recorded on the disk is detected, and then the bottom-level drive current to the laser diode is corrected by using the detected peak power and the detected erase power. The laser diode is driven at the corrected bottom-level drive current to produce the bottom-level optical output.

Generally, it is necessary that the optical recording/reproducing apparatus always maintain the three recording power levels, including the peak power, the erase power and the bottom power for the laser diode, in order to obtain the optical waveform with good jitter characteristics when the data is reproduced from the phase-change recording medium.

However, when the above-described laser power control of the conventional apparatus is applied to the write pulse strategy for the DVD-rewritable media, there is a problem in that the formation of a mark on the recording layer of the disk when the laser diode is driven at the peak-level drive current in the non-pulse condition becomes deficient.

SUMMARY OF THE INVENTION

In order to overcome the problems described above, preferred embodiments of the present invention provide an improved optical recording/reproducing apparatus that can maintain the accurate recording power levels of the laser diode optical power, including the peak power, the erase power and the bottom power, even when the light receiving module with the limited bandwidth is used, and does not cause the deficient formation of a mark on the disk when recording data onto the disk.

According to one preferred embodiment of the present invention, an optical recording/reproducing apparatus records a sequence of data blocks onto an optical recording medium by using a laser driving current waveform to control emission of a laser beam by a semiconductor laser, and reproduces the data blocks from the medium, the waveform including a sequence of mark and space data portions each having a data length that corresponds to a multiple of a period of a channel clock based on a recording data modulation method, the optical recording/reproducing apparatus comprising: a semiconductor laser driver which supplies a selected one of a plurality of drive currents, including a first-level drive current and a second-level drive current, to the semiconductor laser to control the emission of a laser beam by the laser; a current driver which selectively outputs one of a plurality of increment currents to the laser driver in response to control signals, the plurality of increment currents including a first increment current supplied to the laser driver during an automatic power control process and a second increment current supplied to the laser driver during a special power setting process; a detection unit which detects a first power sample signal, at a first sampling point of the waveform, from the laser beam emitted when the first increment current is supplied to the laser driver, and detects a second power sample signal, at a second sampling point of the waveform, from the laser beam emitted when the second increment current is supplied to the laser driver; and a calculation unit which calculates a derivative efficiency of the laser based on the first and second power sample signals detected by the detection unit, so that the drive currents of the laser driver, supplied to the laser, are controlled based on the calculated derivative efficiency.

According to another preferred embodiment of the present invention, the above-mentioned optical recording/reproducing apparatus includes the current driver that is configured into an erase-level current driver which selectively outputs one of a plurality of erase-level increment currents to the laser driver in response to erase-level control signals, the plurality of erase-level increment currents including a first erase-level increment current supplied to the laser driver during the automatic power control process and a second erase-level increment current supplied to the laser driver during the special power setting process.

According to another preferred embodiment of the present invention, the above-mentioned optical recording/reproducing apparatus includes the current driver that is configured into a space-level current driver that selectively outputs one of a plurality of space-level increment currents to the laser driver in response to space-level control signals, the plurality of space-level increment currents including a first space-level increment current supplied to the laser driver during the automatic power control process and a second space-level increment current supplied to the laser driver during the special power setting process.

According to another preferred embodiment of the present invention, the above-mentioned optical recording/reproducing apparatus includes the current driver that is configured into a bottom-level current driver that selectively outputs one of a plurality of bottom-level increment currents to the laser driver in response to bottom-level control signals, the plurality of bottom-level increment currents including a first bottom-level increment current supplied to the laser driver during the automatic power control process and a second bottom-level increment current supplied to the laser driver during the special power setting process, the second bottom-level increment current supplied to the laser driver resulting in a drive current produced by the laser driver, which is equal to a peak-level drive current to the laser.

According to another preferred embodiment of the invention, an optical recording/reproducing apparatus records a sequence of data blocks onto an optical recording medium by using a laser driving current waveform to control emission of a laser beam by a semiconductor laser, and reproduces the data blocks from the medium, the waveform including a sequence of mark and space data portions each having a data length that corresponds to a multiple of a period of a channel clock based on a recording data modulation method, the optical recording/reproducing apparatus comprising: a semiconductor laser driver which supplies a selected one of a plurality of drive currents, including at least a bias-level drive current and a peak-level drive current, to the semiconductor laser to control the emission of a laser beam by the laser; a bias-level current driver which selectively outputs one of a plurality of bias-level drive currents to the laser driver in response to control signals, the plurality of bias-level drive currents including a first drive current supplied to the laser driver during an automatic power control APC process and a second drive current supplied to the laser driver during an automatic current control ACC process; and a control unit which selectively executes one of the APC process and the ACC process on the current driver by supplying the control signals to the current driver, the control unit outputting a sampling signal to the current driver in response to a power-monitor signal of the laser beam emitted by the laser when recording data onto the recording medium, wherein, when the control unit outputs the sampling signal within a predetermined time, the control unit continuously executes the APC process on the current driver so that the current driver supplies the first drive current to the laser driver, and when the control unit does not output the sampling signal over a period exceeding the predetermined time, the control unit terminates the execution of the APC process and starts the execution of the ACC process by using a switching unit that operates in response to the control signals supplied to the current driver, so that the current driver supplies the second drive current to the laser driver.

In the optical recording/reproducing apparatus of the present invention, the first power sample signal at the first sampling point of the waveform is detected from the laser beam emitted when the first increment current is supplied to the laser driver, and the second power sample signal at the second sampling point of the waveform is detected from the laser beam emitted when the second increment current is supplied to the laser driver. Then, the derivative efficiency of the laser is calculated based on the first and second power sample signals in accordance with predetermined equations, so that the drive currents of the laser driver, supplied to the laser, are controlled based on the calculated derivative efficiency. The optical recording/reproducing apparatus of the present invention can provide accurate calculation of the derivative efficiency with little calculation errors and prevent the deterioration of the overwriting characteristics and the deficiency of the erasing.

Further, in the optical recording/reproducing apparatus of the present invention, the drive currents supplied to the laser are controlled based on the calculated derivative efficiency in an appropriate manner. Accordingly, the optical recording/reproducing apparatus of the present invention is effective in maintaining the accurate recording power levels of the laser optical power, including the peak power, the erase or space power and the bottom power, even when the light-receiving module with the limited bandwidth is used. The optical recording/reproducing apparatus of the present invention is effective in preventing the deficient formation of a mark on the recording medium when recording data onto the disk as in the conventional apparatus.

BRIEF DESCRIPTION OF THE DRAWINGS

Other objects, features and advantages of the present invention will become apparent from the following detailed description when read in conjunction with the accompanying drawings.

FIG. 10 is a time chart for explaining exemplary waveforms of the output signals of the elements of the optical recording/reproducing apparatus of FIG. 1.

FIG. 11 is a waveform diagram for explaining a write pulse strategy used by a conventional optical recording/reproducing apparatus.

FIG. 12A and FIG. 12B are waveform diagrams for explaining the basic concepts of the optical recording/reproducing apparatus of the invention.

DETAILED DESCRIPTION OF PREFERRED EMBODIMENTS

A description will be provided of preferred embodiments of the present invention with reference to the accompanying drawings.

Figure 1:
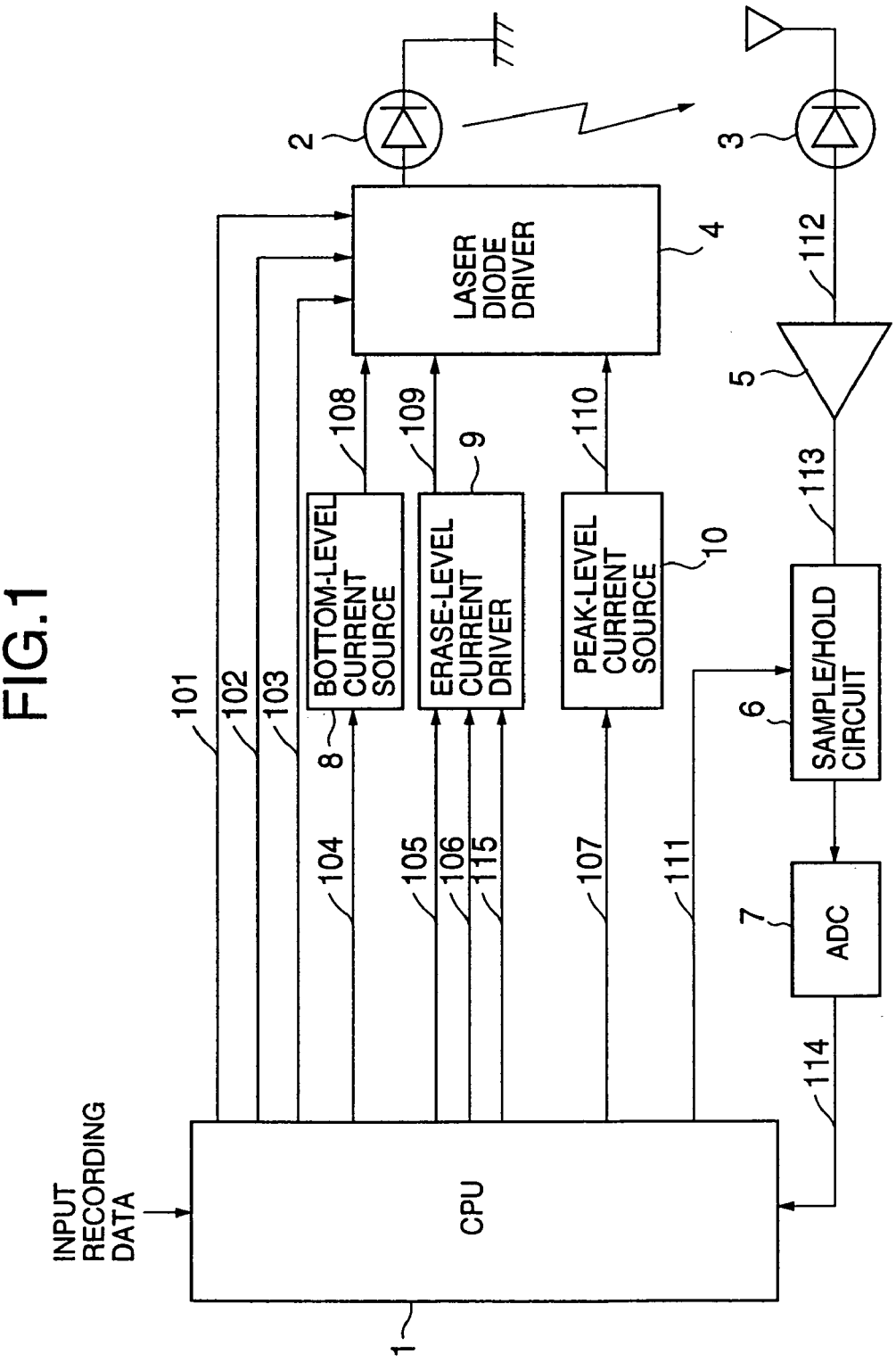
FIG. 1 is a block diagram of one preferred embodiment of the optical recording/reproducing apparatus of the invention.
Figure 3:
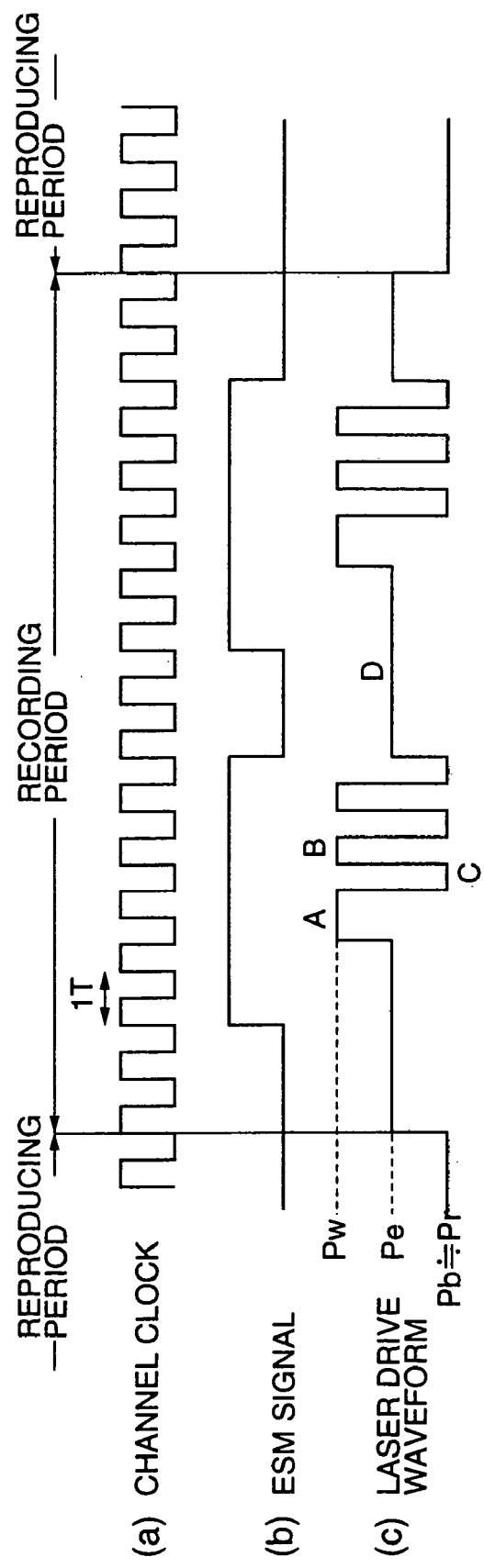
FIG. 3 is a waveform diagram for explaining a multi-pulse laser driving waveform of the optical recording/reproducing apparatus of FIG. 1 during a writing process.

FIG. 1 shows one preferred embodiment of the optical recording/reproducing apparatus of the invention. FIG. 3 shows a multi-pulse laser driving of the optical recording/reproducing apparatus of FIG. 1 during a normal writing process.

In the optical recording/reproducing apparatus of the present embodiment, DVD-format code data is recorded onto a DVD-rewritable disk (or a phase-change recording medium) by focusing a laser beam emitted by a laser diode, on the recording layer of the disk. The recorded data is reproduced from the disk by the optical recording/reproducing apparatus. The optical recording/reproducing apparatus of the present embodiment employs the eight-to-sixteen modulation (ESM) scheme as the data modulation method in order to carry out the pulse-width modulation (PWM) recording process for the DVD-rewritable disk.

In the optical recording/reproducing apparatus of FIG. 1, the multi-pulse drive current in which data is modulated is supplied to the laser light source, and the laser light source emits the laser beam to the DVD-rewritable disk. A stream of data blocks, including marks and spaces, are recorded onto the recording layer of the disk by focusing the laser beam on the recording layer of the disk. The following description deals with only the configuration and the writing process of the optical recording/reproducing apparatus of the present embodiment, and a description of the configuration and the reproducing process thereof will be omitted, for the sake of simplicity.

Generally, when recording data onto the phase-change recording media by using the multi-pulse laser driving, the optical recording/reproducing apparatus is required to maintain the accurate power levels of the laser optical power, including the peak power (Pw) corresponding to the peak-level drive current, the bottom power (Pb) corresponding to the bottom-level drive current, and the erase power (Pe) or space power corresponding to the erase-level drive current or space-level drive current.

In order to eliminate the problem of the single pulse laser driving waveform and reliably reproduce the recorded data from the recording medium without producing the undesired pattern, the optical recording/reproducing apparatus of the present embodiment uses a multi-pulse laser driving waveform, as shown by (c) in FIG. 3, when recording data onto the phase-change recording medium.

As shown by (c) in FIG. 3, a mark portion of the multi-pulse laser driving waveform (corresponding to the high level of the ESM signal indicated by (b) in FIG. 3) includes a head-end high-level signal portion "A", a plurality of subsequent high-level signal portions "B", and a plurality of intermediate low-level signal portions "C" between the high-level signal portions. The head-end and subsequent high-level of the driving waveform (A or B) corresponds to the peak power "Pw" for the laser beam of the laser diode to heat the recording layer of the disk to a high temperature above the melting point of the phase-change material. The low level of the driving waveform (C) corresponds to the bottom power "Pb" for the laser beam of the laser diode to cool the recording layer of the disk. Suppose that a read-process power for the laser beam of the laser diode during a reproducing period is represented by "Pr". The peak power "Pw", the bottom power "Pb" and the read-process power "Pr" are predetermined so as to satisfy the conditions: Pw>Pb=Pr.

Further, as shown by (c) in FIG. 3, a space portion of the multi-pulse laser driving waveform (corresponding to the low level of the ESM signal indicated by (b) in FIG. 3) includes a single middle-level signal portion "D". The middle level of the driving waveform (D) corresponds to an erase power "Pe" for the laser beam of the laser diode to erase the data in the recording layer of the disk. The erase power "Pe" is predetermined such that it satisfies the conditions: Pw>Pe>Pb.

When the optical recording/reproducing apparatus of the present embodiment uses the above-described multi-pulse laser driving waveform during the recording period, it is possible to eliminate the problem of the single-pulse laser driving waveform and reliably reproduce the recorded data from the recording medium without producing the undesired pattern.

Next, a description will be provided of the automatic power control (APC) process which is performed by the optical recording/reproducing apparatus of the present embodiment during a normal writing process.

As shown in FIG. 1, the optical recording/reproducing apparatus of the present embodiment generally comprises a central processing unit (CPU) 1, a laser diode (LD) 2, a photodetector (PD) 3, a laser diode driver (LDD) 4, a current-voltage converter 5, a sample/hold circuit 6, an analog-to-digital converter (ADC) 7, a bottom-level current source (BCS) 8, an erase-level current driver (ECD) 9, and a peak-level current source (PCS) 10.

In the optical recording/reproducing apparatus of FIG. 1, the CPU 1 sets a bottom-level drive current at the output of the bottom-level current source (BCS) 8 by supplying a bottom-level control (BLC) signal to the BCS 8. The signal line through which the BLC signal is sent from the CPU 1 to the BCS 8 is designated by reference numeral 104. The signal line through which the bottom-level drive current is sent from the BCS 8 to the LDD 4 is designated by reference numeral 108.

The CPU 1 sets a peak-level increment current at the output of the peak-level current source (PCS) 10 by supplying a peak-level control (PLC) signal to the PCS 10. The signal line through which the PLC signal is sent from the CPU 1 to the PCS 10 is designated by reference numeral 107. The signal line through which the peak-level increment current is sent from the PCS 10 to the LDD 4 is designated by reference numeral 110.

The CPU 1 sets an erase-level increment current at the output of the erase-level current driver (ECD) 9 by supplying an erase-level control (ELC) signal to the ECD 9. The signal line through which the ELC signal is sent from the CPU 1 to the ECD 9 is designated by reference numeral 105. The signal line through which the erase-level increment current is sent from the ECD 9 to the LDD 4 is designated by reference numeral 109.

Specifically, each of the BCS 8 and the PCS 10 is configured by using a digital-to-analog converter (DAC). The digital bottom-level control signal from the CPU 1 is received at the BCS 8, and, in response to the control signal, the BCS 8 outputs the analog bottom-level drive current to the LDD 4. The digital peak-level control signal from the CPU 1 is received at the PCS 10, and, in response to the control signal, the PCS 10 outputs the analog peak-level increment current signal to the LDD 4.

The ECD 9 is configured so that the ECD 9 selectively outputs one of a plurality of erase-level increment currents to the LDD 4 through the signal line 109 in response to control signals supplied by the CPU 1.

The LDD 4 receives the bottom-level drive current from the signal line 108, the erase-level increment current from the signal line 109 and the peak-level increment current from the signal line 110, and, in response to the current signals, the LDD 4 supplies a selected one of the drive currents to the laser diode 2 at a time under the control of the CPU 1.

The CPU 1 converts a sequence of input recording data blocks into an eight-to-sixteen modulation (ESM) signal as in the waveform indicated by (b) in FIG. 3. The CPU 1 further generates a multi-pulse laser driving waveform as in the waveform indicated by (c) in FIG. 3. In accordance with the multi-pulse laser driving waveform, the CPU 1 supplies a bottom-power enable (BPE) signal, an erase-power enable (EPE) signal and a peak-power enable (PPE) signal to the LDD 4. The signal line through which the bottom-power enable (BPE) signal is sent from the CPU 1 to the LDD 4 is designated by reference numeral 101. The signal line through which the erase-power enable (EPE) signal is sent from the CPU 1 to the LDD 4 is designated by reference numeral 102. The signal line through which the peak-power enable (PPE) signal is sent from the CPU 1 to the LDD 4 is designated by reference numeral 103.

When the bottom-power enable (BPE) signal 101 is set in the high level (H), the LDD 4 supplies the bottom-level drive current 108 to the LD 2. The LD 2 at this time is driven by the bottom-level drive current to output the laser beam at the bottom power (Pb). When the erase-power enable (EPE) signal 102 is set in the high level (H), the LDD 4 supplies a sum of the bottom-level drive current 108 and the erase-level increment current 109 to the LD 2. The LD 2 at this time is driven by the erase-level drive current to output the laser beam at the erase power (Pe). When the peak-power enable (PPE) signal 103 is set in the high level (H), the LDD 4 supplies a sum of the bottom-level drive current 108 and the peak-level increment current 110 to the LD 2. The LD 2 at this time is driven by the peak-level drive current to output the laser beam at the peak power (Pw).

Figure 6:
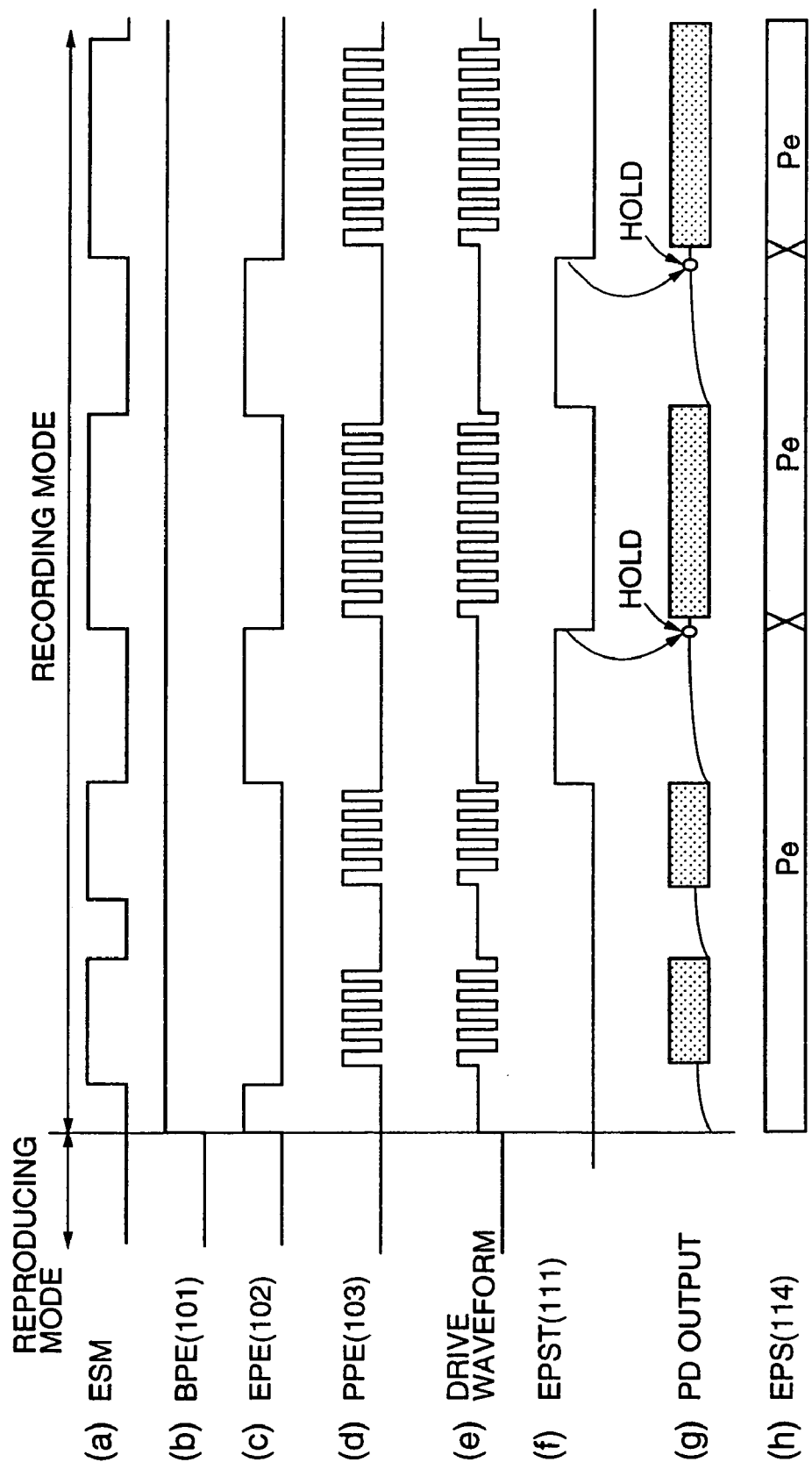
FIG. 6 is a time chart for explaining exemplary waveforms of the output signals of the elements of the optical recording/reproducing apparatus of FIG. 1.

FIG. 6 shows exemplary waveforms of the output signals of the elements of the optical recording/reproducing apparatus of the present embodiment.

As in the waveforms indicated by (b) through (d) in FIG. 6, the bottom-power enable (BPE) signal 101 is always set in the high level (H) during the recording mode. When outputting the erase power laser beam at the LD 2, the erase power enable (EPE) signal 102 is set in the high level (H) at the same time. The LDD 4 supplies the sum of the bottom-level drive current 108 and the erase-level increment current 109 to the LD 2. When outputting the peak power laser beam at the LD 2, the peak power enable (PPE) signal 103 is set in the high level (H) at the same time. The LDD 4 supplies the sum of the bottom-level drive current 108 and the peak-level increment current 110 to the LD 2.

When the drive current is supplied from the LDD 4 to the LD 2, the LD 2 outputs the laser beam to the phase-change recording medium, so that the data is recorded onto or reproduced from the recording layer of the phase-change recording medium. The laser beam output by the LD 2 is received at the photodetector (PD) 3. The PD 3 outputs a monitoring current that is proportional to the laser optical power of the received laser beam. The monitoring current is supplied from the PD 3 to the current-voltage converter 5. The signal line through the monitoring current signal is sent from the PD 3 to the current-voltage converter 5 is designated by reference numeral 112.

The current-voltage converter 5 outputs a power-monitoring signal based on the monitoring current supplied by the PD 3. The signal line through the power monitoring signal is sent from the current-voltage converter 5 to the sample/hold circuit 6 is designated by reference numeral 113. By utilizing the power-monitoring signal 113 output by the current-voltage converter 5, the automatic power control (APC) process is performed by the optical recording/reproducing apparatus of the present embodiment.

In the optical recording/reproducing apparatus of FIG. 1, the CPU 1 is connected to the sample/hold circuit 6 through a signal line 111, and an erase-power sample timing (EPST) signal is sent from the CPU 1 to the sample/hold circuit 6 through the signal line 111. When a long space having a maximum data length (in a case of the ESM scheme, 14T) is formed on the disk by the laser beam of the LD 2 during the recording mode, the CPU 1 sets the erase-power sample timing (EPST) signal in the high level (H). When the EPST signal is set in the high level (H), the power-monitoring signal 113 is sampled and held by the sample/hold circuit 6. The ADC 7 converts the power-monitoring signal, held by the sample/hold circuit 6, into a digital erase-power sample (EPS) signal. The EPS-signal is supplied from the ADC 7 to the CPU 1 through a signal line 114. See the waveforms indicated by (f) through (h) in FIG. 6.

The EPS signal output by the ADC 7 is received at the CPU 1, and the CPU 1 compares the received EPS signal with a reference value. The CPU 1 corrects the erase-level control (ELC) signal 105, which is supplied to the erase-level current driver (ECD) 9, based on a difference between the EPS signal and the reference value. As the corrected ELC signal 105 is supplied to the ECD 9, the ECD 9 supplies a corrected erase-level increment current to the LDD 4 so that the erase power (Pe) of the laser optical output is maintained at a proper level. The LD 2 at this time is driven by the corrected erase-level drive current supplied by the LDD 4, so as to output the laser beam at the proper erase power (Pe).

Further, in the present embodiment, the CPU 1 calculates a bottom-level drive current "Ib" and a peak-level drive current "Iw" based on the corrected erase-level drive current and a derivative efficiency, which will be described in greater detail below.

Figure 7:
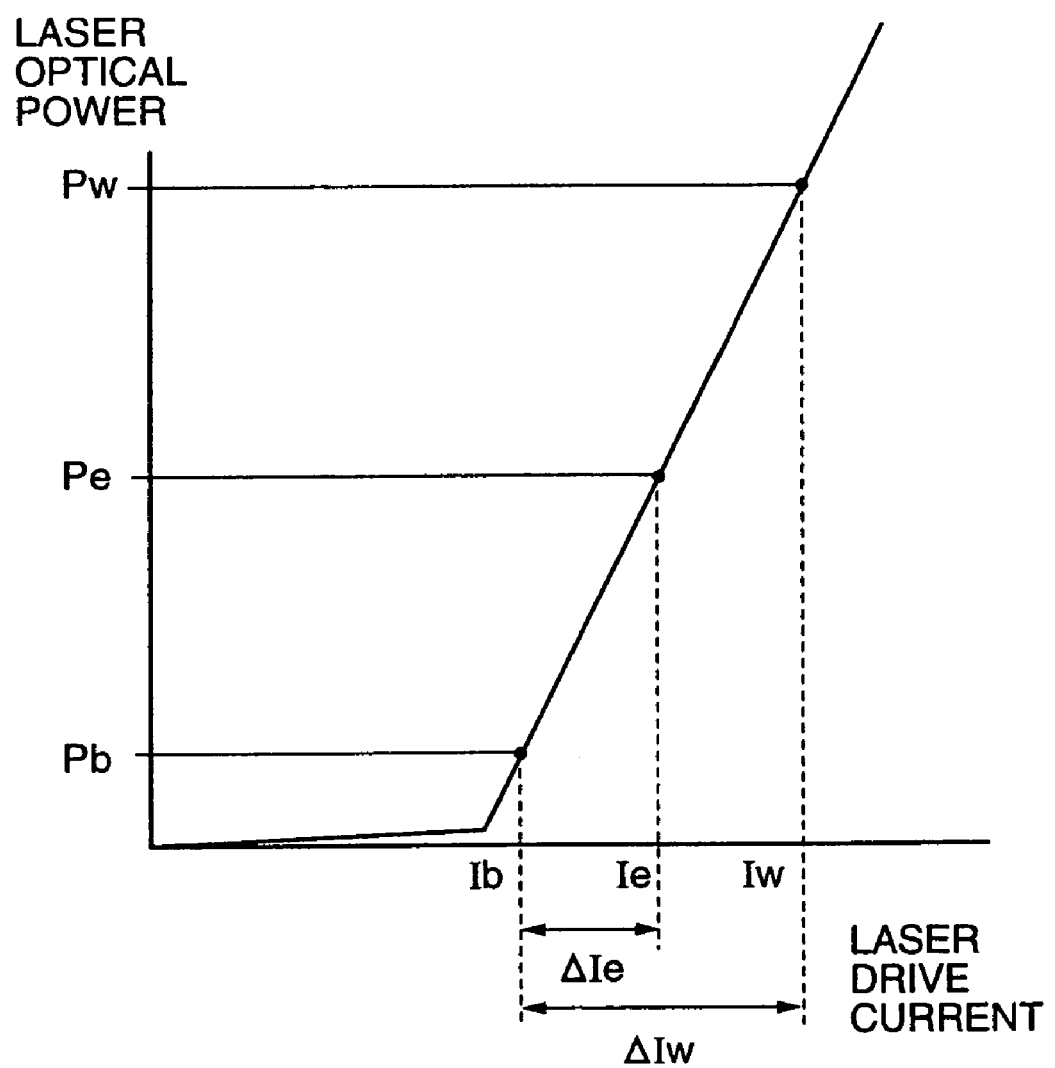
FIG. 7 is a diagram for explaining a laser diode derivative efficiency used by the optical recording/reproducing apparatus of FIG. 1.

FIG. 7 shows a laser diode derivative efficiency used by the optical recording/reproducing apparatus of the present embodiment.

Hereinafter, the derivative efficiency "$\eta$" of the LD 2 used by the optical recording/reproducing apparatus of the present embodiment, is defined as being a gradient $\Delta P/\Delta I$ of the light vs. current characteristic curve as shown in FIG. 7.

Suppose that the bottom-level drive current corresponding to the bottom power Pb, the erase-level drive current corresponding to the erase power Pe, and the peak-level drive current corresponding to the peak power Pw are represented by "Ib", "Ie", and "Iw", respectively. As is apparent from the light vs. current characteristic curve of FIG. 7, the bottom power "Pb" and the peak power "Pw" are represented by the following equations.

$$Pb = Pe - \eta \times (Ie - Ib) \qquad (3)$$

$$Pw = Pe + \eta \times (Iw - Ie) \qquad (4)$$

From the above equations (3) and (4), the bottom-level drive current "Ib" and the peak-level drive current "Iw" can be calculated in accordance with the following equations.

$$Ib = Ie - (Pe - Pb)/\eta \qquad (5)$$

$$Iw = Ie + (Pw - Pe)/\eta \qquad (6)$$

In this case, the derivative efficiency "$\eta$" of the LD 2 is predetermined, and the calculation of the bottom-level drive current Ib and the peak-level drive current Iw is performed by using the predetermined derivative efficiency. As described above, the CPU 1 calculates the bottom-level drive current "Ib" and the peak-level drive current "Iw" based on the corrected erase-level drive current and the derivative efficiency. Thereafter the CPU 1 sets the bottom-level control signal 104 and the peak-level control signal 107, which are respectively supplied to the bottom-level current source 8 and the peak-level current source 10, to the proper values based on the calculated drive currents "Ib" and "Iw".

As described above, the LDD 4 supplies the sum of the bottom-level drive current 108 and the erase-level increment current 109 to the LD 2. Also, the LDD 4 supplies the sum of the bottom-level drive current 108 and the peak-level increment current 110 to the LD 2. Suppose that the erase-level increment current 108 and the peak-level increment current 110 are represented by "$\Delta$Ie" and "$\Delta$Iw", respectively. As is apparent from the characteristic curve shown in FIG. 7, the erase-level drive current "Ie" and the peak-level drive current "Iw" can be calculated in accordance with the following equations.

$$Ie = Ib + \Delta Ie \quad (7)$$

$$Iw = Ib + \Delta Iw \quad (8)$$

In the present embodiment, a time period for which the above-described APC process is performed is shorter than a time period for which a special power setting process (which will be described later) is performed. For example, in the present embodiment, the erase power sample signal 114, output by the ADC 7, is received by the CPU 1 when a long space having a maximum data length (14T) is formed on the disk by the laser beam of the LD 2. As described above, at this time, the erase-power sample timing (EPST) signal is set in the high level by the CPU 1.

According to the DVD standards, the data length 14T of a long space is equal to the data length of a sync code in the sequence of the input recording data blocks, and the sampling and holding of the erase power in the APC process will be performed once for every two sync frames (1488T).

Strictly speaking, either a mark having the maximum data length 14T or a space having the maximum data length 14T is selected so as to meet the requirement that the digital sum value (DSV) be equal to zero. The sampling and holding of the erase power in the APC process is not always performed once for every two sync frames (1488T). However, for the sake of simplicity, it is assumed that, in the present embodiment, a mark having the data length 14T and a space having the data length 14T are alternately selected with equal probabilities.

In the optical recording/reproducing apparatus of the present embodiment, the CPU 1 calculates the bottom-level drive current "Ib" and the peak-level drive current "Iw" based on the corrected erase-level drive current (obtained when forming a long space having the maximum data length 14T on the disk by the laser beam of the LD 2) and the predetermined derivative efficiency. Accordingly, the optical recording/reproducing apparatus of the present embodiment is effective in maintaining the accurate recording power levels of the laser optical power, including the peak power, the erase power and the bottom power, even when the light-receiving module with the limited bandwidth is used.

Figure 9:
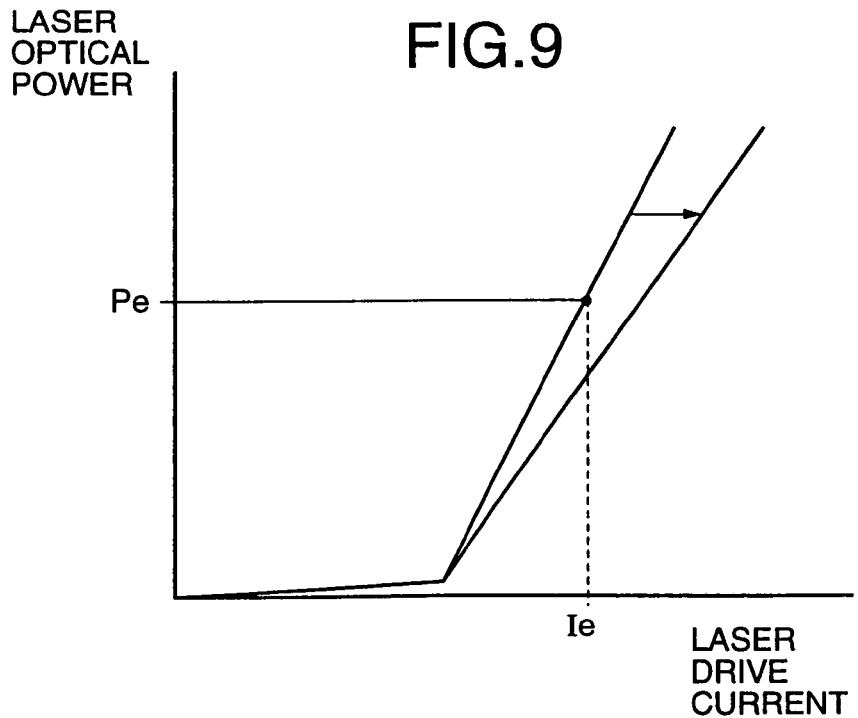
FIG. 9 is a diagram for explaining the light vs. current characteristics of the laser diode with a variation of the derivative efficiency during the writing mode.

FIG. 9 shows the light vs. current characteristics of the laser diode with a variation of the derivative efficiency during the writing mode.

As shown in FIG. 9, the light vs. current characteristic curve tends to shift and bend to the right with increasing temperature, and the derivative efficiency of the laser diode tends to vary with increasing temperature. If the derivative efficiency varies, the errors of the calculated bottom-level drive current "Ib" and the calculated peak-level drive current "Iw" will not be negligible.

As previously described, the conventional apparatus, disclosed in Japanese Laid-Open Patent Application No. 9-171631, carries out the power control process in which the bottom-level drive current to the laser diode is corrected by using the detected peak power and the detected erase power, in order to take measures against a variation of the derivative efficiency. However, according to the above-mentioned power control process, a problem arises in that the formation of a mark on the recording layer of the disk when the laser diode is driven at the peak-level drive current in the non-pulse condition becomes deficient.

In order to eliminate the above problem of the conventional apparatus, the optical recording/reproducing apparatus of the present embodiment is configured so that the erase-level current driver (ECD) 9 selectively outputs one of the plurality of erase-level increment currents to the LDD 4 through the signal line 109 in response to the control signals supplied by the CPU 1. The respective power levels of the laser optical power when the individual erase-level increment currents are supplied to the LDD 4 are sampled and held by the sample/hold circuit 6, and the corresponding erase power sample (EPS) signals are received at the CPU 1. Then, the CPU 1 calculates a derivative efficiency of the LD 2 based on the erase power samples (EPS).

Figure 2:
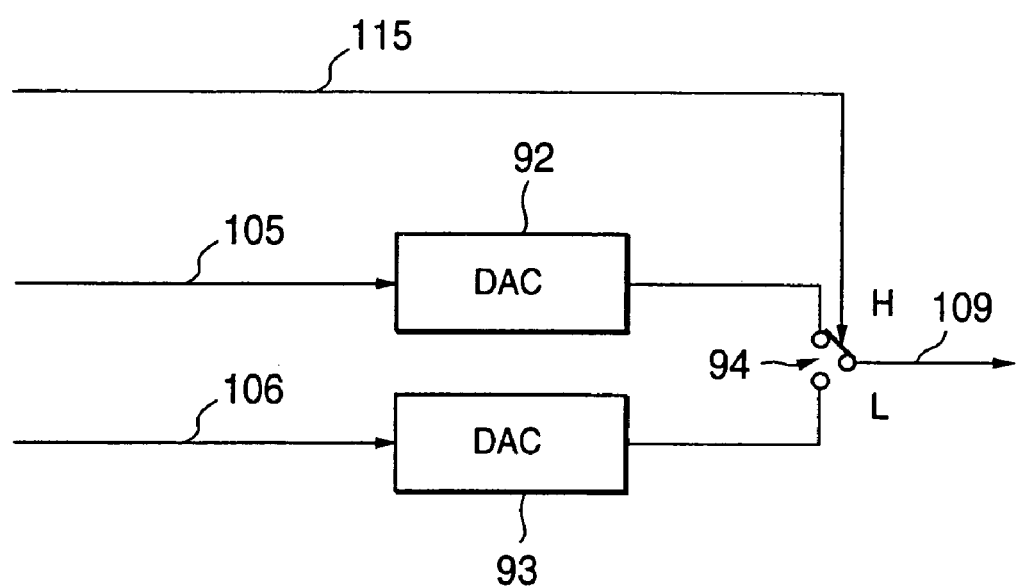
FIG. 2 is a block diagram of an erase-level current driver in the optical recording/reproducing apparatus of FIG. 1.
Figure 4:
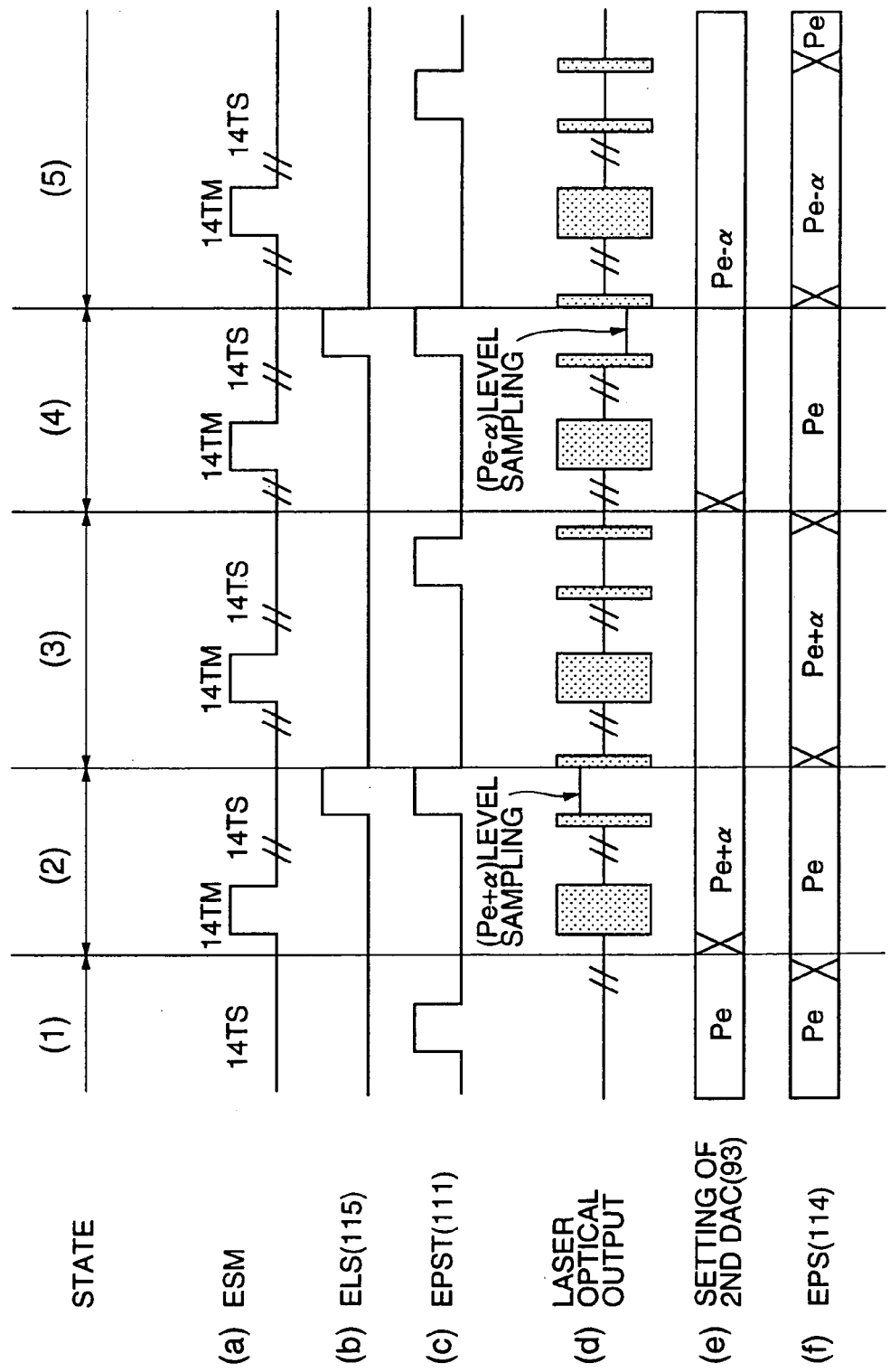
FIG. 4 is a time chart for explaining exemplary waveforms of the output signals of the elements of the optical recording/reproducing apparatus of FIG. 1 during a special power setting process.
Figure 5A:
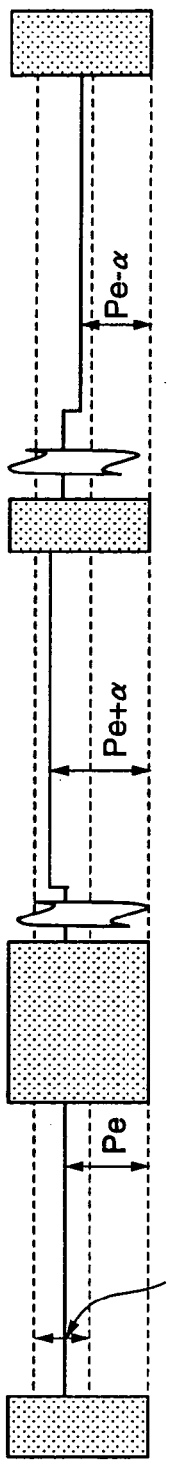
FIG. 5A, FIG. 5B and FIG. 5C are diagrams for explaining examples of the detection of erase-level optical power at two sampling points used by the optical recording/reproducing apparatus of FIG. 1.

Next, a description will be provided of the special power setting process executed by the optical recording/reproducing apparatus of the present embodiment with reference to FIG. 2, FIG. 4 and FIG. 5A.

FIG. 2 shows an erase-level current driver in the optical recording/reproducing apparatus of FIG. 1. FIG. 4 shows exemplary waveforms of the output signals of the elements of the optical recording/reproducing apparatus of FIG. 1 during the special power setting process.

As shown in FIG. 2, the erase-level current driver (ECD) 9 in the present embodiment generally comprises a first digital-to-analog converter (DAC) 92, a second digital-to-analog converter (DAC) 93, and a switch 94. The switch 94 has a high-level state and a low-level state. The erase-level select (ELS) signal output by the CPU 1 is sent to the switch 94 through the signal line 115, and one of the high-level (H) state and the low-level (L) state is selected at the switch 94 in accordance with the erase-level select (ELS) signal 115 supplied by the CPU 1.

The first DAC 92 has an input connected to the signal line 105 and an output connected to the switch 94. When the high-level (H) state of the switch 94 is selected according to the ELS signal 115, the ECD 9 supplies an output signal of the first DAC 92 to the LDD 4 through the signal line 109. The second DAC 93 has an input connected to the signal line 106 and an output connected to the switch 94. When the low-level (L) state of the switch 94 is selected according to the ELS signal 115, the ECD 9 supplies an output signal of the second DAC 93 to the LDD 4 through the signal line 109.

The normal erase-level control (ELC) signal, which is sent through the signal line 105 by the CPU 1 when producing the normal erase power (Pe) of the laser optical output, is received at the first DAC 92, and, in response to the normal ELC signal, the DAC 92 outputs the normal erase-level increment current (EIC) to the switch 94. Usually when the erase power (Pe) of the laser optical output is produced, the high-level (H) state of the switch 94 is selected according to the ELS signal 115.

A second erase-level control (ELC) signal, which is sent through the signal line 106 by the CPU 1 during the special power setting process, is received at the second DAC 93, and, in response to the second ELC signal, the DAC 93 outputs a second erase-level increment current (EIC) to the switch 94.

In the present embodiment, the frequency at which the execution of the special power setting process is initiated by the CPU 1 is smaller than the frequency at which the execution of the normal APC process is initiated by the CPU 1. An optimal value of the frequency of execution of the special power setting process may be experimentally determined depending on time-dependent variations of the derivative efficiency of the LD 2.

At a start of the special power setting process, the CPU 1 sends a second ELC signal 106 to the second DAC 93, and the second DAC 93 outputs a second EIC to the switch 94.

The low-state (L) of the switch 94 is selected according to the ELS signal 115, and the second EIC, supplied by the ECD 9, results in a first erase power "Pe+α" of the laser beam of the LD 2. See the state (2) indicated in FIG. 4.

In the above-described condition, when recording a 14T space data "14TS" onto the disk, the CPU 1 sets the ELS signal 115 in the low state (L), and the DAC 93 supplies the second EIC to the LDD 4 through the signal line 109. Hence, only during the 14T period, the first erase power "Pe+α" of the laser beam of the LD 2 is produced.

In the above-described condition, a corresponding first erase power sample (EPS) signal 114, output by the ADC 7, is received by the CPU 1. The CPU 1 stores the received EPS signal in a portion of the memory that is different from a memory portion in which the EPS signal obtained during the APC process is stored.

Immediately after the 14T space data is recorded onto the disk, the CPU 1 sets the ELS signal 115 in the high state (H). The high state (H) of the switch 94 is selected according to the ELS signal 115 so as to produce the normal erase power "Pe" of the laser beam of the LD 2. See the state (3) indicated in FIG. 4.

Usually, the peak power and the erase power of the laser diode are set to the optimal values when performing a laser power calibration on the phase-change recording disk, so as to retain good jitter characteristics when reproducing the data from the disk. If an erase power of the laser beam of the LD 2, different from the normal erase power Pe, is produced for a too long time, the jitter characteristics will deteriorate. In the present embodiment, immediately after the 14T space data is formed on the disk with the first erase power, the switch 94 is returned to the high state (H) so as to produce the normal erase power. Hence, the deterioration of the jitter characteristics will be negligible.

Following the above state (3), the CPU 1 sends another second ELC signal 106 to the second DAC 93, and the second DAC 93 outputs another second EIC to the switch 94. The low-state (L) of the switch 94 is selected according to the ELS signal 115, and the second EIC, supplied by the ECD 9, results in a second erase power "Pe−αa" of the laser beam of the LD 2. See the state (4) indicated in FIG. 4.

In the above-described condition, when recording a 14T space data "14TS" onto the disk, the CPU 1 sets the ELS signal 115 in the low state (L), and the DAC 93 supplies the second EIC to the LDD 4 through the signal line 109. Hence, only during the 14T period, the second erase power "Pe−α" of the laser beam of the LD 2 is produced.

In the above-described condition, a corresponding second erase power sample (EPS) signal 114, output by the ADC 7, is received at the CPU 1. The CPU 1 stores the received second EPS signal in another portion of the memory that is different from the memory portion in which the EPS signal obtained during the APC process is stored.

Immediately after the 14T space data is recorded onto the disk, the CPU 1 sets the ELS signal 115 in the high state (H). The high state (H) of the switch 94 is selected according to the ELS signal 115 so as to produce the normal erase power "Pe" of the laser beam of the LD 2. See the state (5) indicated in FIG. 4.

The CPU 1 calculates a derivative efficiency "η" of the LD 2 based on the first and second erase-power sample (EPS) signals (Pe+α, Pe−α) and the corresponding erase-level drive currents (I″, I′), in accordance with the following equation.

$$\eta = \{(Pe + \alpha) - (Pe - \alpha)\}/(I'' - I') \quad (9)$$
$$= 2\alpha/(I'' - I')$$

Figure 8:
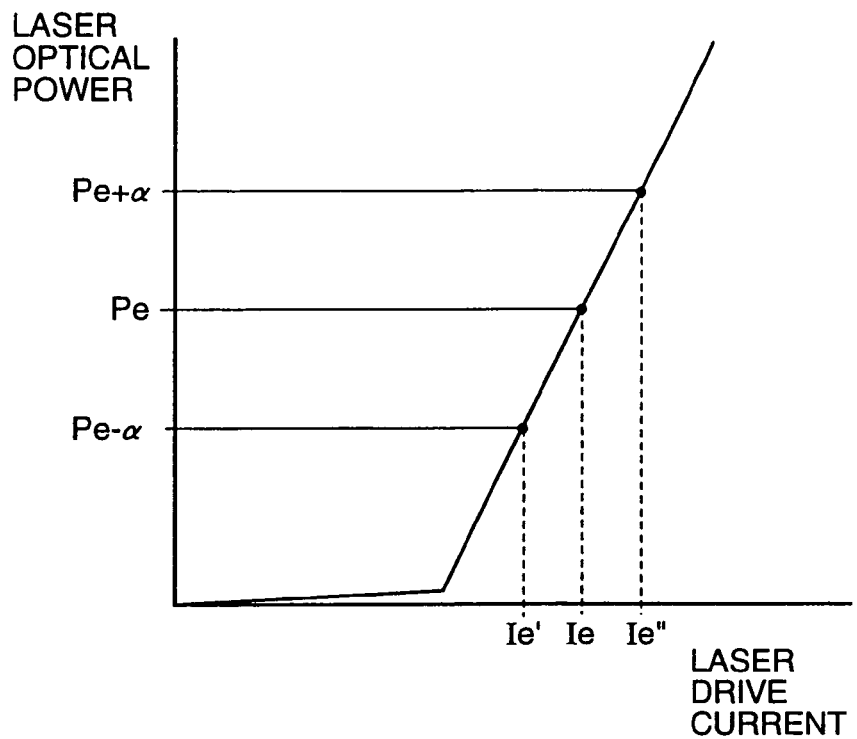
FIG. 8 is a diagram for explaining an example of the calculation of the derivative efficiency used by the optical recording/reproducing apparatus of FIG. 1.

See the light vs. current characteristics shown in FIG. 8, for an example of the calculation of the derivative efficiency used by the present embodiment at this time.

If the setting of the second DAC 93 for the second erase-power output can be performed timely, the first erase-power "Pe+α" laser driving and the second erase-power "Pe−α" laser driving may be performed within a period the 14T space data is output. Alternatively, an intermediate period of the 14T space data output at the normal erase power level may be interposed between the period of the first erase-power "Pe+α" laser driving and the period of the second erase-power "Pe−α" laser driving. In either case, in order to calculate an accurate derivative efficiency, the first and second erase-power laser driving must be performed within a comparatively short period.

The reason why the first erase-power "Pe+α" and the second erase-power "Pe−α" are sampled for the calculation of the derivative efficiency is to make use of a proper erase-level range of the laser driving permitted for erasing data from the phase-change recording medium.

In a case of the phase-change disk of a certain type, the proper erase-level range is, for example, $3\ mW \leq Pe \leq 8\ mW$. If data on the disk is erased at a power higher than the upper limit of the proper erase-level range, the overwriting characteristics will deteriorate and the recording layer of the disk will be damaged. If data on the disk is erased at a power lower than the lower limit of the proper erase-level range, the overwriting characteristics will deteriorate and the deficiency of the erasing will occur.

Usually, the erase power of the laser diode with respect to the phase-change recording disk is set to the optimal value when performing a laser power calibration process on the disk. The optimal value of the erase power, which is set by the laser power calibration process, normally lies around at the middle point of the proper erase-level range of the disk.

In order to obtain an accurate derivative efficiency of the laser diode with a smaller calculation error, it is desirable to make the difference between the erase-power levels at the two sampling points as large as possible.

In the above-described embodiment, the first erase-power "Pe+α" and the second erase-power "Pe−α", which fall within the proper erase-level range, are sampled and the derivative efficiency is calculated accordingly. The optical recording/reproducing apparatus of the present embodiment can provide accurate calculation of the derivative efficiency with little calculation errors and prevent the deterioration of the overwriting characteristics and the deficiency of the erasing.

In an exemplary case of the special power setting process, the value of α is equal to 1.5 mW where the proper erase-level range is $3\ mW \leq Pe \geq 8\ mW$, and the erase power is Pe=6 mW.

Further, in the present embodiment, the CPU 1 calculates the bottom power "Pb" and the peak power "Pw" based on the above-calculated derivative efficiency in a manner similar to the above-described APC process. Accordingly, the optical recording/reproducing apparatus of the present embodiment is effective in maintaining the accurate recording power levels of the laser optical power, including the peak power Pw, the erase power Pe and the bottom power Pb, even when the light receiving module with the limited bandwidth is used. The optical recording/reproducing apparatus is effective in preventing the deficient formation of a mark on the disk when recording data onto the disk.

Further, the optical recording/reproducing apparatus of the present embodiment is configured so that the erase-level current driver (ECD) 9 selectively outputs one of the plurality of erase-level increment currents to the LDD 4 through the signal line 109 in response to the control signals supplied by the CPU 1. The respective power levels of the laser optical power when the individual erase-level increment currents are supplied to the LDD 4 are sampled and held by the sample/hold circuit 6, and the corresponding erase power sample (EPS) signals are received by the CPU 1. Then, the CPU 1 calculates a derivative efficiency of the LD 2 based on the erase power samples (EPS) at the plural sampling points. Therefore, the optical recording/reproducing apparatus of the present embodiment is effective in maintaining the accurate recording power levels of the laser optical power even when the light-receiving module with the limited bandwidth is used. The optical recording/reproducing apparatus is effective in preventing the deficient formation of a mark on the disk when recording data onto the disk.

Further, the optical recording/reproducing apparatus of the present embodiment is configured so that one of the plurality of erase-level increment currents, supplied from the ECD 9 to the LDD 4, is changed to another during a period a space data having a data length longer than a predetermined time is formed on the medium, and the erase-level increment current is returned to the original erase-level increment current immediately after an end of the period. Therefore, the deterioration of the jitter characteristics will be negligible.

Further, the optical recording/reproducing apparatus of the present embodiment is configured so that the first erase-power "Pe+α" and the second erase-power "Pe−α", which are obtained by increasing or decreasing the normal erase power "Pe" by the value of α, are sampled for the calculation of the derivative efficiency. Therefore, it is possible to positively utilize the proper erase-level range of the laser driving permitted for erasing data from the recording medium.

Further, the optical recording/reproducing apparatus of the present embodiment is configured such that the first erase-power "Pe+α" and the second erase-power "Pe−α", which are obtained by increasing or decreasing the normal erase power "Pe" by the value of α, are included in the proper erase-level range for the recording medium. The optical recording/reproducing apparatus of the present embodiment is effective in preventing the deterioration of the overwriting characteristics and the deficiency of the erasing.

Figure 5B:
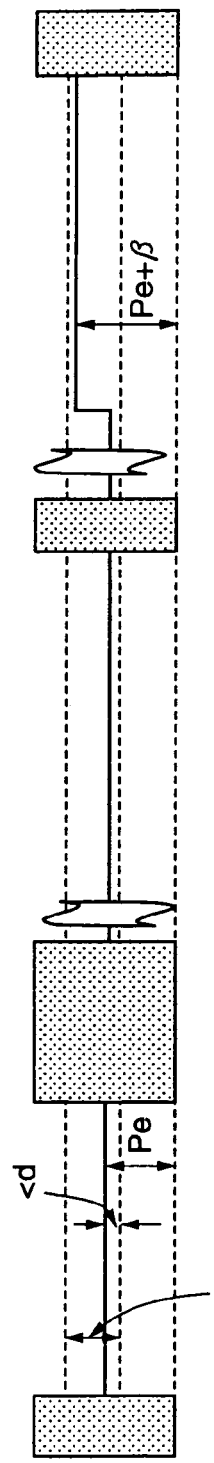
Figure 5C:
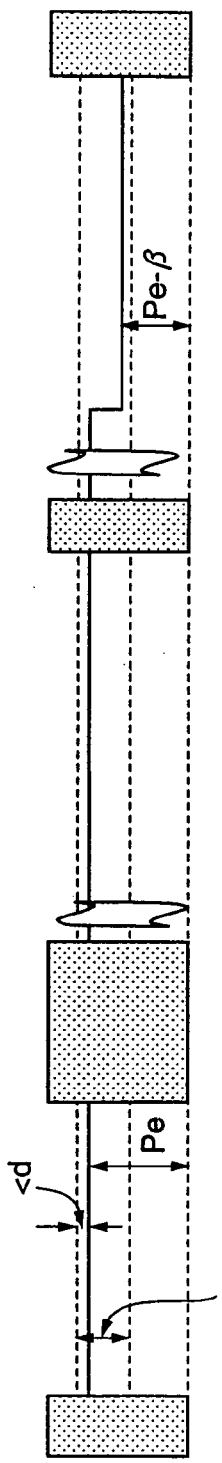

Next, a description will be provided of the special power setting process which is executed by another preferred embodiment of the optical recording/reproducing apparatus of the invention with reference to FIG. 5B, FIG. 5C and FIG. 10.

In the present embodiment, the configuration of the optical recording/reproducing apparatus is essentially the same as that of the optical recording/reproducing apparatus shown in FIG. 1, and a description thereof will be omitted.

FIG. 5B and FIG. 5C show the examples of the detection of erase-level optical power samples at two sampling points used by the optical recording/reproducing apparatus of the present embodiment. FIG. 10 shows the exemplary waveforms of the output signals of the elements of the optical recording/reproducing apparatus of the present embodiment.

When the optimal value of the erase power "Pe", which is set by the laser power calibration process, considerably deviates from the middle point of the proper erase-level range of the phase-change recording disk, the special power setting process in the previous embodiment is not effective in providing accurate calculation of the derivative efficiency of the laser diode.

The special power setting process in the present embodiment takes measures to eliminate the above problem of the previous embodiment. In the present embodiment, it is determined that a difference between the normal erase power "Pe" and one of the upper limit or the lower limit of the proper erase-level range for the phase-change recording disk is below a reference value "d". When the above condition is met, one of a first erase-power "Pe+β" or a second erase-power "Pe−β" that is obtained by increasing or decreasing the normal erase power "Pe" by a predetermined value "β" is sampled for the calculation of the derivative efficiency. See FIG. 5B and FIG. 5C for the examples of the detection of erase-level optical power samples at the two sampling points.

For the sake of simplicity of the description, it is supposed that, in the case of FIG. 10, the difference between the normal erase power "Pe" and the lower limit of the proper erase-level range for the phase-change recording disk is determined as being less than the reference value "d". Namely, the case of FIG. 10 corresponds to the example of FIG. 5B.

As shown in FIG. 10, at a start of the special power setting process, the CPU 1 sends a second ELC signal 106 to the second DAC 93, and the second DAC 93 outputs a second EIC to the switch 94. The low-state (L) of the switch 94 is selected according to the ELS signal 115, and the second EIC 109, supplied by the ECD 9, results in the first erase power "Pe+β" of the laser beam produced by the LD 2. See the state (2) indicated in FIG. 10.

In the above-described condition, when recording a 14T space data "14TS" onto the disk, the CPU 1 sets the ELS signal 115 in the low state (L), and the DAC 93 supplies the second EIC to the LDD 4 through the signal line 109. Hence, only during the 14T period, the first erase power "Pe+β" of the laser beam of the LD 2 is produced.

In the above-described condition, a corresponding first erase power sample (EPS) signal 114 for the first erase power "Pe+β", output by the ADC 7, is received by the CPU 1. The CPU 1 stores the received EPS signal in a portion of the memory that is different from a memory portion in which the EPS signal obtained during the APC process is stored.

Immediately after the 14T space data is recorded onto the disk, the CPU 1 sets the ELS signal 115 in the high state (H). The high state (H) of the switch 94 is selected according to the ELS signal 115 so as to produce the normal erase power "Pe" of the laser beam of the LD 2. See the state (3) indicated in FIG. 10.

Similar to the previous embodiment of FIG. 4, in the present embodiment, the CPU 1 calculates a derivative efficiency "η" of the LD 2 based on the normal and first erase-power sample (EPS) signals (Pe, Pe+β) and the corresponding erase-level drive currents (I, I"), in accordance with the above equation (9).

In the present embodiment, a relationship between the predetermined value "β" for the special power setting process and the value "α" for the normal APC process is represented by the following equation.

$$\beta = 2 \times \alpha \qquad (10)$$

Accordingly, the CPU 1 calculates the derivative efficiency "η" of the LD 2 based on the normal and first erase-power sample (EPS) signals (Pe, Pe+β) and the corresponding erase-level drive currents (I, I"), in accordance with the above equations (9) and (10).

Further, in the case of FIG. 5C, the difference between the normal erase power "Pe" and the upper limit of the proper erase-level range for the phase-change recording disk is determined as being less than the reference value "d". Also, in this case, the CPU 1 in the present embodiment carries out the special power setting process that is similar to the above-described special power setting process for the case of FIG. 5B. Namely, the CPU 1 obtains the normal erase-power sample (EPS) signal (Pe), the second erase-power (EPS) sample signal (Pe–β) and the corresponding erase-level drive currents (I, I'), and then calculates a derivative efficiency "η" of the LD 2 based on the normal and second EPS signals (Pe, Pe–β) and the corresponding erase-level drive currents (I, I'), in accordance with the above equations (9) and (10).

According to the above-described embodiment, it is possible to provide accurate calculation of the derivative efficiency of the laser diode with little calculation errors even when the value of the erase power "Pe" considerably deviates from the middle point of the proper erase-level range of the phase-change recording disk.

The optical recording/reproducing apparatus of the present embodiment is configured that, when the difference between the normal erase power and the upper limit of the proper erase-level range for the disk is less than the reference value, the CPU 1 calculates a derivative efficiency of the laser diode based on the normal and second erase power samples (Pe, Pe–β) and the corresponding erase-level drive currents (I, I'), and when the difference between the normal erase power and the lower limit of the proper erase-level range for the disk is less than the reference value, the CPU 1 calculates a derivative efficiency of the laser diode based on the normal and first erase-power samples (Pe, Pe+β) and the corresponding erase-level drive currents (I, I"). Therefore, even when the value of the erase power "Pe" considerably deviates from the middle point of the proper erase-level range of the phase-change recording disk, the optical recording/reproducing apparatus of the present embodiment is effective in providing accurate calculation of the derivative efficiency of the laser diode with little calculation errors.

In the above-described embodiments, the erase-level current driver (ECD) 9 in the optical recording/reproducing apparatus comprises the first DAC and the second DAC for selectively outputting one of the two erase-level increment currents (EIC) to the LDD 4. However, the number of the current sources included in the ECD 9 and the number of the erase-level increment currents supplied to the switch 94 in the optical recording/reproducing apparatus of the present invention are not limited to the above embodiments. Alternatively, three or more current sources or digital-to-analog converters may be provided in the erase-level current driver (ECD) 9 and three or more erase-level increment currents may be supplied from the ECD 9 to the switch 94.

Next, a description will now be provided of the basic concept of the optical recording/reproducing apparatus of the invention with reference to FIG. 1 and FIG. 12A.

FIG. 12A shows the basic concept of the optical recording/reproducing apparatus of the invention when a sequence of recording data blocks is recorded onto rewritable optical recording media (for example, a DVD-rewritable disk). For example, the configuration of the optical recording/reproducing apparatus shown in FIG. 1 is used to achieve the basic concept of the invention shown in FIG. 12A.

As indicated by (c) in FIG. 12A, the semiconductor laser driver (or the LDD 4) of the optical recording/reproducing apparatus supplies a selected one of a plurality of drive currents, including a first-level drive current and a second-level drive current, to the semiconductor laser (or the LD 2) to control the emission of a laser beam by the laser.

The current driver (or the ECD 9) of the optical recording/reproducing apparatus selectively outputs one of a plurality of increment currents to the laser driver in response to control signals, the plurality of increment currents including a first increment current supplied to the laser driver during the automatic power control (APC) process and a second increment current supplied to the laser driver during the special power setting process.

The detection unit (or the elements 3, 5, 6 and 7 in FIG. 1) detects a first power sample signal (or the EPS signal 114), at a first sampling point (indicated by "A" in FIG. 12A) of the waveform, from the laser beam emitted when the first increment current (or the normal EIC) is supplied to the laser driver. The detection unit detects a second power sample signal (or the EPS signal 114), at a second sampling point (indicated by "B" in FIG. 12A) of the waveform, from the laser beam emitted when the second increment current (or the second EIC) is supplied to the laser driver.

The calculation unit (or the CPU 1) calculates a derivative efficiency of the laser based on the first and second power sample signals (the EPC signals 114) detected by the detection unit, so that the drive currents of the laser driver, supplied to the laser, are controlled based on the calculated derivative efficiency.

Next, a description will be provided of another preferred embodiment of the optical recording/reproducing apparatus of the invention with reference to FIG. 13 through FIG. 16.

Figure 13:
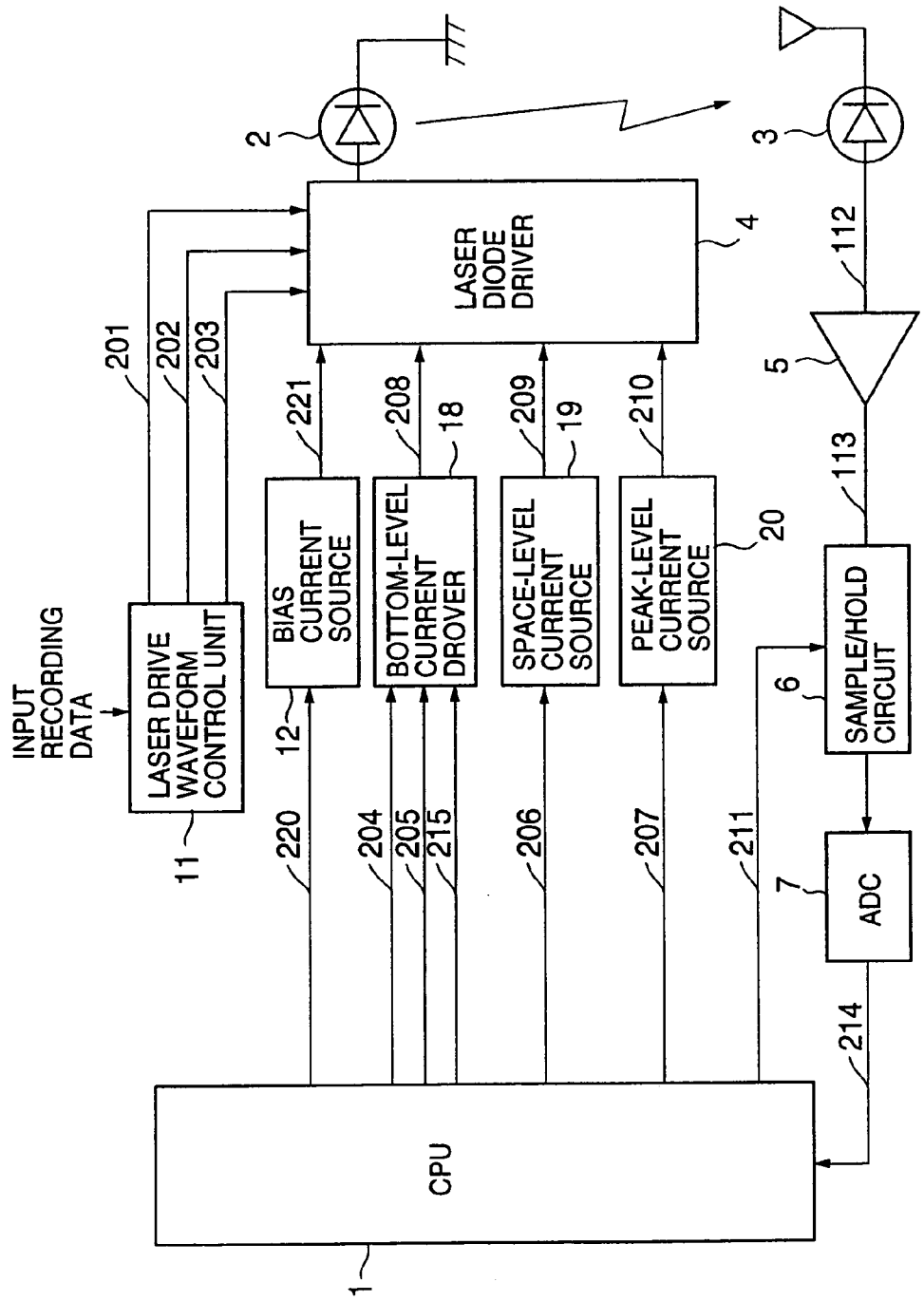
FIG. 13 is a block diagram of another preferred embodiment of the optical recording/reproducing apparatus of the invention.
Figure 14:
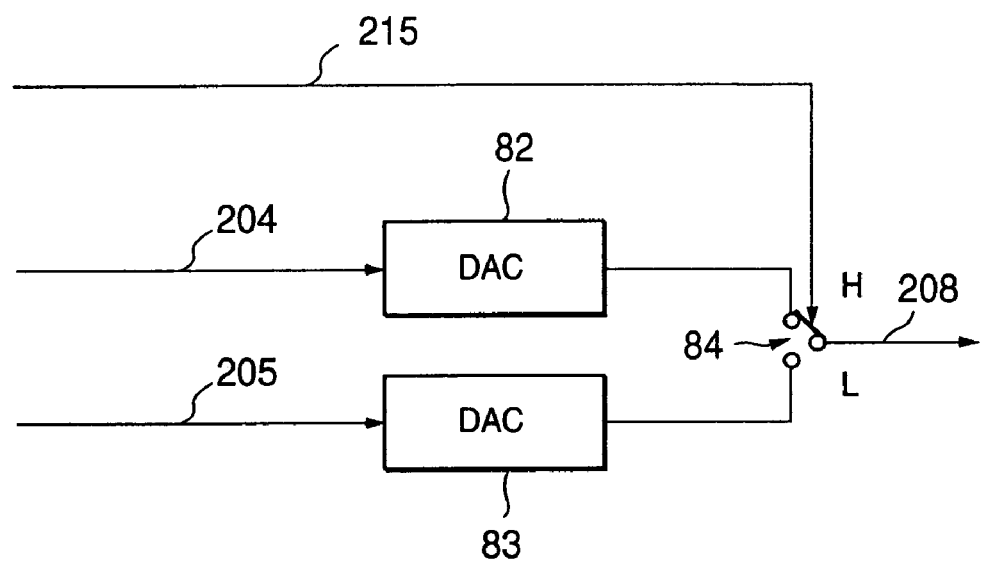
FIG. 14 is a block diagram of a bottom-level current driver in the optical recording/reproducing apparatus of FIG. 13.
Figure 15:
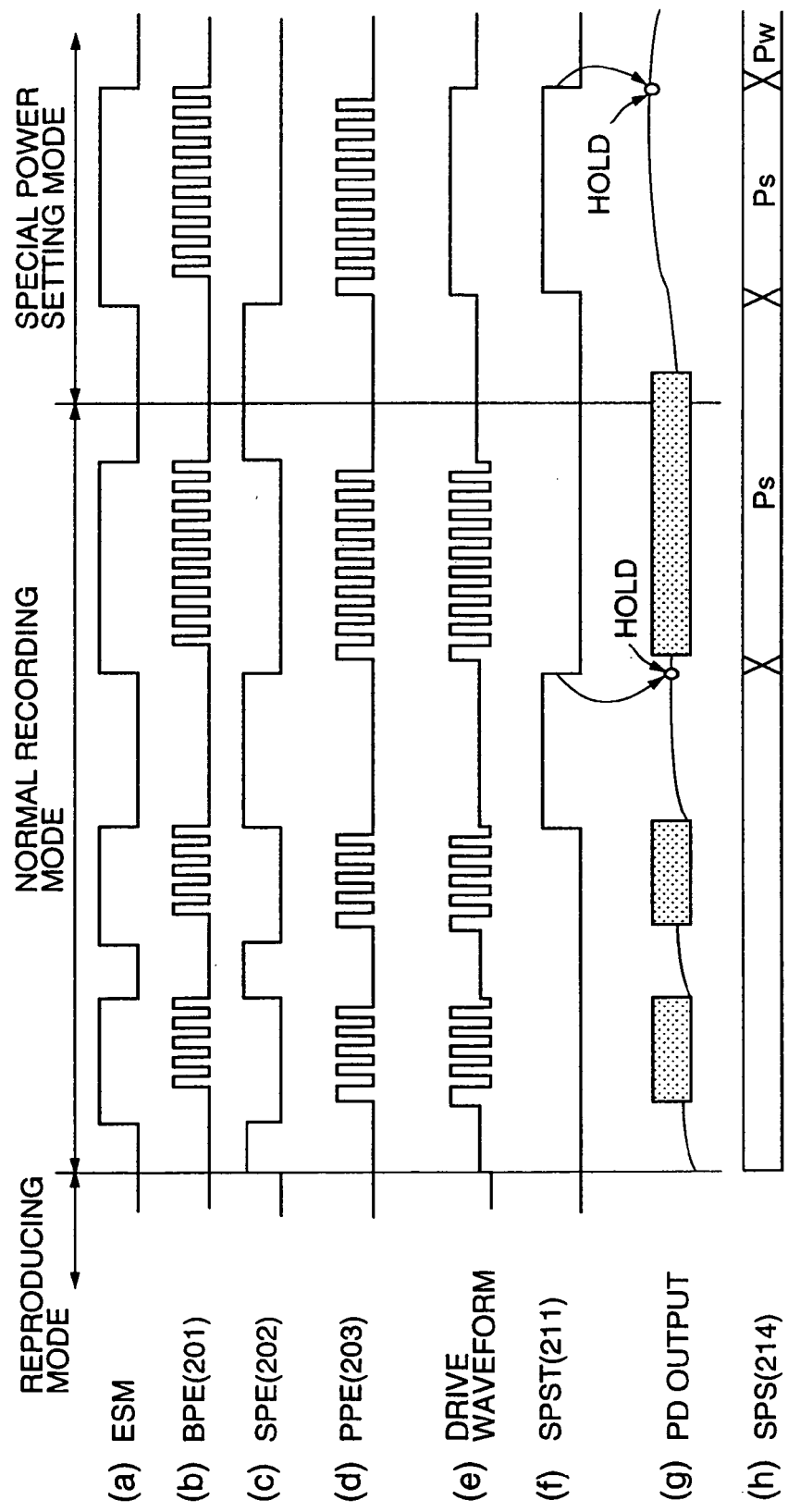
FIG. 15 is a time chart for explaining exemplary waveforms of the output signals of the elements of the optical recording/reproducing apparatus of FIG. 13.
Figure 16:
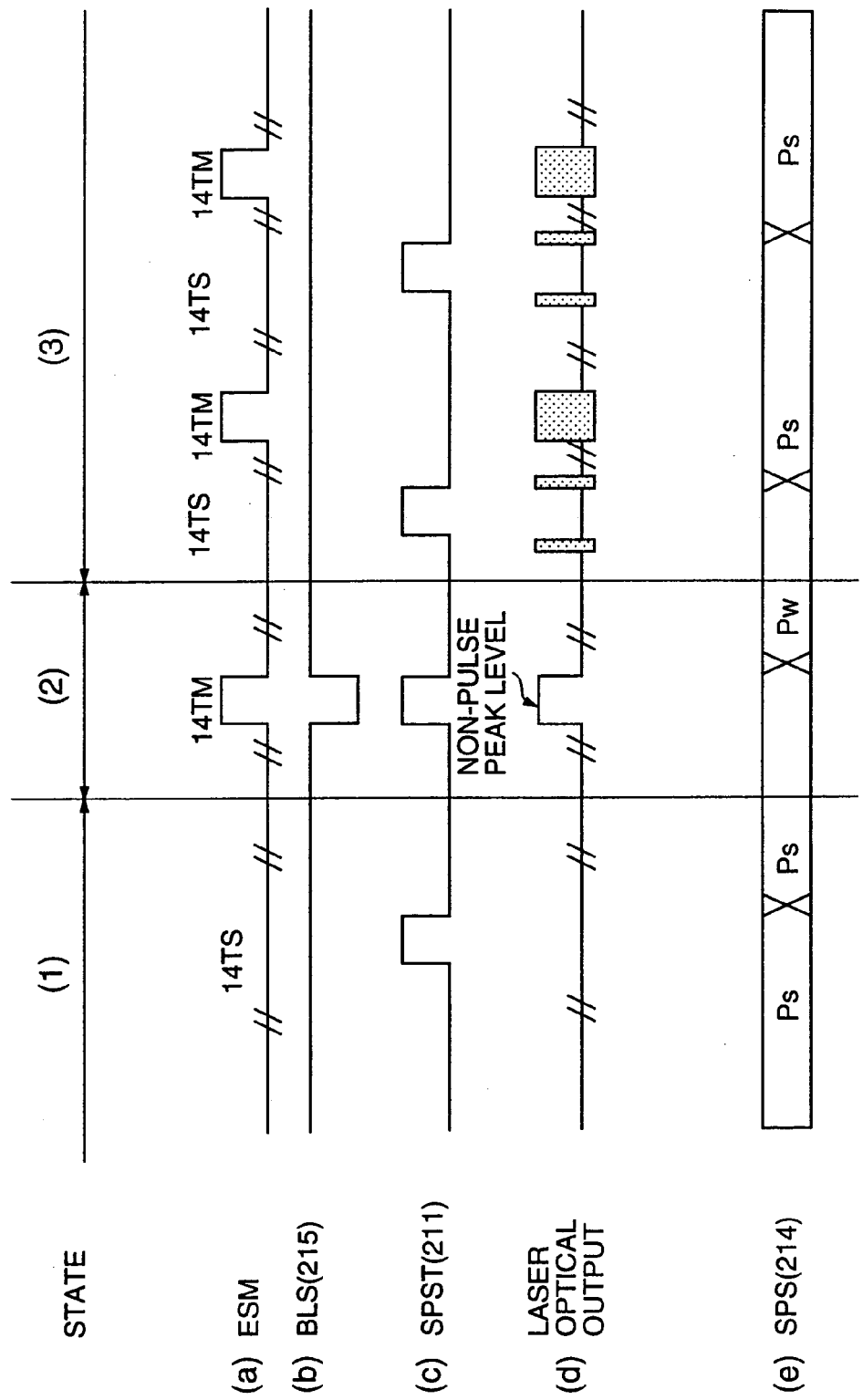
FIG. 16 is a time chart for explaining the waveforms of output signals of various elements of the optical recording/reproducing apparatus of FIG. 13 during an efficiency calculation process.

FIG. 13 shows the optical recording/reproducing apparatus of the present embodiment. FIG. 14 shows a bottom-level current driver in the optical recording/reproducing apparatus of FIG. 13. FIG. 15 shows the exemplary waveforms of the output signals of the elements of the optical recording/reproducing apparatus of FIG. 13 during a normal recording process and during a special power setting process. FIG. 16 shows the waveforms of the output signals of various elements of the optical recording/reproducing apparatus of FIG. 13 during a special power setting process.

In the present embodiment, DVD-format code data is recorded onto an optical recording disk with a dye recording layer by focusing a laser beam emitted by a semiconductor laser, on the recording layer of the disk. The recorded data is reproduced from the disk by the optical recording/reproducing apparatus. The optical recording/reproducing apparatus of the present embodiment employs the eight-to-sixteen modulation (ESM) scheme as the data modulation method in order to carry out the pulse-width modulation (PWM) recording process for the write-once medium.

In the optical recording/reproducing apparatus of FIG. 13, the multi-pulse drive current in which data is modulated is supplied to the semiconductor laser, and the laser emits the laser beam to the disk. A sequence of data blocks, including marks and spaces, are recorded onto the recording layer of the disk by focusing the laser beam on the recording layer of the disk.

Generally, when recording data onto the optical recording media by using the multi-pulse laser driving waveform, the optical recording/reproducing apparatus of the present embodiment is required to maintain the accurate power levels of the laser optical output, including the peak power (Pw) corresponding to the peak-level drive current, the bottom power (Pb) corresponding to the bottom-level drive current, and the space power (Ps) corresponding to the space-level drive current.

Alternatively, in the multi-pulse laser driving waveform, the bottom power (Pb) and the space power (Ps) may be considered approximately equal to each other. However, the space power of the laser optical output must be detected, and it is necessary to set the space power at a relatively high level. Also, it is desired to set the bottom power as low as possible in order to achieve good jitter characteristics. Hence, the optical recording/reproducing apparatus of the present embodiment is configured to maintain the three power levels of the laser optical power, including the peak power (Pw), the bottom power (Pb), and the space power (Ps).

A description will now be provided of the automatic power control (APC) process, which is performed by the optical recording/reproducing apparatus of the present embodiment during a normal writing process.

As shown in FIG. 13, the optical recording/reproducing apparatus of the present embodiment generally comprises a central processing unit (CPU) 1, a laser diode (LD) 2, a photodetector (PD) 3, a laser diode driver (LDD) 4, a current-voltage converter 5, a sample/hold circuit 6, an analog-to-digital converter (ADC) 7, a laser drive waveform control unit (LDWC) 11, a bias current source (BCS) 12, a bottom-level current driver (BCD) 18, a space-level current source (SCS) 19, and a peak-level current source (PCS) 20.

In the optical recording/reproducing apparatus of FIG. 13, the CPU 1 sets a bottom-level increment current at the output of the bottom-level current driver (BCD) 18 by supplying a bottom-level control (BLC) signal to the BCD 18. The signal line through which the BLC signal is sent from the CPU 1 to the BCD 18 is designated by reference numeral 204. The signal line through which the bottom-level increment current is sent from the BCD 18 to the LDD 4 is designated by reference numeral 208.

The CPU 1 sets a peak-level increment current at the output of the peak-level current source (PCS) 20 by supplying a peak-level control (PLC) signal to the PCS 20. The signal line through which the PLC signal is sent from the CPU 1 to the PCS 20 is designated by reference numeral 207. The signal line through which the peak-level increment current is sent from the PCS 20 to the LDD 4 is designated by reference numeral 210.

The CPU 1 sets a space-level increment current at the output of the space-level current source (SCS) 19 by supplying a space-level control (SLC) signal to the SCS 19. The signal line through which the SLC signal is sent from the CPU 1 to the SCS 19 is designated by reference numeral 206. The signal line through which the space-level increment current is sent from the SCS 19 to the LDD 4 is designated by reference numeral 209.

The LDD 4 is required to supply a bias-level current, which is above an oscillation threshold value of the laser light source, to the laser diode (LD) 2. For this purpose, the CPU 1 sets a bias-level drive current at the output of the bias current source (BCS) 12 by supplying a bias-level control (BIASLC) signal to the BCS 12. The signal line through which the BIASLC signal is sent from the CPU 1 to the BCS 12 is designated by reference numeral 220. The signal line through which the bias-level drive current is sent from the BCS 12 to the LDD 4 is designated by reference numeral 221.

Specifically, each of the SCS 19 and the PCS 20 is configured by using a digital-to-analog converter (DAC). The digital space-level control signal from the CPU 1 is received at the SCS 19, and, in response to the control signal, the SCS 19 outputs the analog space-level increment current to the LDD 4. The digital peak-level control signal from the CPU 1 is received at the PCS 20, and, in response to the control signal, the PCS 20 outputs the analog peak-level increment current to the LDD 4.

The BCD 18 is configured so that the BCD 18 selectively outputs one of a plurality of bottom-level increment currents to the LDD 4 through the signal line 208 in response to control signals supplied by the CPU 1.

The LDD 4 receives the bias-level drive current from the signal line 221, the bottom-level increment current from the signal line 208, the space-level increment current from the signal line 209 and the peak-level increment current from the signal line 210, and, in response to the current signals, the LDD 4 supplies a selected one of the drive currents to the laser diode (LD) 2 at a time under the control of the CPU 1.

The laser drive waveform control (LDWC) unit 11 converts a sequence of input recording data blocks into an eight-to-sixteen modulation (ESM) signal as in the waveform indicated by (a) in FIG. 15. The LDWC unit 11 further generates a multi-pulse laser driving waveform as in the waveform indicated by (e) in FIG. 15. In accordance with the multi-pulse laser driving waveform, the LDWC unit 11 supplies a bottom-power enable (BPE) signal 201, a space-power enable (SPE) signal 202 and a peak-power enable (PPE) signal 203, to the LDD 4.

When the bottom-power enable (BPE) signal 201 is set in the high level (H), the LDD 4 supplies a sum of the bias-level drive current 221 and the bottom-level increment current 208 to the LD 2. The LD 2 at this time is driven to output the laser beam at the bottom power (Pb). When the space-power enable (SPE) signal 202 is set in the high level (H), the LDD 4 supplies a sum of the bias-level drive current 221 and the space-level increment current 209 to the LD 2. The LD 2 at this time is driven to output the laser beam at the space power (Ps). When the peak-power enable (PPE) signal 203 is set in the high level (H), the LDD 4 supplies a sum of the bias-level drive current 221 and the peak-level increment current 210 to the LD 2. The LD 2 at this time is driven to output the laser beam at the peak power (Pw). See the waveforms of the output signals of the corresponding elements of the optical recording/reproducing apparatus of FIG. 13, which are shown by (a) through (e) in FIG. 15.

When the drive current is supplied from the LDD 4 to the LD 2, the LD 2 emits the laser beam to the optical recording medium, so that the data is recorded onto or reproduced from the recording layer of the recording medium. The laser beam emitted by the LD 2 is received at the photodetector (PD) 3. The PD 3 outputs a monitoring current that is proportional to the laser optical power of the received laser beam. The monitoring current is supplied from the PD 3 to the current-voltage converter 5. The signal line through the monitoring current signal is sent from the PD 3 to the current-voltage converter 5 is designated by reference numeral 112.

The current-voltage converter 5 outputs a power-monitoring signal based on the monitoring current supplied by the PD 3. The signal line through the power monitoring signal is sent from the current-voltage converter 5 to the sample/hold circuit 6 is designated by reference numeral 113. By utilizing the power-monitoring signal 113 output by the current-voltage converter 5, the automatic power control (APC) process is performed by the optical recording/reproducing apparatus of the present embodiment.

In the optical recording/reproducing apparatus of FIG. 13, the CPU 1 is connected to the sample/hold circuit 6 through a signal line 211, and a space-power sample timing (SPST) signal is sent from the CPU 1 to the sample/hold circuit 6 through the signal line 211. When a long space having a maximum data length (in a case of the ESM scheme, 14T) is formed on the disk by the laser beam of the LD 2 during the normal recording process, the CPU 1 sets the space-power sample timing (SPST) signal in the high level (H). When the SPST signal is set in the high level (H), the power-monitoring signal 113 is sampled and held by the sample/hold circuit 6. The ADC 7 converts the power-monitoring signal, held by the sample/hold circuit 6, into a digital space-power sample (SPS) signal. The SPS signal is supplied from the ADC 7 to the CPU 1 through a signal line 214. See the waveforms indicated by (f) through (h) in FIG. 15.

The SPS signal output by the ADC 7 is received at the CPU 1, and the CPU 1 compares the received SPS signal with a reference value. The CPU 1 corrects the space-level control (SLC) signal 206, which is supplied to the space-level current source (SCS) 19, based on a difference between the SPS signal and the reference value. As the corrected SLC signal 206 is supplied to the SCS 19, the SCS 19 supplies a corrected space-level increment current to the LDD 4 so that the space power (Ps) of the laser optical output is maintained at a proper level. The LD 2 at this time is driven by the corrected space-level drive current supplied by the LDD 4, so as to emit the laser beam at the proper space power (Ps).

Further, in the present embodiment, the CPU 1 calculates a bottom-level drive current "Ib" and a peak-level drive current "Iw" based on the corrected space-level drive current and a derivative efficiency, which will be described below.

Figure 17:
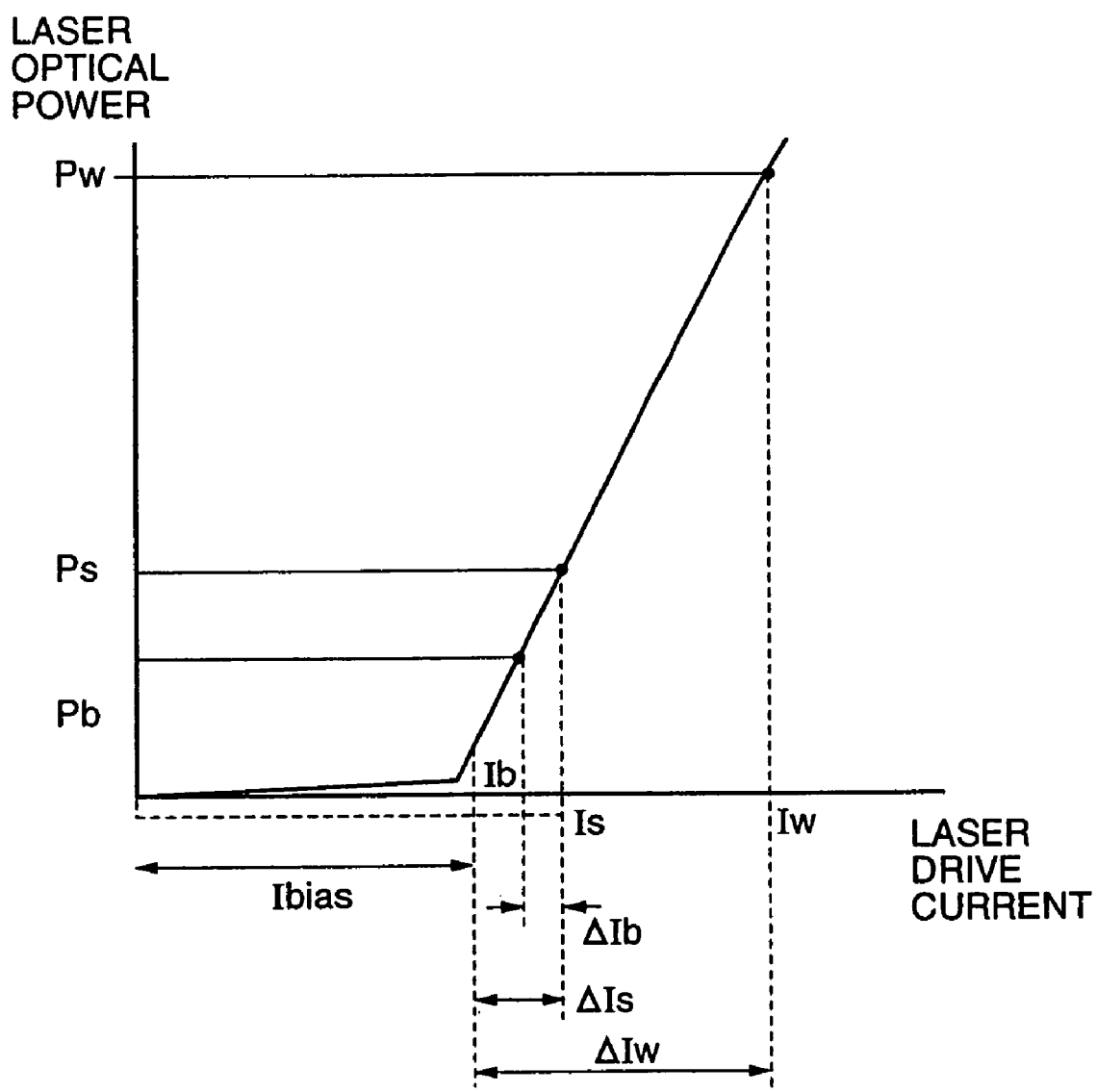
FIG. 17 is a diagram for explaining the light vs. current characteristics of a laser diode in the optical recording/reproducing apparatus of FIG. 13.

FIG. 17 shows a laser diode derivative efficiency of the light vs. current characteristics of the laser diode used by the optical recording/reproducing apparatus of FIG. 13.

Hereinafter, the derivative efficiency "η" of the LD 2 used by the optical recording/reproducing apparatus of the present embodiment, is defined as being a gradient ΔP/ΔI of the light vs. current characteristic curve as shown in FIG. 17.

Suppose that the bias-level drive current corresponding to the bias power, the bottom-level drive current corresponding to the bottom power Pb, the space-level drive current corresponding to the space power Ps, and the peak-level drive current corresponding to the peak power Pw are represented by "Ibias", "Ib", "Is", and "Iw", respectively. As is apparent from the light vs. current characteristic curve of FIG. 17, the bottom power "Pb" and the peak power "Pw" are represented by the following equations.

$$Pb = Ps - \eta \times (Is - Ib) \quad (11)$$

$$Pw = Ps + \eta \times (Iw - Is) \quad (12)$$

From the above equations (11) and (12), the bottom-level drive current "Ib" and the peak-level drive current "Iw" can be calculated in accordance with the following equations.

$$Ib = Is - (Ps - Pb)/\eta \quad (13)$$

$$Iw = Is + (Pw - Ps)/\eta \quad (14)$$

In the case of the APC process, the derivative efficiency "η" of the LD 2 is predetermined, and the calculation of the bottom-level drive current Ib and the peak-level drive current Iw is performed by using the predetermined derivative efficiency. As described above, the CPU 1 calculates the bottom-level drive current "Ib" and the peak-level drive current "Iw" based on the corrected space-level drive current and the derivative efficiency. Thereafter the CPU 1 sets the bottom-level control signal 204 and the peak-level control signal 207, which are respectively supplied to the bottom-level current driver 18 and the peak-level current source 20, to the proper values based on the calculated drive currents "Ib" and "Iw".

As described above, the LDD 4 supplies the sum of the bias-level drive current 221 and the bottom-level increment current 208 to the LD 2. Also, the LDD 4 supplies the sum of the bias-level drive current 221 and the space-level increment current 209 to the LD 2. Further, the LDD 4 supplies the sum of the bias-level drive current 221 and the peak-level increment current 210 to the LD 2. Suppose that the bias-level drive current 221, the space-level increment current 209 and the peak-level increment current 210 are represented by "ΔIb", "ΔIs" and "ΔIw", respectively. As is apparent from the characteristic curve shown in FIG. 17, the bottom-level drive current "Ib", the space-level drive current "Is" and the peak-level drive current "Iw" can be calculated in accordance with the following equations.

$$Ib = Ibias + \Delta Ib \quad (15)$$

$$Is = Ibias + \Delta Is \quad (16)$$

$$Iw = Ibias + \Delta Iw \quad (17)$$

In the present embodiment, a time period for which the above-described APC process is performed is shorter than a time period for which a special power setting process (which will be described later) is performed. For example, in the present embodiment, the space power sample (SPS) signal 214, output by the ADC 7, is received by the CPU 1 when a long space having a maximum data length (14T) is formed on the disk by the laser beam of the LD 2. As described above, at this time, the space-power sample timing (SPST) signal is set in the high level by the CPU 1.

According to the DVD standards, the data length 14T of a long space is equal to the data length of a sync code in the sequence of the input recording data blocks, and the sampling and holding of the space power in the APC process will be performed once for every two sync frames (1488T).

Strictly speaking, either a mark having the maximum data length 14T or a space having the maximum data length 14T is selected so as to meet the requirement that the digital sum value (DSV) be equal to zero. The sampling and holding of the space power in the APC process is not always performed once for every two sync frames (1488T). However, for the sake of simplicity, it is assumed that, in the present embodiment, a mark having the data length 14T and a space having the data length 14T are alternately selected with equal probabilities.

In the optical recording/reproducing apparatus of the present embodiment, the CPU 1 calculates the bottom-level drive current "Ib" and the peak-level drive current "Iw" based on the corrected space-level drive current (obtained when forming a long space having the maximum data length 14T on the disk by the laser beam of the LD 2) and the predetermined derivative efficiency. Accordingly, the optical recording/reproducing apparatus of the present embodiment is effective in maintaining the accurate recording power levels of the laser optical power, including the peak power, the space power and the bottom power, even when the light-receiving module with the limited bandwidth is used.

Figure 18:
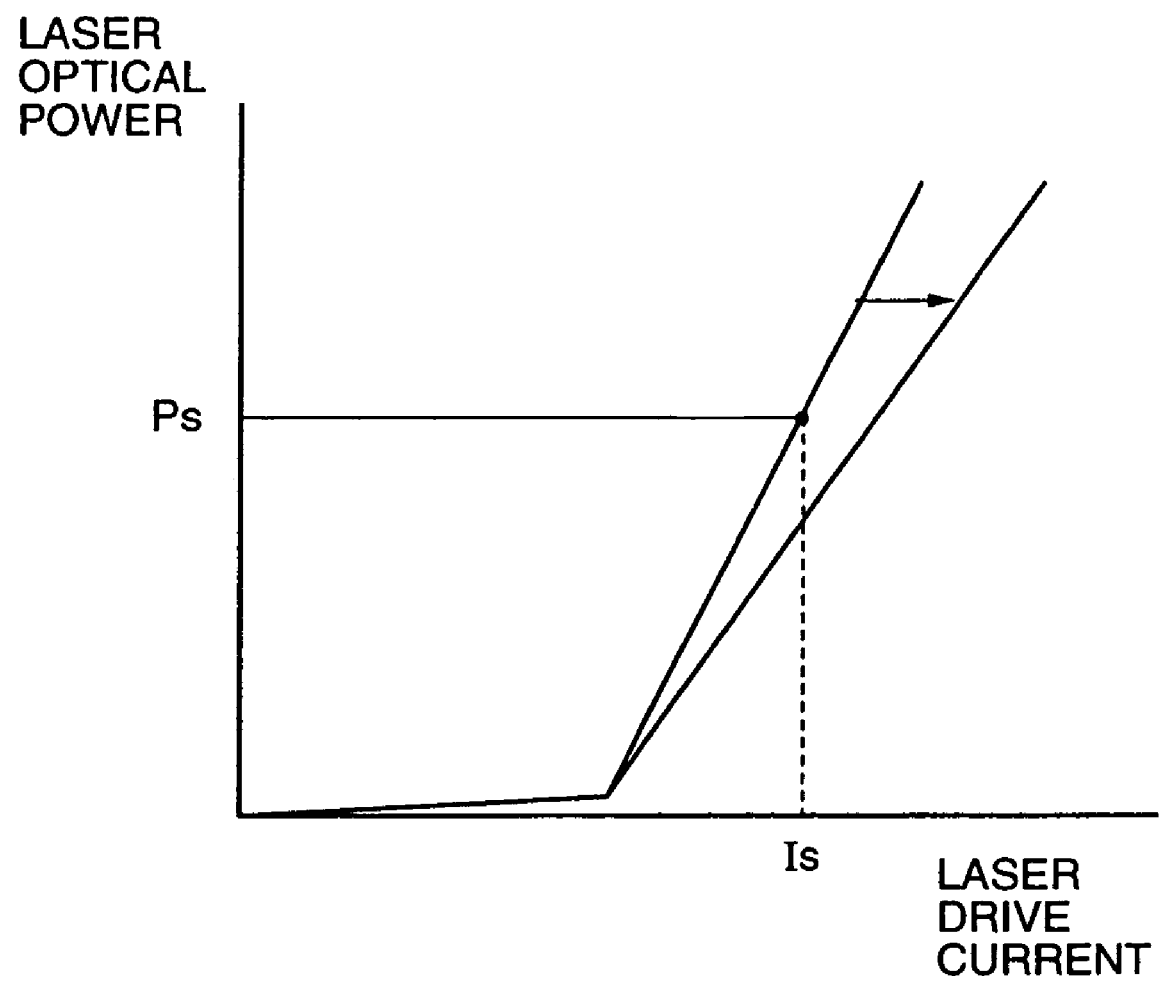
FIG. 18 is a diagram for explaining the light vs. current characteristics of the laser diode with a variation of the derivative efficiency during the writing mode.

FIG. 18 shows the light vs. current characteristics of the laser diode with a variation of the derivative efficiency during the writing mode.

As shown in FIG. 18, the light vs. current characteristic curve tends to shift and bend to the right with increasing temperature, and the derivative efficiency of the laser diode tends to vary with increasing temperature. If the derivative efficiency varies, the errors of the calculated bottom-level drive current "Ib" and the calculated peak-level drive current "Iw" will not be negligible.

As previously described, the conventional apparatus, disclosed in Japanese Laid-Open Patent Application No. 9-171631, carries out the power control process in which the bottom-level drive current to the laser diode is corrected by using the detected peak power and the detected space power, in order to take measures against a variation of the derivative efficiency. However, according to the above-mentioned power control process, a problem arises in that the formation of a mark on the recording layer of the disk when the laser diode is driven at the peak-level drive current in the non-pulse condition becomes deficient.

In order to eliminate the above problem of the conventional apparatus, the optical recording/reproducing apparatus of the present embodiment is configured so that the bottom-level current driver (BCD) 18 selectively outputs one of the plurality of bottom-level increment currents to the LDD 4 through the signal line 208 in response to the control signals supplied by the CPU 1. A specific one (which is equal to the peak-level increment current) among the plurality of bottom-level increment currents, which is supplied from the BCD 18 to the LDD 4 during a special power setting process, results in the peak-level drive current supplied to the LD 2 by the LDD 4. The peak power level of the laser optical output when the specific bottom-level increment current is supplied to the LDD 4 by the BCD 18, is sampled and held by the sample/hold circuit 6, and the corresponding peak power sample (PPS) signal is received at the CPU 1. Then, the CPU 1 calculates a derivative efficiency of the LD 2 based on the space power sample (SPS) obtained during the normal APC process and the peak power sample (PPS) obtained during the special power setting process.

Next, a description will be provided of the special power setting process executed by the optical recording/reproducing apparatus of the present embodiment with reference to FIG. 14 and FIG. 16.

As shown in FIG. 14, the bottom-level current driver (BCD) 18 in the present embodiment generally comprises a first digital-to-analog converter (DAC) 82, a second digital-to-analog converter (DAC) 83, and a switch 84. The switch 84 has a high-level state and a low-level state. The bottom-level select (BLS) signal output by the CPU 1 is sent to the switch 84 through the signal line 215, and one of the high-level (H) state and the low-level (L) state is selected at the switch 84 in accordance with the bottom-level select (BLS) signal 215 supplied by the CPU 1.

The first DAC 82 has an input connected to the signal line 204 and an output connected to the switch 84. When the high-level (H) state of the switch 84 is selected according to the BLS signal 215, the BCD 18 supplies an output signal of the first DAC 82 to the LDD 4 through the signal line 208. The second DAC 83 has an input connected to the signal line 205 and an output connected to the switch 84. When the low-level (L) state of the switch 84 is selected according to the BLS signal 215, the BCD 18 supplies an output signal of the second DAC 83 to the LDD 4 through the signal line 208.

The normal bottom-level control (BLC) signal, which is sent through the signal line 204 by the CPU 1 when producing the normal bottom power (Pb) of the laser optical output, is received at the first DAC 82, and, in response to the normal BLC signal, the DAC 82 outputs the normal bottom-level increment current (BIC) to the switch 84. Usually when the bottom power (Pb) of the laser optical output is produced, the high-level (H) state of the switch 84 is selected according to the BLS signal 215.

A second bottom-level control (BLC) signal, which is sent through the signal line 205 by the CPU 1 during the special power setting process, is received at the second DAC 83, and, in response to the second BLC signal, the DAC 83 outputs a second bottom-level increment current (BIC) that is equal to the peak-level increment current (PIC), to the switch 84.

In the present embodiment, the frequency at which the execution of the special power setting process is initiated by the CPU 1 is smaller than the frequency at which the execution of the normal APC process is initiated by the CPU 1. An optimal value of the frequency of execution of the special power setting process may be experimentally determined depending on time-dependent variations of the derivative efficiency of the LD 2.

At a start of the special power setting process, the CPU 1 sends a second BLC signal 205 to the second DAC 83, and the second DAC 83 outputs a second BIC (equal to the PIC) to the switch 84. The low state (L) of the switch 84 is selected according to the BLS signal 215, and the second BIC, supplied to the LDD 4 by the BCD 18, results in the peak power (Pw) of the laser beam of the LD 2. See the state (2) indicated in FIG. 16.

In the above-described condition, when recording a 14T mark data "14TM" onto the disk, the CPU 1 sets the BLS signal 215 in the low state (L), and the DAC 83 supplies the second BIC to the LDD 4 through the signal line 208. At the same time, the CPU 1 sets the SPST signal 211 in the high state (H). Hence, only during the 14T period, the peak power "Pw" of the laser beam of the LD 2 is produced. In other words, during the special power setting process, the LD 2 is driven in the non-pulse condition by the LDD 4 to emit the peak-power laser beam to the disk.

In the above-described condition, a corresponding peak power sample (PPS) signal 214, output by the ADC 7, is received by the CPU 1. The CPU 1 stores the received PPS signal in a portion of the memory that is different from a memory portion in which the SPS signal obtained during the APC process is stored.

Immediately after the 14T mark data is recorded onto the disk, the CPU 1 sets the BLS signal 215 in the high state (H). The high state (H) of the switch 84 is selected according to the BLS signal 215 so as to produce the normal bottom power "Pb" of the laser beam of the LD 2. See the state (3) indicated in FIG. 16.

In the present embodiment, the 14T mark data, recorded onto the disk during the special power setting, tends to become deficient. However, only the 14T period during the special power setting process, the peak-power laser beam of the LD 2 is driven in the non-pulse condition. If the time interval between the special power setting cycles is set to a relatively long time and the error correcting code function is used when reproducing the data from the disk, the deterioration of the jitter characteristics will be negligible.

In the present embodiment, the CPU 1 calculates a derivative efficiency "η" of the LD 2 based on the space power sample (SPS) signal (=Ps), obtained during the normal APC process, and the peak power sample (PPS) signal (=Pw), obtained during the special power setting process, and the corresponding drive currents (Is, Iw), by using the following equation.

$$\eta=(Pw-Ps)/(Iw-Is) \tag{18}$$

See the light vs. current characteristics shown in FIG. 17, for an example of the calculation of the derivative efficiency used by the present embodiment at this time.

If the setting of the second DAC 83 for the second bottom-power output (equal to the peak power output) can be performed timely, the second bottom-power laser driving may be performed within a period the 14T mark data is output.

In the above-described embodiment, the bottom-level current driver (BCD) 18 selectively outputs one of the plurality of bottom-level increment currents to the LDD 4 in response to the bottom-level select signal 215 and the bottom-level control signals 204 and 205, the plurality of bottom-level increment currents including the normal bottom-level increment current supplied to the LDD 4 during the normal APC process and the second bottom-level increment current supplied to the LDD 4 during the special power setting process, the second bottom-level increment current supplied to the LDD 4 resulting in the peak-level drive current to the LD 2.

Accordingly, the optical recording/reproducing apparatus of the present embodiment can provide accurate calculation of the derivative efficiency with little calculation errors and prevent the deterioration of the jitter characteristics and the deficiency of the mark formation. The optical recording/reproducing apparatus of the present embodiment is effective in maintaining the accurate recording power levels of the laser optical output, including the peak power, the space power and the bottom power, even when the light-receiving module with the limited bandwidth is used.

Further, in the optical recording/reproducing apparatus of the present embodiment, the BCD 18 is configured so that the normal bottom-level increment current, supplied from the BCD 18 to the LDD 4, is changed to the second bottom-level increment current during the period a mark data having the maximum data length 14T is formed on the disk. Therefore, the deterioration of the jitter characteristics when reproducing the data from the disk will be negligible.

Figure 19:
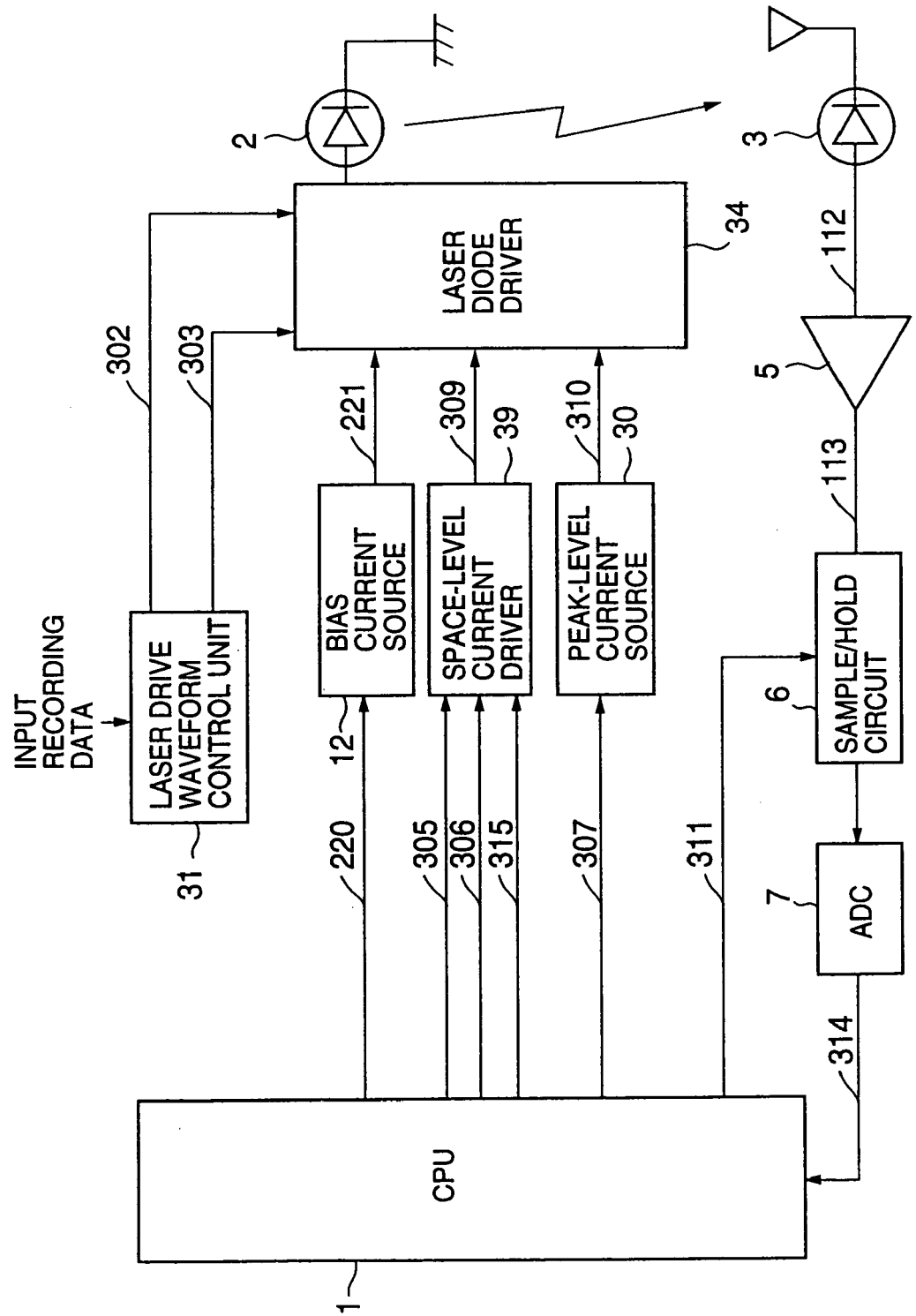
FIG. 19 is a block diagram of another preferred embodiment of the optical recording/reproducing apparatus of the invention.
Figure 20:
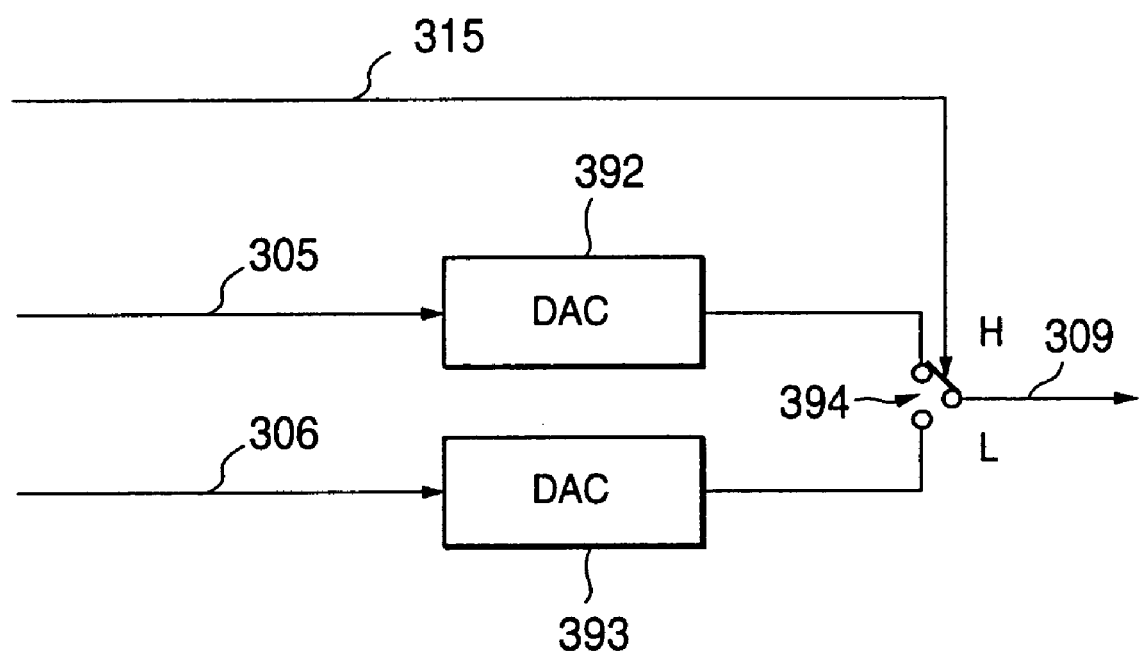
FIG. 20 is a block diagram of a space-level current driver in the optical recording/reproducing apparatus of FIG. 19.
Figure 21:
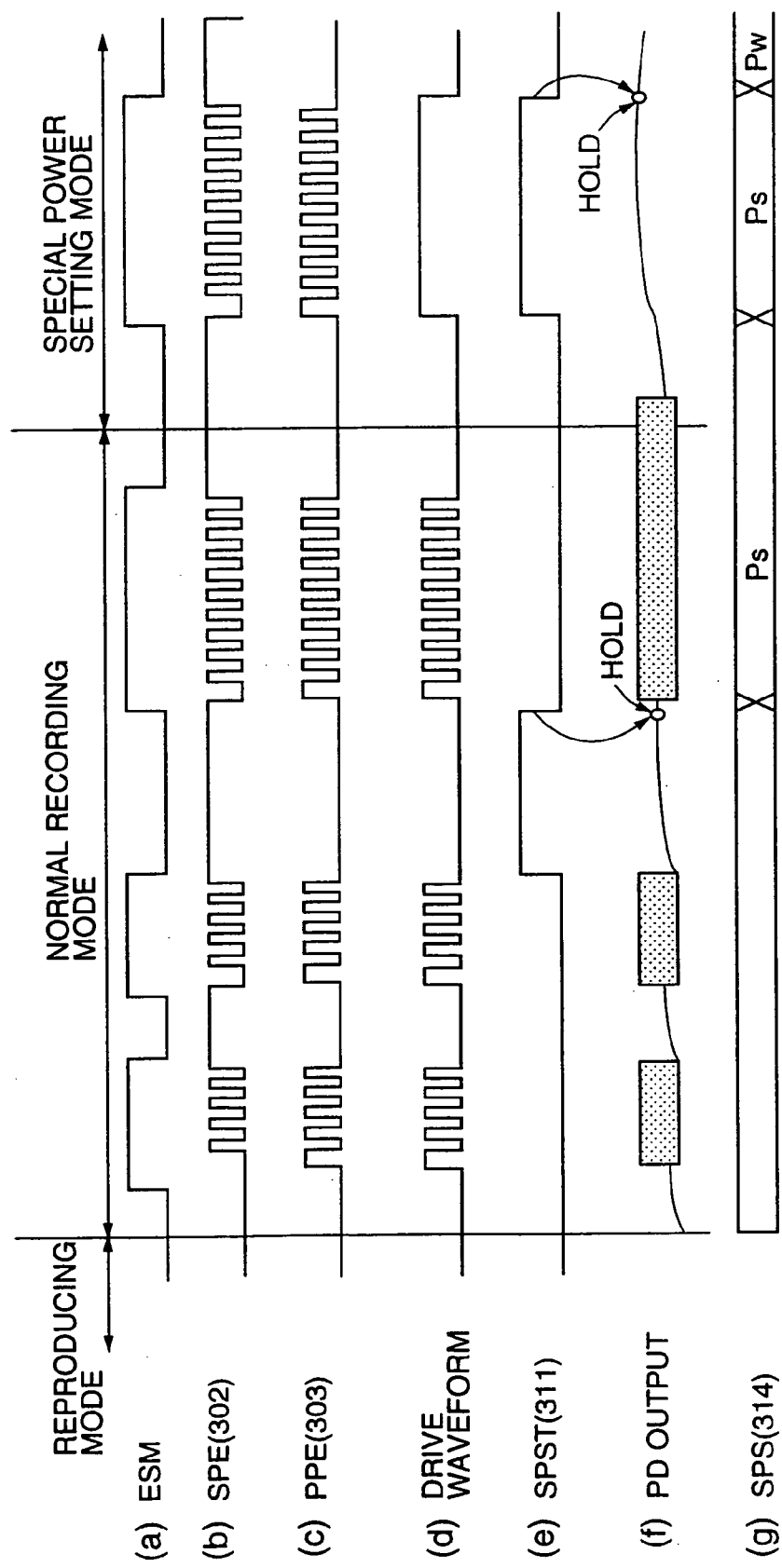
FIG. 21 is a time chart for explaining the waveforms of output signals of the elements of the optical recording/reproducing apparatus of FIG. 19 during the normal writing mode and during the efficiency calculation mode.

Next, a description will be provided of another preferred embodiment of the optical recording/reproducing apparatus of the invention with reference to FIG. 19 through FIG. 21.

FIG. 19 shows the optical recording/reproducing apparatus of the present embodiment. FIG. 20 shows a space-level current driver in the optical recording/reproducing apparatus of FIG. 19. FIG. 21 shows the exemplary waveforms of the output signals of the elements of the optical recording/reproducing apparatus of FIG. 19 during the normal writing mode and during the special power setting mode.

In the present embodiment, in the multi-pulse laser driving waveform, the bottom power (Pb) and the space power (Ps) is considered approximately equal to each other. In other words, the optical recording/reproducing apparatus of the present embodiment is configured to maintain the two power levels of the laser optical power, including the peak power (Pw) and the space power (Ps).

A description will now be provided of the automatic power control (APC) process, which is performed by the optical recording/reproducing apparatus of the present embodiment during a normal writing process.

As shown in FIG. 19, the optical recording/reproducing apparatus of the present embodiment generally comprises a central processing unit (CPU) 1, a laser diode (LD) 2, a photodetector (PD) 3, a laser diode driver (LDD) 34, a current-voltage converter 5, a sample/hold circuit 6, an analog-to-digital converter (ADC) 7, a laser drive waveform control unit (LDWC) 31, a bias current source (BCS) 12, a space-level current driver (SCD) 39, and a peak-level current source (PCS) 30.

In the optical recording/reproducing apparatus of FIG. 19, the CPU 1 sets a peak-level increment current at the output of the peak-level current source (PCS) 30 by supplying a peak-level control (PLC) signal to the PCS 30. The signal line through which the PLC signal is sent from the CPU 1 to the PCS 30 is designated by reference numeral 307. The signal line through which the peak-level increment current is sent from the PCS 30 to the LDD 34 is designated by reference numeral 310.

The CPU 1 sets a normal space-level increment current at the output of the space-level current driver (SCD) 39 by supplying a first space-level control (SLC) signal to the SCD 39. The signal line through which the first SLC signal is sent from the CPU 1 to the SCD 39 is designated by reference numeral 305. Further, the CPU 1 sets a second space-level increment current at the output of the SCD 39 by supplying a second space-level control (SLC) signal to the SCD 39. The signal line through which the second SLC signal is sent from the CPU 1 to the SCD 39 is designated by reference numeral 306. The signal line through which one of the normal and second SIC currents is sent from the SCD 39 to the LDD 34 is designated by reference numeral 309.

The LDD 34 is required to supply a bias-level current, which is above an oscillation threshold value of the laser light source, to the laser diode (LD) 2. For this purpose, the CPU 1 sets a bias-level drive current at the output of the bias current source (BCS) 12 by supplying a bias-level control (BIASLC) signal to the BCS 12. The signal line through which the BIASLC signal is sent from the CPU 1 to the BCS 12 is designated by reference numeral 220. The signal line through which the bias-level drive current is sent from the BCS 12 to the LDD 34 is designated by reference numeral 221.

As described above, the SCD 39 is configured so that the SCD 39 selectively outputs one of the normal and second space-level increment currents (SIC) to the LDD 34 through the signal line 309 in response to control signals supplied by the CPU 1.

The LDD 34 receives the bias-level drive current from the signal line 221, the space-level increment current from the signal line 309 and the peak-level increment current from the signal line 310, and, in response to the current signals, the LDD 34 supplies a selected one of the drive currents to the laser diode (LD) 2 at a time under the control of the CPU 1.

The laser drive waveform control (LDWC) unit 31 converts a sequence of input recording data blocks into an eight-to-sixteen modulation (ESM) signal as in the waveform indicated by (a) in FIG. 21. The LDWC unit 31 further generates a multi-pulse laser driving waveform as in the waveform indicated by (d) in FIG. 21. In accordance with the multi-pulse laser driving waveform, the LDWC unit 31 supplies a space-power enable (SPE) signal 302 and a peak-power enable (PPE) signal 303, to the LDD 34.

When the space-power enable (SPE) signal 302 is set in the high level (H), the LDD 34 supplies a sum of the bias-level drive current 221 and the space-level increment current 309 to the LD 2. The LD 2 at this time is driven to output the laser beam at the space power (Ps). When the peak-power enable (PPE) signal 303 is set in the high level (H), the LDD 34 supplies a sum of the bias-level drive current 221 and the peak-level increment current 310 to the LD 2. The LD 2 at this time is driven to output the laser beam at the peak power (Pw). See the waveforms of the output signals of the corresponding elements of the optical recording/reproducing apparatus of FIG. 19, which are shown by (a) through (d) in FIG. 21.

When the drive current is supplied from the LDD 34 to the LD 2, the LD 2 emits the laser beam to the optical recording medium, so that the data is recorded onto or reproduced from the recording layer of the recording medium. The laser beam emitted by the LD 2 is received at the photodetector (PD) 3. The PD 3 outputs a monitoring current that is proportional to the laser optical power of the received laser beam. The monitoring current 112 is supplied from the PD 3 to the current-voltage converter 5.

The current-voltage converter 5 outputs a power-monitoring signal 113 to the sample/hold circuit 6 based on the monitoring current 112 supplied by the PD 3. By utilizing the power-monitoring signal 113 output by the current-voltage converter 5, the automatic power control (APC) process is performed by the optical recording/reproducing apparatus of the present embodiment.

In the optical recording/reproducing apparatus of FIG. 19, the CPU 1 is connected to the sample/hold circuit 6 through a signal line 311, and a space-power sample timing (SPST) signal is sent from the CPU 1 to the sample/hold circuit 6 through the signal line 311. When a long space having a maximum data length (in a case of the ESM scheme, 14T) is formed on the disk by the laser beam of the LD 2 during the normal recording process, the CPU 1 sets the space-power sample timing (SPST) signal in the high level (H). When the SPST signal is set in the high level (H), the power-monitoring signal 113 is sampled and held by the sample/hold circuit 6. The ADC 7 converts the power-monitoring signal, held by the sample/hold circuit 6, into a digital space-power sample (SPS) signal. The SPS signal is supplied from the ADC 7 to the CPU 1 through a signal line 314. See the waveforms indicated by (e) through (g) in FIG. 21.

The SPS signal output by the ADC 7 is received at the CPU 1, and the CPU 1 compares the received SPS signal with a reference value. The CPU 1 corrects the space-level control (SLC) signal 305, which is supplied to the space-level current driver (SCD) 39, based on a difference between the SPS signal and the reference value. As the corrected SLC signal 305 is supplied to the SCD 39, the SCD 39 supplies a corrected space-level increment current to the LDD 34 so that the space power (Ps) of the laser optical output is maintained at a proper level. The LD 2 at this time is driven by the corrected space-level drive current supplied by the LDD 34, so as to emit the laser beam at the proper space power (Ps).

Further, in the present embodiment, the CPU 1 calculates a peak-level drive current "Iw" based on the corrected space-level drive current and the derivative efficiency of the laser diode by using the above equation (12).

As previously described, the derivative efficiency "η" of the LD 2 used by the optical recording/reproducing apparatus of the present embodiment, is defined as being a gradient ΔP/ΔI of the light vs. current characteristic curve as shown in FIG. 17.

In the case of the APC process, the derivative efficiency "η" of the LD 2 is predetermined, and the calculation of the peak-level drive current Iw is performed by using the predetermined derivative efficiency. As described above, the CPU 1 calculates the peak-level drive current "Iw" based on the corrected space-level drive current and the derivative efficiency. Thereafter the CPU 1 sets the peak-level control signal 307, which is supplied to the peak-level current source 30, to the proper value based on the calculated drive current "Iw".

As described above, the LDD 34 supplies the sum of the bias-level drive current 221 and the space-level increment current 309 to the LD 2. Further, the LDD 34 supplies the sum of the bias-level drive current 221 and the peak-level increment current 310 to the LD 2. The space-level drive current "Is" and the peak-level drive current "Iw" can be calculated in accordance with the above equations (16) and (17).

In the present embodiment, a time period for which the above-described APC process is performed is shorter than a time period for which a special power setting process (which will be described later) is performed. For example, in the present embodiment, the space power sample (SPS) signal 314, output by the ADC 7, is received by the CPU 1 when a long space having a maximum data length (14T) is formed on the disk by the laser beam of the LD 2. As described above, at this time, the space-power sample timing (SPST) signal is set in the high level by the CPU 1.

In the optical recording/reproducing apparatus of the present embodiment, the CPU 1 calculates the peak-level drive current "Iw" based on the corrected space-level drive current and the predetermined derivative efficiency. Accordingly, the optical recording/reproducing apparatus of the present embodiment is effective in maintaining the accurate recording power levels of the laser optical power, including the peak power and the space power, even when the light-receiving module with the limited bandwidth is used.

In the present embodiment, the SCD 39 is configured so that the SCD 39 selectively outputs one of the plurality of space-level increment currents to the LDD 34 through the signal line 309 in response to the control signals supplied by the CPU 1. A specific one (which is equal to the peak-level increment current) among the plurality of space-level increment currents, which is supplied from the SCD 39 to the LDD 34 during a special power setting process, results in the peak-level drive current supplied to the LD 2 by the LDD 34. The peak power level of the laser optical output when the specific space-level increment current is supplied to the LDD 34 by the CSD 39, is sampled and held by the sample/hold circuit 6, and the corresponding peak power sample (PPS) signal is received at the CPU 1. Then, the CPU 1 calculates a derivative efficiency of the LD 2 based on the space power sample (SPS) obtained during the normal APC process and the peak power sample (PPS) obtained during the special power setting process.

Next, a description will be provided of the special power setting process executed by the optical recording/reproducing apparatus of the present embodiment with reference to FIG. 20 and FIG. 21.

As shown in FIG. 20, the space-level current driver (SCD) 39 in the present embodiment generally comprises a first digital-to-analog converter (DAC) 392, a second digital-to-analog converter (DAC) 393, and a switch 394. The switch 394 has a high-level state and a low-level state. The space-level select (SLS) signal output by the CPU 1 is sent to the switch 394 through the signal line 315, and one of the high-level (H) state and the low-level (L) state is selected at the switch 394 in accordance with the SLS signal 315 supplied by the CPU 1.

The first DAC 392 has an input connected to the signal line 305 and an output connected to the switch 394. When the high-level (H) state of the switch 394 is selected according to the SLS signal 315, the SCD 39 supplies an output signal of the first DAC 392 to the LDD 34 through the signal line 309. The second DAC 393 has an input connected to the signal line 306 and an output connected to the switch 394. When the low-level (L) state of the switch 394 is selected according to the SLS signal 315, the SCD 39 supplies an output signal of the second DAC 393 to the LDD 34 through the signal line 309.

The normal space-level control (SLC) signal, which is sent through the signal line 305 by the CPU 1 when producing the normal space power (Ps) of the laser optical output, is received at the first DAC 392, and, in response to the normal SLC signal, the DAC 392 outputs the normal space-level increment current (SIC) to the switch 39. Usually when the space power (Ps) of the laser optical output is produced, the high-level (H) state of the switch 394 is selected according to the SLS signal 315.

A second space-level control (SLC) signal, which is sent through the signal line 306 by the CPU 1 during the special power setting process, is received at the second DAC 393, and, in response to the second SLC signal, the DAC 393 outputs a second space-level increment current (SIC) that is equal to the peak-level increment current (PIC), to the switch 394.

In the present embodiment, the frequency at which the execution of the special power setting process is initiated by the CPU 1 is smaller than the frequency at which the execution of the normal APC process is initiated by the CPU 1. An optimal value of the frequency of execution of the special power setting process may be experimentally determined depending on time-dependent variations of the derivative efficiency of the LD 2.

At a start of the special power setting process, the CPU 1 sends a second SLC signal 306 to the second DAC 393, and the second DAC 393 outputs a second SIC (that is equal to the PIC) to the switch 394. The low state (L) of the switch 394 is selected according to the SLS signal 315, and the second SIC, supplied to the LDD 34 by the SCD 39, results in the peak power (Pw) of the laser beam of the LD 2.

In the above-described condition, when recording a long mark data having the maximum data length 14T onto the disk, the CPU 1 sets the SLS signal 315 in the low state (L), and the DAC 393 supplies the second SIC to the LDD 34 through the signal line 309. At the same time, the CPU 1 sets the SPST signal 311 in the high state (H). Hence, only during the 14T period, the peak power "Pw" of the laser beam of the LD 2 is produced. In other words, during the special power setting process, the LD 2 is driven in the non-pulse condition by the LDD 34 to emit the peak-power laser beam to the disk.

In the above-described condition, a corresponding peak power sample (PPS) signal 314, output by the ADC 7, is received by the CPU 1. The CPU 1 stores the received PPS signal in a portion of the memory that is different from a memory portion which stores the SPS signal obtained during the APC process.

Immediately after the 14T mark data is recorded onto the disk, the CPU 1 sets the SLS signal 315 in the high state (H). The high state (H) of the switch 394 is selected according to the SLS signal 315 so as to produce the normal space power "Ps" of the laser beam of the LD 2.

In the present embodiment, the CPU 1 calculates a derivative efficiency "η" of the LD 2 based on the space power sample (SPS) signal (=Ps), obtained during the normal APC process, and the peak power sample (PPS) signal (=Pw), obtained during the special power setting process, and the corresponding drive currents (Is, Iw), by using the above equation (18).

If the setting of the second DAC 393 for the second space-power output (equal to the peak power output) can be performed timely, the second space-power laser driving may be performed within a period the 14T mark data is output.

In the above-described embodiment, the space-level current driver (SCD) 39 selectively outputs one of the plurality of space-level increment currents to the LDD 34 in response to the space-level select (SLS) signal 315 and the space-level control signals 305 and 306, the plurality of space-level increment currents including the normal space-level increment current supplied to the LDD 34 during the normal APC process and the second space-level increment current supplied to the LDD 34 during the special power setting process, the second space-level increment current, supplied to the LDD 34, resulting in the peak-level drive current to the LD 2.

Accordingly, the optical recording/reproducing apparatus of the present embodiment can provide accurate calculation of the derivative efficiency with little calculation errors and prevent the deterioration of the jitter characteristics and the deficiency of the mark formation. The optical recording/reproducing apparatus of the present embodiment is effective in maintaining the accurate recording power levels of the laser optical output, including the peak power and the space power even when the light-receiving module with the limited bandwidth is used.

Further, in the optical recording/reproducing apparatus of the present embodiment, the SCD 39 is configured so that the normal space-level increment current (the normal SIC), supplied from the SCD 39 to the LDD 34, is changed to the second space-level increment current (the second SIC) during the period a mark data having the maximum data length 14T is formed on the disk. Therefore, the deterioration of the jitter characteristics when reproducing the data from the disk will be negligible.

Next, a description will now be provided of the basic concept of the optical recording/reproducing apparatus of the invention with reference to FIG. 19 and FIG. 12B.

FIG. 12B shows the basic concept of the optical recording/reproducing apparatus of the invention when a sequence of recording data blocks is recorded onto write-once read-many optical recording media (for example, a CD-R disk). For example, the configuration of the optical recording/reproducing apparatus shown in FIG. 19 is used to achieve the basic concept of the invention shown in FIG. 12B.

As indicated by (c) in FIG. 12B, the semiconductor laser driver (or the LDD 34) of the optical reproducing/reproducing apparatus supplies a selected one of a plurality of drive currents, including a first-level drive current and a second-level drive current, to the semiconductor laser (or the LD 2) to control the emission of a laser beam by the laser.

The current driver (or the SCD 39) of the optical recording/reproducing apparatus selectively outputs one of a plurality of increment currents to the laser driver in response to control signals, the plurality of increment currents including a first increment current supplied to the laser driver during the automatic power control (APC) process and a second increment current supplied to the laser driver during the special power setting process.

The detection unit (or the elements 3, 5, 6 and 7 in FIG. 19) detects a first power sample signal (or the BPS signal 314), at a first sampling point (indicated by "A" in FIG. 12B) of the waveform, from the laser beam emitted when the first increment current (or the normal SIC) is supplied to the laser driver. The detection unit detects a second power sample signal (or the PPS signal 314), at a second sampling point (indicated by "B" in FIG. 12B) of the waveform, from the laser beam emitted when the second increment current (or the second SIC) is supplied to the laser driver.

The calculation unit (or the CPU 1) calculates a derivative efficiency of the laser based on the first and second power sample signals (the BPS and PPS signals 314) detected by the detection unit, so that the drive currents of the laser driver, supplied to the laser, are controlled based on the calculated derivative efficiency.

Figure 22:
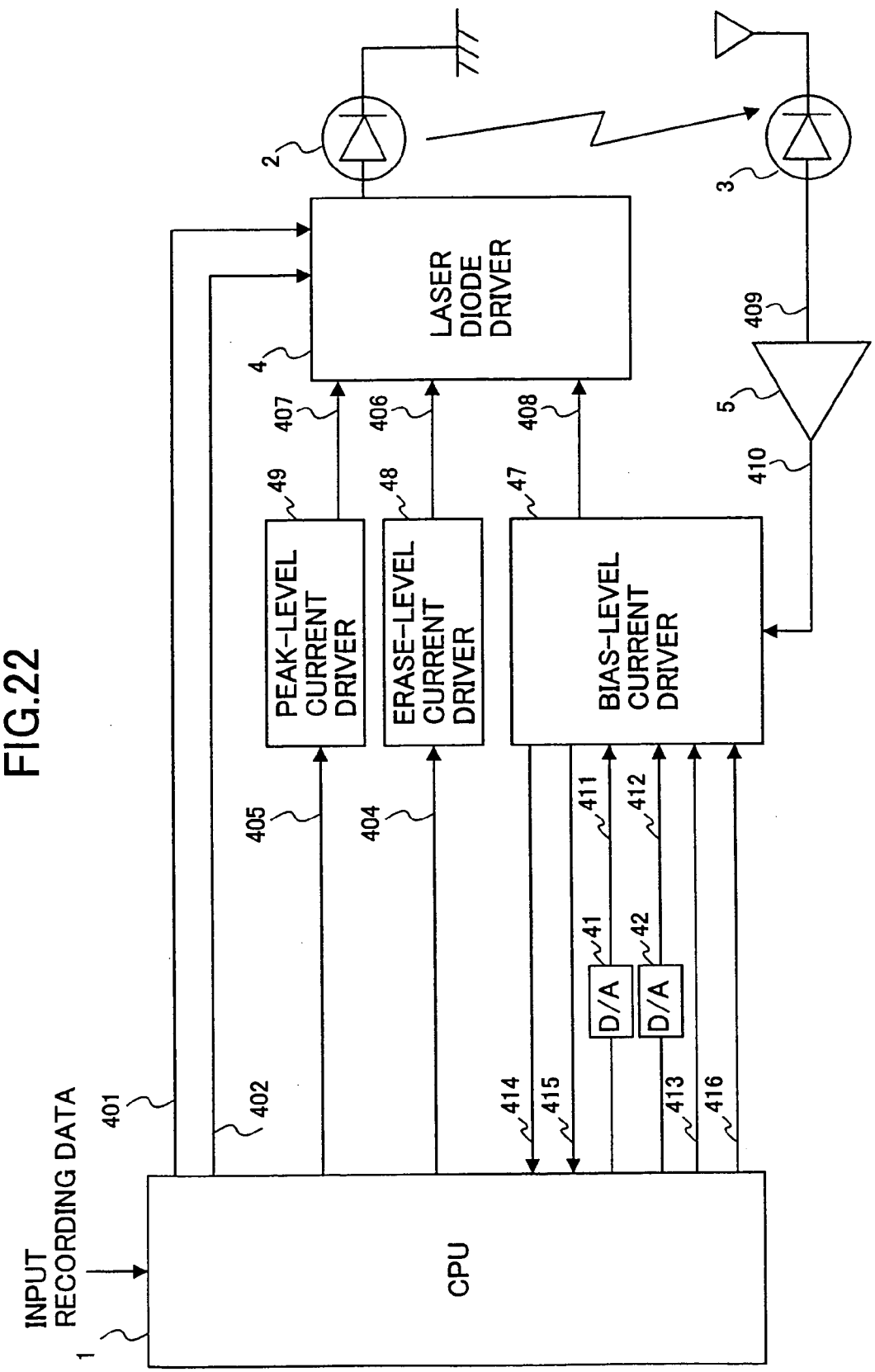
FIG. 22 is a block diagram of another preferred embodiment of the optical recording/reproducing apparatus of the invention.

Next, FIG. 22 shows another preferred embodiment of the optical recording/reproducing apparatus of the invention.

Figure 23:
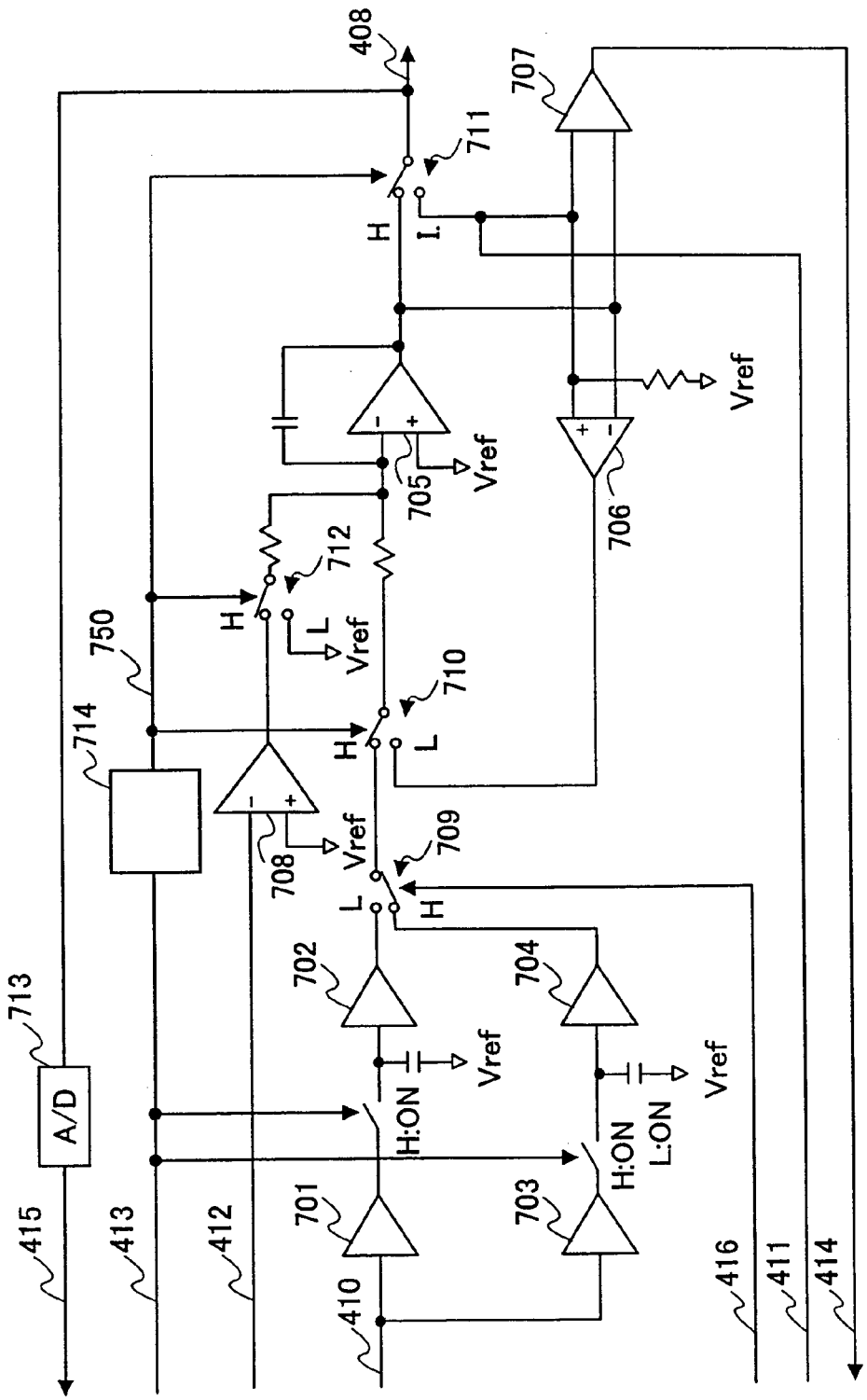
FIG. 23 is a circuit diagram of a bias-level current driver in the optical recording/reproducing apparatus of FIG. 22.
Figure 24:
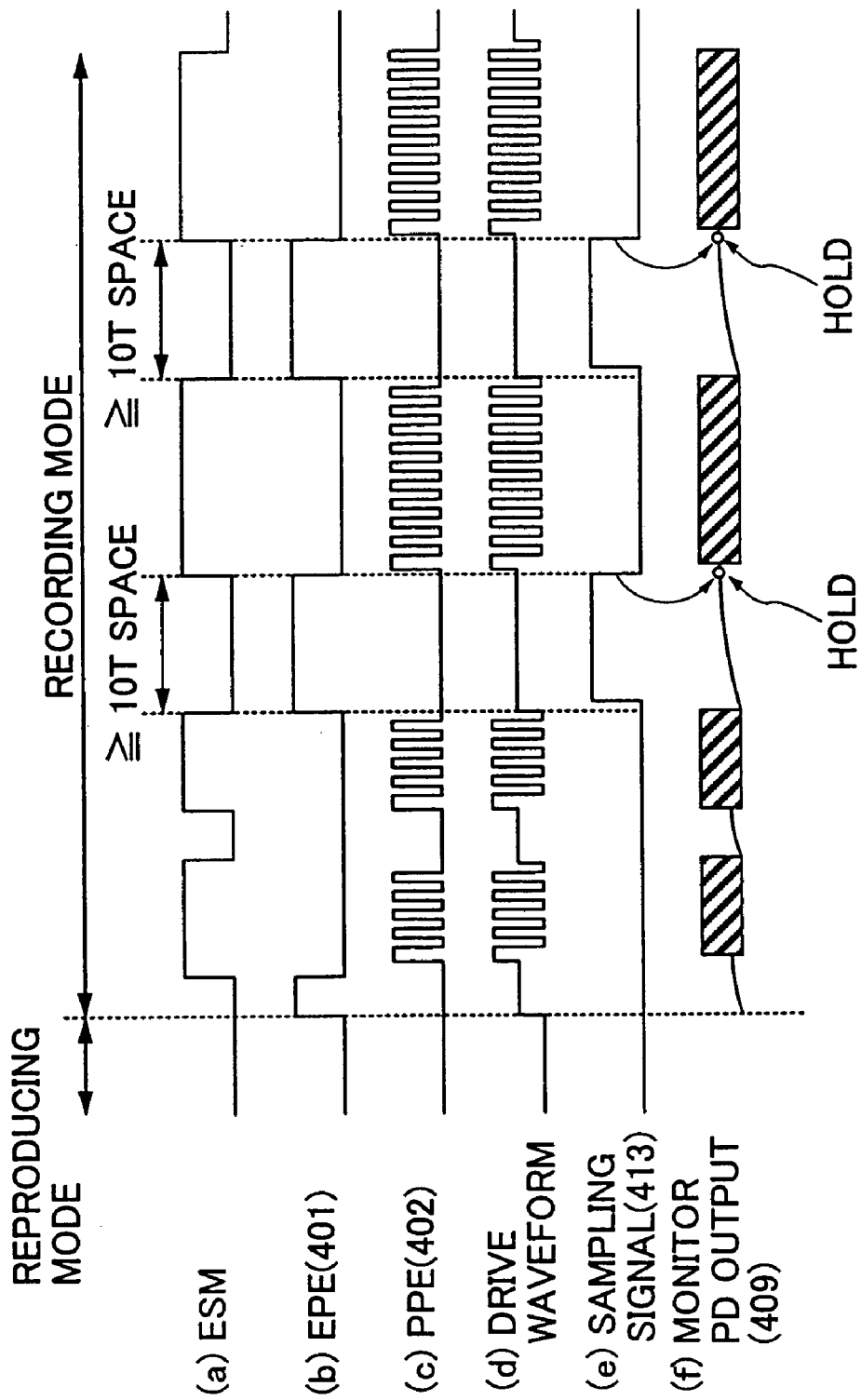
FIG. 24 is a time chart for explaining exemplary waveforms of the output signals of the CPU of the optical recording/reproducing apparatus of FIG. 22.
Figure 25:
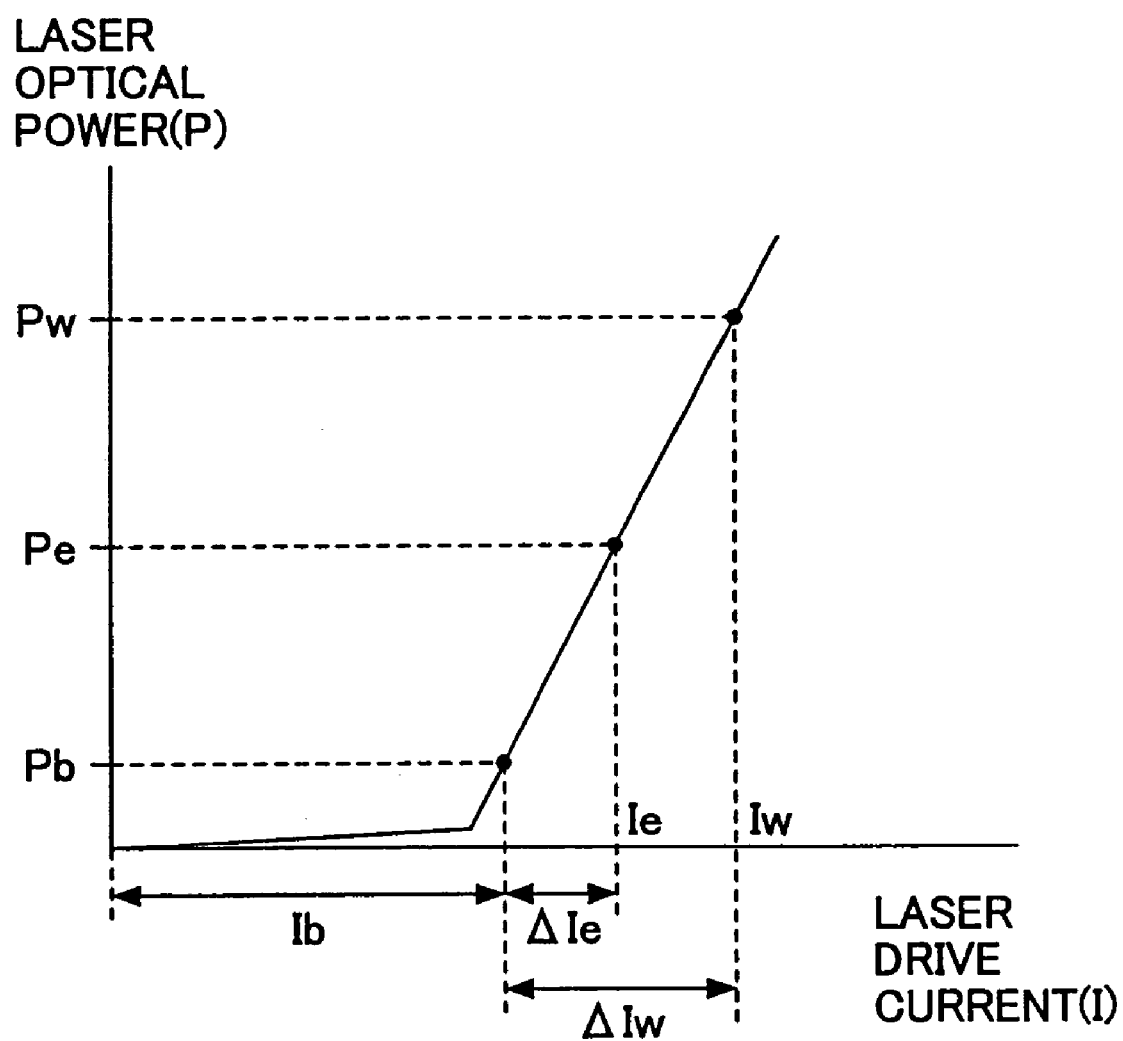
FIG. 25 is a diagram for explaining a relationship between the laser drive current and the laser optical power.

FIG. 23 shows a bias-level current driver in the optical recording/reproducing apparatus of FIG. 22. FIG. 24 is a time chart for explaining exemplary waveforms of the output signals of the CPU of the optical recording/reproducing apparatus of FIG. 22. FIG. 25 is a diagram for explaining a relationship between the laser drive current and the laser optical power.

In the optical recording/reproducing apparatus of the present embodiment, the DVD-format code data is recorded onto a DVD-rewritable disk (or a phase-change recording medium) by focusing a laser beam emitted by a laser diode, on the recording layer of the disk. The recorded data is reproduced from the disk by the optical recording/reproducing apparatus. The optical recording/reproducing apparatus of the present embodiment employs the eight-to-sixteen modulation (ESM) scheme as the data modulation method in order to carry out the pulse-width modulation (PWM) recording process for the DVD-rewritable disk.

In the optical recording/reproducing apparatus of FIG. 22, the multi-pulse drive current in which data is modulated is supplied to the laser light source, and the laser light source emits the laser beam to the DVD-rewritable disk. A stream of data blocks, including marks and spaces, are recorded onto the recording layer of the disk by focusing the laser beam on the recording layer of the disk.

Generally, when recording data onto the phase-change recording media by using the multi-pulse laser driving, the optical recording/reproducing apparatus is required to maintain the accurate power levels of the laser optical power, including the peak power (Pw) corresponding to the peak-level drive current, the bias power (Pb) corresponding to the bias-level drive current, and the erase power (Pe) or space power corresponding to the erase-level drive current or space-level drive current.

A description will now be provided of the automatic power control (APC) process which is performed by the optical recording/reproducing apparatus of the present embodiment.

As shown in FIG. 22, the optical recording/reproducing apparatus of the present embodiment generally comprises a central processing unit (CPU) 1, a laser diode (LD) 2, a photodetector (PD) 3, a laser diode driver (LDD) 4, a current-voltage converter 5, a bias-level current driver (BCD) 47, an erase-level current driver (ECD) 48, and a peak-level current driver (PCD) 49. A digital-to-analog (D/A) converter 41 and a digital-to-analog (D/A) converter 42 are provided between the CPU 1 and the BCD 47.

In the optical recording/reproducing apparatus of FIG. 22, the CPU 1 sets a peak-level increment current 407 at the output of the peak-level current driver (PCD) 49 by supplying a peak-level control (PLC) signal 405 to the PCD 49. The CPU 1 sets an erase-level increment current 406 at the output of the erase-level current driver (ECD) 48 by supplying an erase-level control (ELC) signal 404 to the ECD 48. The CPU 1 sets a bias-level drive current 408 at the output of the bias-level current driver (BCD) 47 by supplying a target power signal (TPS) 412 to the BCD 47 via the D/A converter 42.

Specifically, each of the ECD 48 and the PCD 49 is configured by using a digital-to-analog converter (DAC). The digital erase-level control signal from the CPU 1 is received at the ECD 48, and, in response to the control signal, the ECD 48 outputs the analog erase-level increment current 406 to the LDD 4. The digital peak-level control signal from the CPU 1 is received at the PCD 49, and, in response to the control signal, the PCD 49 outputs the analog peak-level increment current 407 to the LDD 4.

The BCD 47 is configured so that the BCD 47 selectively outputs one of a plurality of bias-level drive current signals to the LDD 4 through the signal line 408 in response to control signals supplied by the CPU 1. Specifically, the BCD 47 is constructed as shown in FIG. 23, and outputs the bias-level drive current 408 to the LDD 4.

The LDD 4 receives the bias-level drive current 408, the erase-level increment current 406 and the peak-level increment current 407, and determines the bias power Pb, the erase power Pe and the peak power Pw of the laser diode 2. In response to the control signals from the CPU 1, the LDD 4 supplies a selected one of the drive currents to the laser diode 2 at a controlled time.

In the optical recording/reproducing apparatus, the CPU 1 converts a sequence of input recording data blocks into an eight-to-sixteen modulation (ESM) signal as in the waveform indicated by (a) in FIG. 24. The CPU 1 further generates a multi-pulse laser driving waveform as in the drive waveform indicated by (d) in FIG. 24. In accordance with the multi-pulse laser driving waveform, the CPU 1 supplies an erase-power enable (EPE) signal 401 and a peak-power enable (PPE) signal 402 to the LDD 4 as indicated by (b) and (c) in FIG. 24.

When the erase-power enable (EPE) signal 401 is set in the high level (H), the LDD 4 supplies a sum of the bias-level drive current 408 and the erase-level increment current 406 to the LD 2. The LD 2 is driven by such erase-level drive current to output the laser beam at the erase power (Pe). When the peak-power enable (PPE) signal 402 is set in the high level (H), the LDD 4 supplies a sum of the bias-level drive current 408 and the peak-level increment current 407 to the LD 2. The LD 2 is driven by such peak-level drive current to output the laser beam at the erase power (Pw).

When the drive current is supplied from the LDD4 to the LD 2, the LD 2 outputs the laser beam onto the phase-change recording medium, so that the data is recorded onto or reproduced from the recording layer of the phase-change recording medium. The laser beam output by the LD 2 is received at the photodetector (PD) 3. The PD 3 outputs a monitor current that is proportional to the laser optical power of the received laser beam. The monitor current is supplied from the PD 3 to the current-voltage converter 5 via a signal line 409. The current-voltage converter 5 outputs a power-monitor signal (PMS) 410 based on the monitor current 409 supplied by the PD 3. The power monitor signal 410 is supplied from the current-voltage converter 5 to sample-hold circuits 702 and 704 of the BCD 47. By utilizing the power-monitor signal (PMS) 410 supplied by the current-voltage converter 5, the BCD 47 performs the automatic power control (APC) process in the optical recording/reproducing apparatus of the present embodiment.

As shown in FIG. 23, in the BCD 47 of the present embodiment, the power monitor signal 410 from the current-voltage converter 5 is supplied to each of two amplifiers 701 and 703. The power monitor signal 410 is amplified at each of the amplifiers 701 and 703, and such amplified signals are supplied to the sample-hold circuits 702 and 704. The amplified power monitor signal is sampled and held by each of the sample-hold circuits 702 and 704.

The amplifier 701 and the sample-hold circuit 702 are used when recording information onto the dye recording layer of an optical recording medium. The amplifier 703 and the sample-hold circuit 704 are used when recording information onto the phase-change recording layer of a phase-change recording medium.

In the bias-level current driver 47 of FIG. 23, the switch 709 outputs a selected one of the output signals of the sample-hold circuits 702 and 704 in response to the medium select signal 416 supplied by the CPU 1. The condition of the bias-level current driver 47 in which the APC/ACC output compare signal 414 is set at the high level (H) is shown in FIG. 23.

The optical recording/reproducing apparatus of the present embodiment is configured such that, when the data is recorded onto the phase-change recording medium, the erase-level drive current is sampled and held by the sample-hold circuit. However, the optical recording/reproducing apparatus of an alternative embodiment (which will be described later) is configured such that, when the data is recorded onto the dye recording medium, the bias-level drive current is sampled and held by the sample-hold circuit. In order to make the levels of the signals supplied from the sample-hold circuits 702 and 704 to an APC circuit 705 nearly equal, regardless of the type of the recording media, the gain of the amplifier 701 is set at a value larger than a value of the gain of the amplifier 703.

The CPU 1 outputs the erase-power sampling signal 413 to the BCD 47. When recording a long-space data (which is a space data with a data length of 10T or more) on the recording medium, the sample-hold circuit 704 samples and holds the power monitor signal 410 at the time the sampling signal 413 output by the CPU 1 changes from the high level (H) to the low level (L), and supplies the sampled signal to the APC circuit 705. At this time, the switch 710 and the switch 712 are set to the high-level (H) condition as indicated in FIG. 23.

The CPU 1 outputs the target power signal 412 to the BCD 47 through the D/A converter 42. The analog target power signal 412 output by the D/A converter 42 is supplied to the inverting amplifier 708. The target power signal is inverted at the amplifier 708 based on the reference voltage Vref. The sum of the inverted target power signal output from the amplifier 708 and the signal output from the sample-hold circuit 704 is supplied to the inverting input of the APC circuit 705.

The APC circuit 705 in the present embodiment is configured by using an integrator circuit. The output signal of the APC circuit 705 is supplied as the bias-level drive current 408 to the LDD 4 via the switch 711. In this manner, the APC output feedback loop is formed in the present embodiment.

The APC circuit 705 controls the bias-level drive current 408 such that the sum of the inverted target power signal output from the amplifier 708 and the signal output from the sample-hold circuit 704 corresponds to the reference voltage Vref. In other words, the APC circuit 705 controls the bias-level drive current 408 such that the output signal of the sample-hold circuit 704 is equal to the target power signal 112 output by the CPU 1.

In the BCD 47 shown in FIG. 23, the A/D converter 713 converts the analog bias-level drive current 408 into a digital signal, and outputs the digital bias-level drive current signal 415 to the CPU 1. In this manner, when outputting a long space data, the optical recording/reproducing apparatus of the present embodiment controls the bias-level drive current 408 by sampling and holding the bias-level drive current signal (or the long space data).

In the present embodiment, the CPU 1 determines the erase-level increment current 406 and the peak-level increment current 407 based on the digital bias-level drive current signal 415 supplied by the BCD 47. The bias-level drive current is controlled in response to the changes of the erase-level drive current, and the erase-level drive current is always controlled by means of the analog power control.

FIG. 25 shows a laser diode derivative efficiency used by the optical recording/reproducing apparatus of the present embodiment. The derivative efficiency "η" of the LD 2 used by the optical recording/reproducing apparatus of the present embodiment, is defined as being a gradient $\Delta P/\Delta I$ of the optical power vs. drive current characteristic curve shown in FIG. 25.

Suppose that the bias-level drive current corresponding to the bias power Pb, the erase-level drive current corresponding to the erase power Pe, and the peak-level drive current corresponding to the peak power Pw are represented by "Ib", "Ie", and "Iw", respectively. As is apparent from the optical power vs. drive current characteristic curve of FIG. 25, the erase-level increment current "ΔIe" and the peak-level increment current "ΔIw" are represented by the following equations.

$$\Delta Ie = (Pe - Pb)/\eta \quad (A)$$

$$\Delta Iw = (Pw - Pb)/\eta \quad (B)$$

The erase-level increment current "ΔIe" and the peak-level increment current "ΔIw" can be calculated in accordance with the above equations (A) and (B). In this case, the derivative efficiency "η" of the LD 2 is predetermined, and the calculations of the erase-level increment current "ΔIe" and the peak-level increment current "ΔIw" are performed by using the predetermined derivative efficiency. As described above, the CPU 1 calculates the erase-level drive current "Ie" and the peak-level drive current "Iw" based on the corrected erase-level drive current and the derivative efficiency.

Next, a description will be given of operations of the optical recording/reproducing apparatus of the present embodiment when the CPU 1 does not output the sampling signal 413 to the BCD 47 over a long period exceeding a predetermined time.

If the sampling signal 413 is not output over a long period exceeding a predetermined time, the output of the sample-hold circuit 704 is gradually lowered due to the drooping characteristic. As the APC circuit 705 controls the bias-level drive current 408 based on the output of the sample-hold circuit 704, irregularities of the laser optical power are likely to occur.

In order to eliminate the problem, in the present embodiment, the laser diode drive control of the CPU 1 is temporarily changed to an automatic current control (ACC) process.

During the ACC process, the CPU 1 sets the bias-level drive current 408 at the output of the BCD 47 by supplying an ACC drive current (ADC) signal 411 to the BCD 47 via the D/A converter 41. In the BCD 47, the ADC signal 411 passes through the switch 711 (which is set to the low-level (L) condition), and is supplied to the LDD 4 as the bias-level drive current 408.

The sampling signal 413 is output to the monostable multivibrator 714 as a trigger. At the rising edge of the sampling signal 413, the multivibrator 714 is set to the high-level (H) state. When the trigger is output within the predetermined time (e.g., 150 μs), the multivibrator 714 is set to the high-level (H) state. Otherwise the multivibrator 714 is set to the low-level (L) state.

When the output of the multivibrator 714 is set the low level (L), the laser diode drive control of the CPU 1 is changed to the ACC process. The multivibrator 714 outputs the ACC select signal (ACCSS) 750 to each of the switch 710, the switch 711 and the switch 712. When the high-level ACCSS 750 from the multivibrator 714 is received, each of the switches 710, 711 and 712 is set to the high-level (H) condition as shown in FIG. 23.

Figure 26:
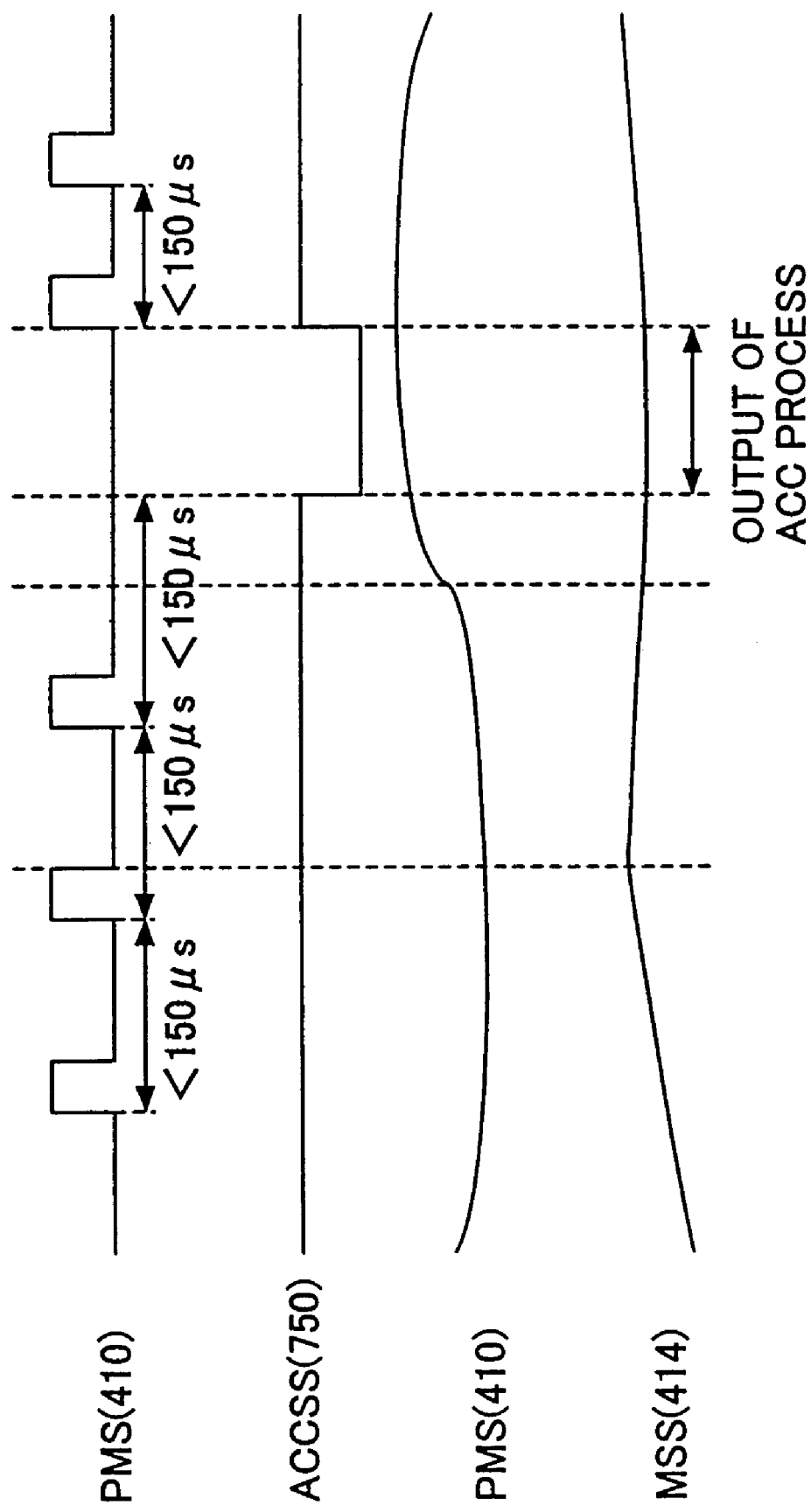
FIG. 26 is a time chart for explaining operations of the bias-level current driver of the present embodiment during an automatic current control process.

FIG. 26 is a time chart for explaining operations of the bias-level current driver (BCD) 47 of the present embodiment during the ACC process.

When the switch 711 is set to the low-level (L) condition, the CPU 1 sets the bias-level drive current 408 at the output of the BCD 47 by supplying the ADC signal 411 to the BCD 47. If, in this condition, a long space data having a data length of 10T or more is produced, then the CPU 1 outputs the sampling signal 413 to the BCD 47. The output of the monostable multivibrator 714 is set to the high level (H), and the control of the CPU 1 is quickly returned to the APC process.

When the switches 710 and 712 are set to the low-level (L) condition, the APC output feedback circuit 706 supplies the difference signal between the output signal of the APC circuit 705 and the APC drive current (ADC) signal 411, to the APC circuit 705. The APC circuit 705 controls the bias-level drive current 408 such that the output of the APC output feedback circuit 706 corresponds to the reference voltage Vref.

According to the present embodiment, it is possible to prevent the saturation of the output of the APC circuit 705 during the ACC process, and the setting of the bias-level drive current 108 can be quickly performed when the control of the CPU 1 is returned to the APC process.

In the BCD 47 shown in FIG. 23, the comparator 707 compares the output signal of the APC circuit 705 and the ACC drive current (ADC) signal 411, and supplies the difference signal thereof to the CPU 1 as the APC/ACC output compare signal 414. By receiving the APC/ACC output compare signal 414, the CPU 1 sets the APC/ACC output compare signal 414 such that the ADC signal 411 and the APC/ACC output compare signal 414 are equal to each other.

In the optical recording/reproducing apparatus of the present embodiment, even when the control of the CPU 1 is changed from the APC process to the ACC process, the bias-level drive current 408, which is nearly equal to the signal output by the APC circuit 705 immediately before the change, is supplied to the LDD 4.

The optical recording/reproducing apparatus of the present embodiment is effective in maintaining the accurate recording power levels of the laser diode optical power even when the sampling signal is not output over a long period exceeding a predetermined time.

Figure 27:
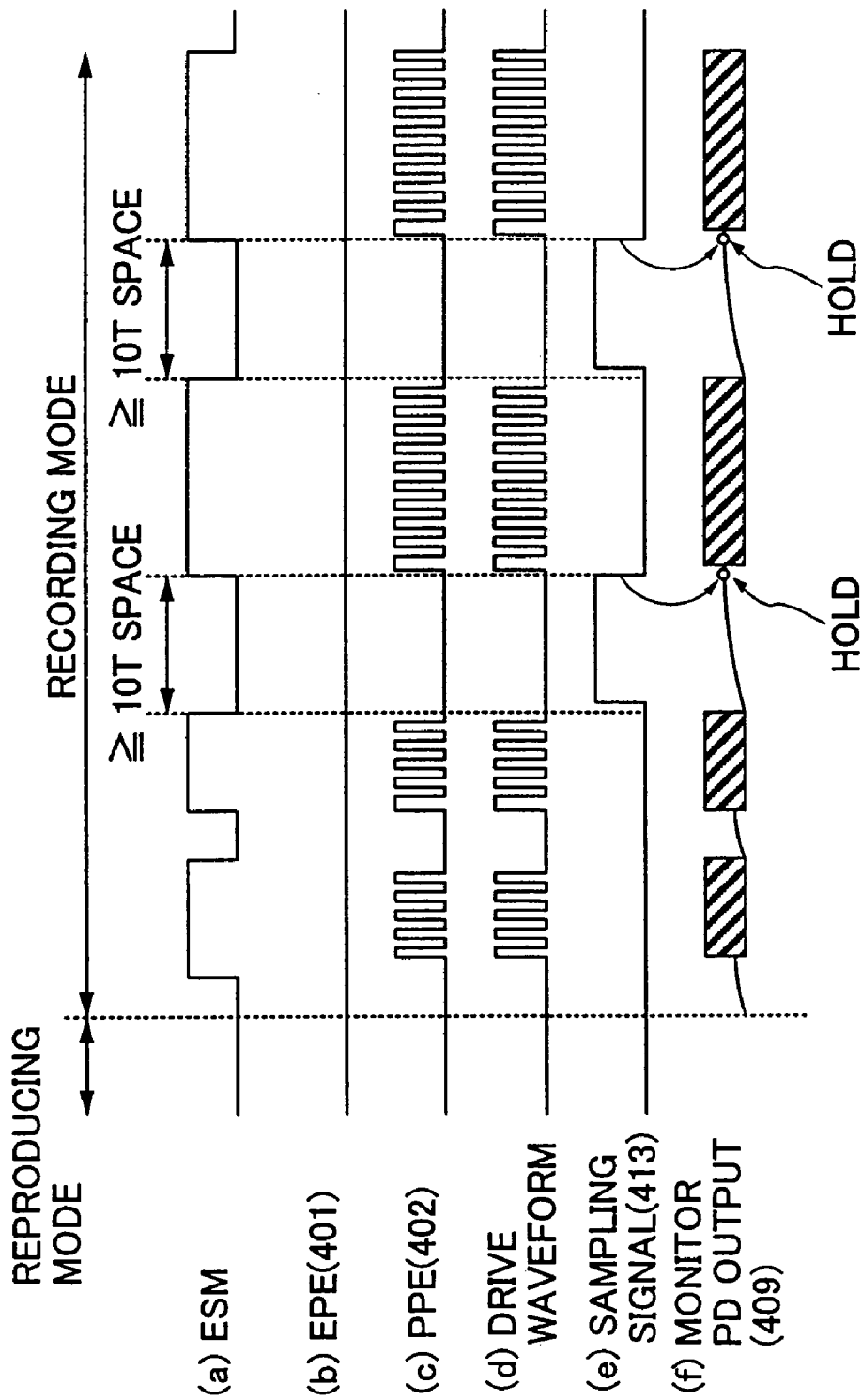
FIG. 27 is a time chart for explaining exemplary waveforms of the output signals of one alternative embodiment of the optical recording/reproducing apparatus of FIG. 22.

Next, FIG. 27 is a time chart for explaining exemplary waveforms of the output signals of the CPU of an alternative embodiment of the optical recording/reproducing apparatus of FIG. 22.

The optical recording/reproducing apparatus of the present embodiment has a configuration that is essentially the same as the configuration of the optical recording/reproducing apparatus of FIG. 22. Apart from the recording onto the phase-change recording medium as in the previous embodiment, in the optical recording/reproducing apparatus of the present embodiment, the format code data is recorded onto a different type optical recording medium having a dye recording layer by focusing a laser beam emitted by a laser diode, on the dye recording layer of the recording medium (which will be called the dye medium).

In the present embodiment, the recording power levels of the laser diode optical power are two levels including the bias-power (Pb) level and the peak-power (Pw) level, and the bias-power level is sampled and held by the sample/hold circuit of the bias-level current driver (BCD) 47. Hence, as indicated by (b) in FIG. 27, the erase power enable (EPE) signal 401, which is output by the CPU 1 to the LDD 4, is always set to the low level (L).

In the present embodiment, the medium select signal 416, which is output by the CPU 1 to the BCD 47, is set to the low level (L) so that the switch 709 is set to the low-level (L) condition. The power monitor signal 410, which is output by the current-voltage converter 5 to the BCD 47, is amplified by the amplifier 701. The amplified power monitor signal 410 is sampled and held by the sample/hold circuit 702, and the resulting signal is supplied to the APC circuit 705 via the switches 709 and 710.

Similar to FIG. 24, in the present embodiment shown in FIG. 27, when the CPU 1 does not output the sampling signal 413 to the BCD 47 over a long period exceeding a predetermined time (e.g., 150 μs), the output of the sample-hold circuit 704 is gradually lowered due to the drooping characteristic. As the APC circuit 705 controls the bias-level drive current 408 based on the output of the sample-hold circuit 704, irregularities of the laser optical power are likely to occur.

In order to eliminate the problem, in the present embodiment, the laser diode drive control of the CPU 1 is temporarily changed to the automatic current control (ACC) process.

During the ACC process, the CPU 1 sets the bias-level drive current 408 at the output of the BCD 47 by supplying the ACC drive current (ADC) signal 411 to the BCD 47 via the D/A converter 41. In the BCD 47, the ADC signal 411 passes through the switch 711 (which is set to the low-level (L) condition), and is supplied to the LDD 4 as the bias-level drive current 408.

The sampling signal 413 is output to the monostable multivibrator 714 as a trigger. At the rising edge of the sampling signal 413, the multivibrator 714 is set to the high-level (H) state. When the trigger is output within the predetermined time (e.g., 150 μs), the multivibrator 714 is set to the high-level (H) state. Otherwise the multivibrator 714 is set to the low-level (L) state.

When the output of the multivibrator 714 is set to the low level (L), the laser diode drive control of the CPU 1 is changed to the ACC process. The multivibrator 714 at this time outputs the low-level (L) ACC select signal (ACCSS) 750 to each of the switch 710, the switch 711 and the switch 712, and each of the switches 710 to 712 is set to the low-level (L) condition (not shown in FIG. 23). On the other hand, when the high-level ACCSS 750 from the multivibrator 714 is received at each of the switches 710 to 712, each of the switches 710 to 712 is set to the high-level (H) condition as shown in FIG. 23.

When the switch 711 is set to the low-level (L) condition, the CPU 1 sets the bias-level drive current 408 at the output of the BCD 47 by supplying the ADC signal 411 to the BCD 47. If, in this condition, a long space data having a data length of 10T or more is produced, then the CPU 1 outputs the sampling signal 413 to the BCD 47. The output of the monostable multivibrator 714 is set to the high level (H), and the control of the CPU 1 is quickly returned to the APC process.

When the switches 710 and 712 are set to the low-level (L) condition, the APC output feedback circuit 706 supplies the difference signal between the output signal of the APC circuit 705 and the APC drive current (ADC) signal 411, to the APC circuit 705. The APC circuit 705 controls the bias-level drive current 408 such that the output of the APC output feedback circuit 706 corresponds to the reference voltage Vref.

According to the present embodiment, it is possible to prevent the saturation of the output of the APC circuit 705 during the ACC process, and the setting of the bias-level drive current 108 can be quickly performed when the control of the CPU 1 is returned to the APC process.

In the BCD 47, the comparator 707 compares the output signal of the APC circuit 705 and the ACC drive current (ADC) signal 411, and supplies the difference signal thereof to the CPU 1 as the APC/ACC output compare signal 414. By receiving the APC/ACC output compare signal 414, the CPU 1 sets the APC/ACC output compare signal 414 such that the ADC signal 411 and the APC/ACC output compare signal 414 are equal to each other.

In the optical recording/reproducing apparatus of the present embodiment, even when the control of the CPU 1 is changed from the APC process to the ACC process, the bias-level drive current 408, which is nearly equal to the signal output by the APC circuit 705 immediately before the change, is supplied to the LDD 4.

The optical recording/reproducing apparatus of the present embodiment is effective in maintaining the accurate recording power levels of the laser diode optical power even when the sampling signal is not output over a long period exceeding a predetermined time.

Figure 28:
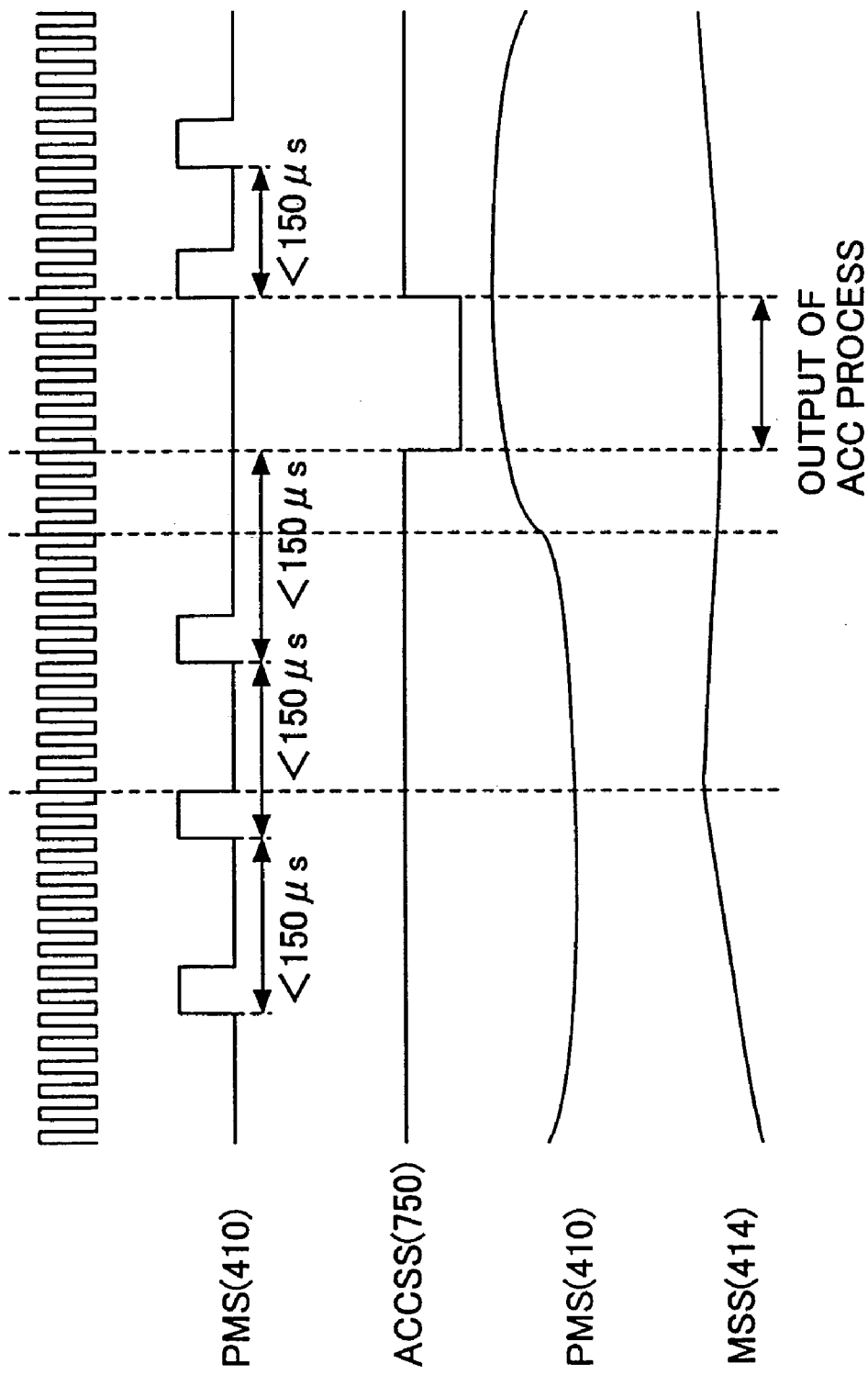
FIG. 28 is a time chart for explaining exemplary waveforms of the output signals of another alternative embodiment of the optical recording/reproducing apparatus of FIG. 22.
Figure 29:
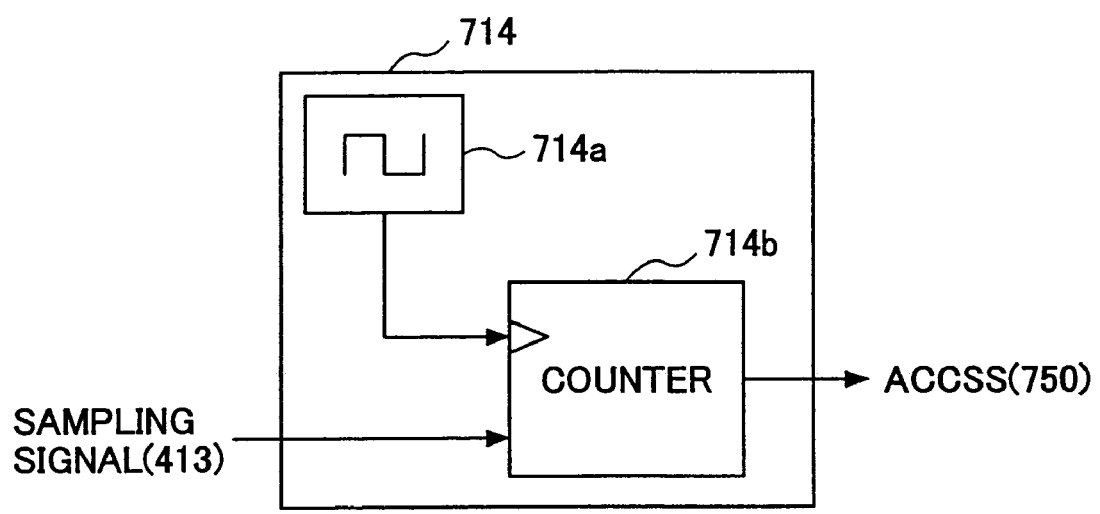
FIG. 29 is a block diagram of a counter in the optical recording/reproducing apparatus of the embodiment of FIG. 28.

Next, FIG. 28 is a time chart for explaining exemplary waveforms of the output signals of another alternative embodiment of the optical recording/reproducing apparatus of FIG. 22. FIG. 29 is a block diagram of a counter in the optical recording/reproducing apparatus of the embodiment of FIG. 28.

The optical recording/reproducing apparatus of the present embodiment has a configuration that is essentially the same as the configuration of the optical recording/reproducing apparatus of FIG. 22. In the optical recording/reproducing apparatus of the present embodiment, the format code data is recorded onto the dye recording medium.

The monostable multivibrator 714 as in the previous embodiment generates the timing signal to change the control of the CPU 1 from the APC process to the ACC process. As shown in FIG. 29, the multivibrator 714 is replaced with the counter unit 714 in the present embodiment, and the counter unit 714 includes a clock 714a and a counter 714b. The clock 714a outputs a clock signal at a relatively low frequency (e.g., 1 MHz), and this clock signal is supplied to one of two inputs of the counter 714b. The sampling signal 413 output by the CPU 1 is supplied to the other input of the counter 714b. The counter 714b counts the clock signals output by the clock 714a, and, when the number of the clock signals counted by the counter 714b exceeds a predetermined value (e.g., 150 counts corresponding to 150 μs), the counter 714b outputs a low-level (L) signal as the ACC select signal (ACCSS) 750 to each of the switch 710, the switch 711 and the switch 712. Each of the switches 710 to 712 is set to the low-level (L) condition (that is, the start of the ACC process). On the other hand, when the sampling signal 413 is received at the counter 714b, the counter 714b is reset by the rising edge of the sampling signal 413 to output the high-level (H) signal to each of the switches 710 to 712. Each of the switches 710 to 712 is set to the high-level (H) condition (that is, the restart of the APC process).

As shown in FIG. 28, when the CPU 1 outputs the sampling signal 413 to the BCD 47 within the predetermined time (e.g., 150 μs), the counter 714b continues to output the high-level (H) ACCSS 750 to each of the switches 710 to 712. The APC process is continuously performed. On the other hand, when the CPU 1 does not output the sampling signal 413 to the BCD 47 over a long period exceeding the predetermined time (e.g., 150 μs), the counter 714b outputs the low-level (L) ACCSS 750 to each of the switches 710 to 712. The control of the CPU 1 is changed from the APC process to the ACC process. Then, the CPU 1 outputs the sampling signal 413 to the counter unit 417 of the BCD 47, and the counter 714b is reset by the rising edge of the sampling signal 413 to output the high-level (H) signal to each of the switches 710 to 712. Thus, the ACC process is terminated by the sampling signal 413, and the APC process can quickly be restarted.

In the above-described embodiment, the counter unit 714, including the clock 714a and the counter 714b, is used to generate the timing signal to change the control of the CPU 1 from the APC process to the ACC process. Alternatively, a frequency-divided clock signal which is generated by dividing the frequency of the channel clock may be used instead of the clock signal generated by the clock 714a.

The optical recording/reproducing apparatus of the present embodiment is effective in maintaining the accurate recording power levels of the laser diode optical power even when the sampling signal is not output over a long period exceeding a predetermined time.

Figure 30:
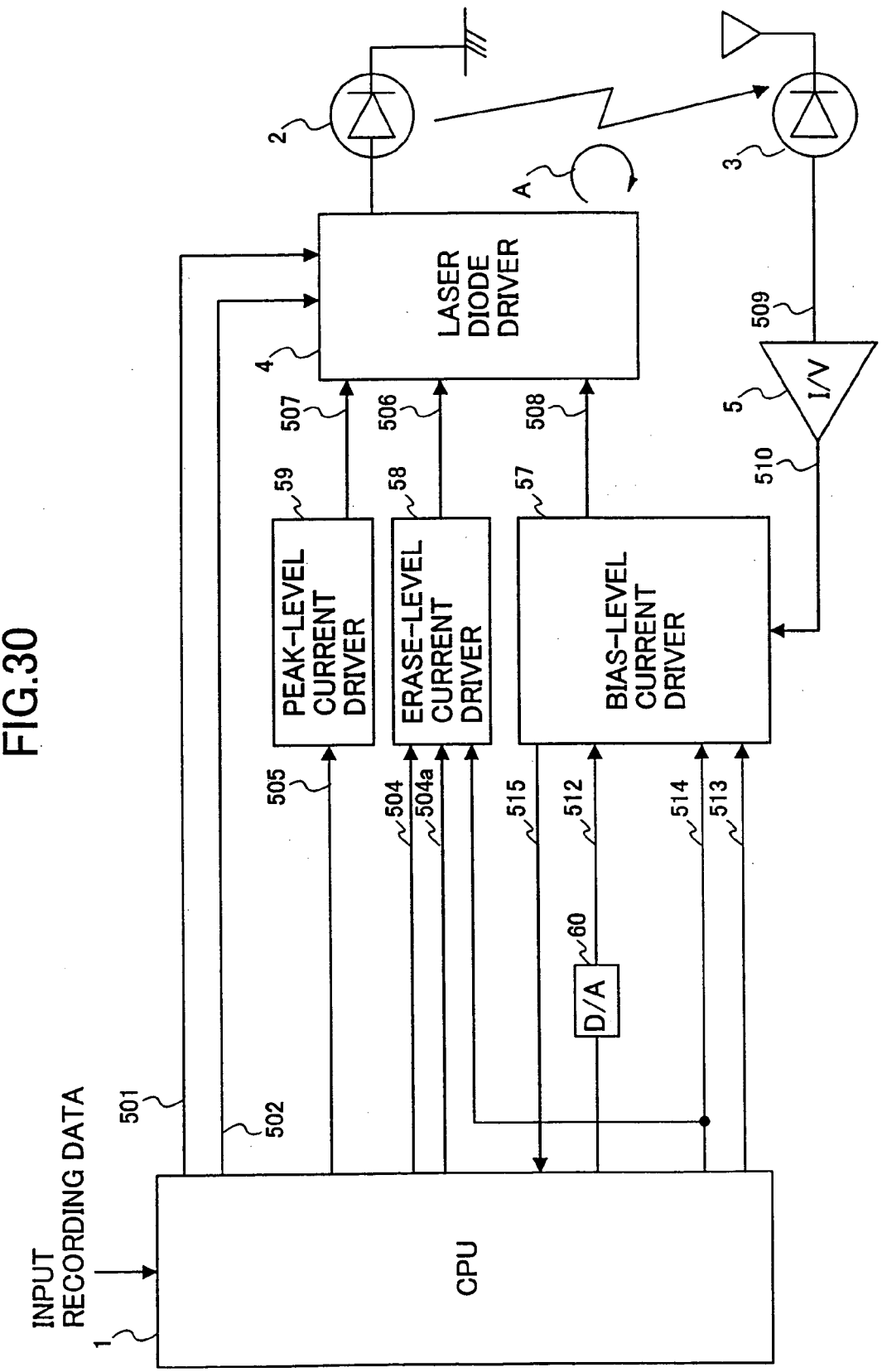
FIG. 30 is a block diagram of another preferred embodiment of the optical recording/reproducing apparatus of the invention.

Next, FIG. 30 is a block diagram of another preferred embodiment of the optical recording/reproducing apparatus of the invention.

Figure 31:
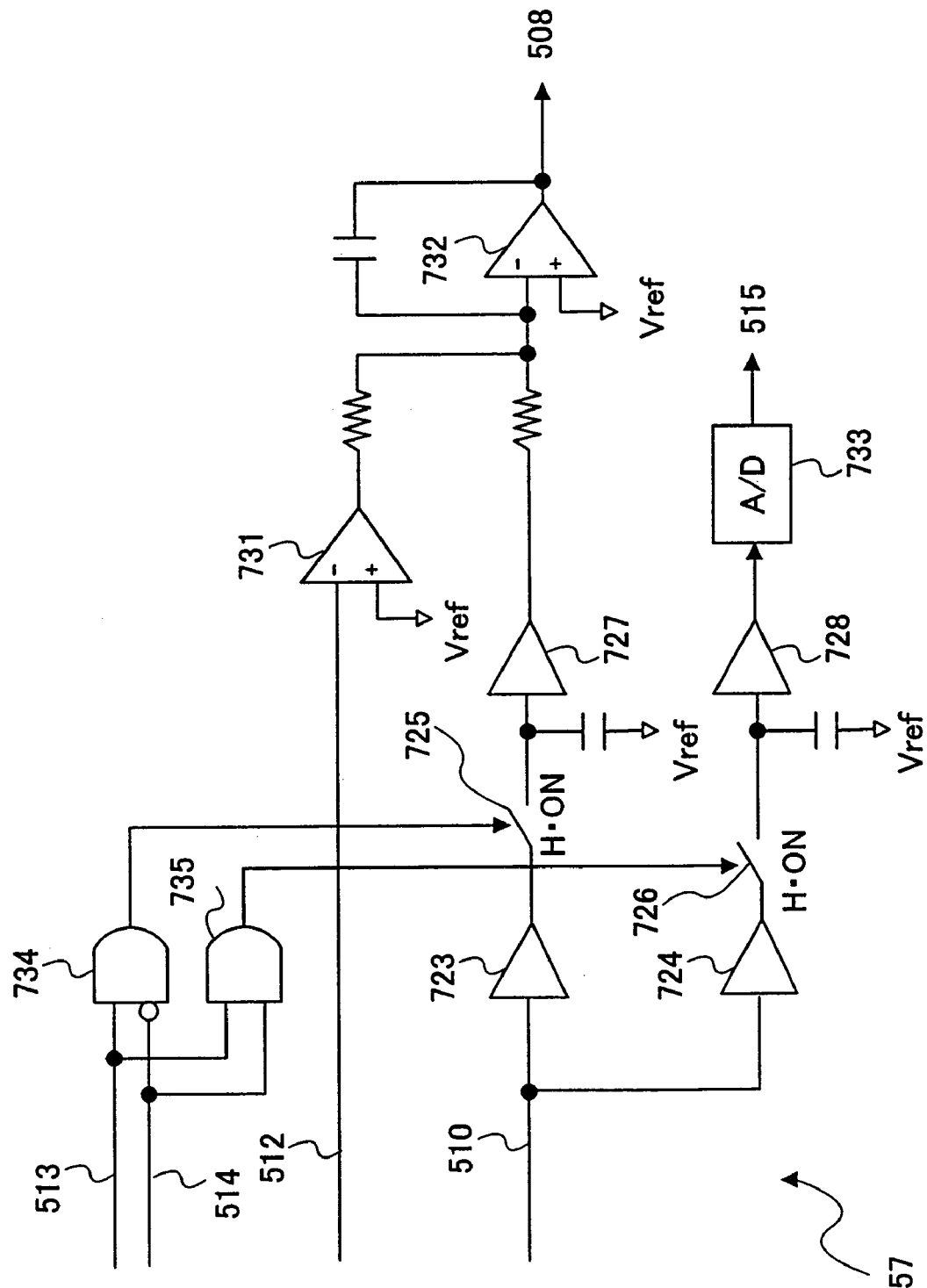
FIG. 31 is a circuit diagram of a bias-level current driver in the optical recording/reproducing apparatus of FIG. 30.
Figure 32:
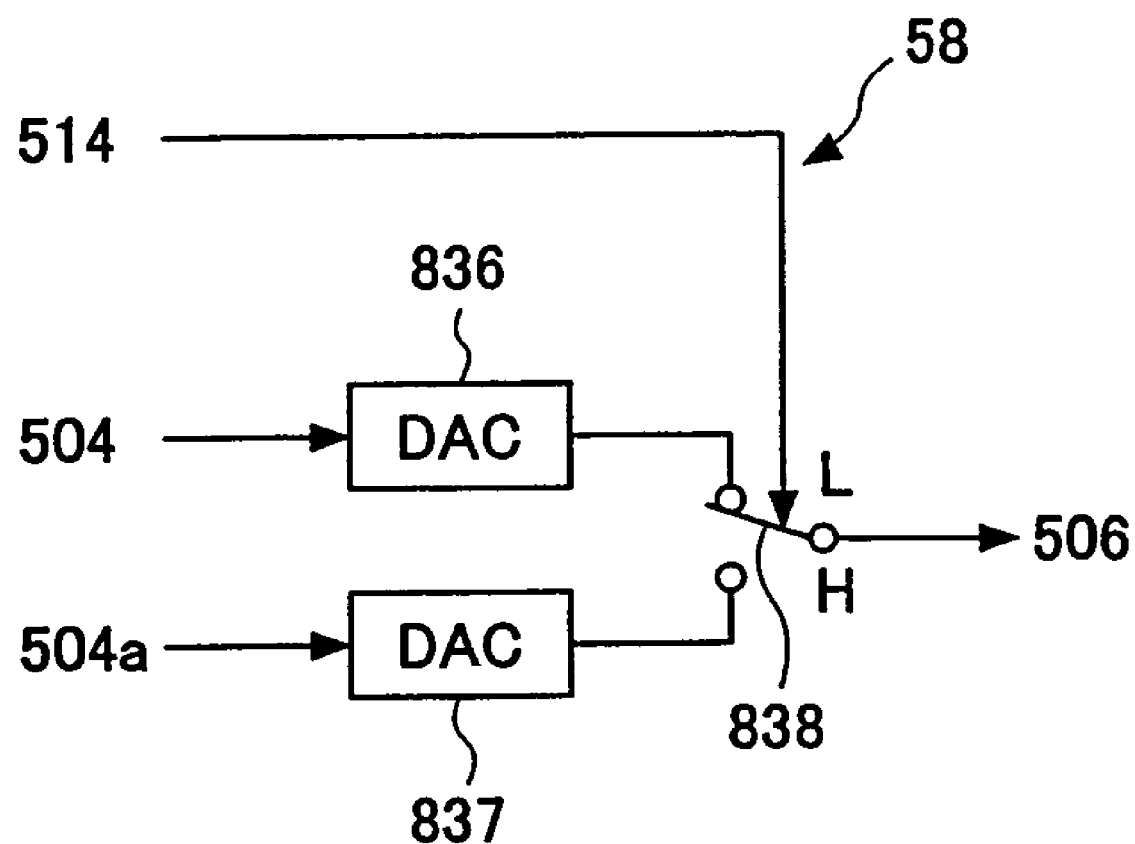
FIG. 32 is a circuit diagram of an erase-level current driver in the optical recording/reproducing apparatus of FIG. 30.
Figure 33:
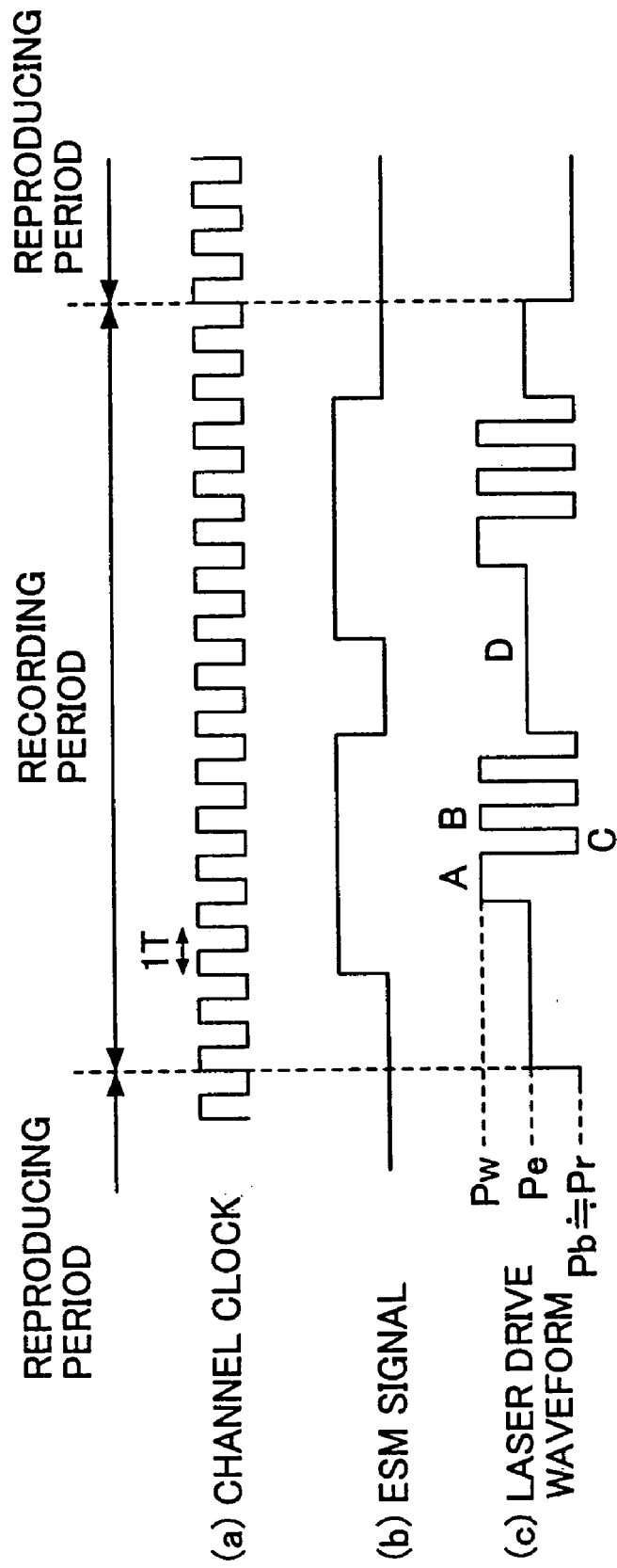
FIG. 33 is a waveform diagram for explaining a multi-pulse laser drive waveform of the optical recording/reproducing apparatus of FIG. 30.
Figure 34:
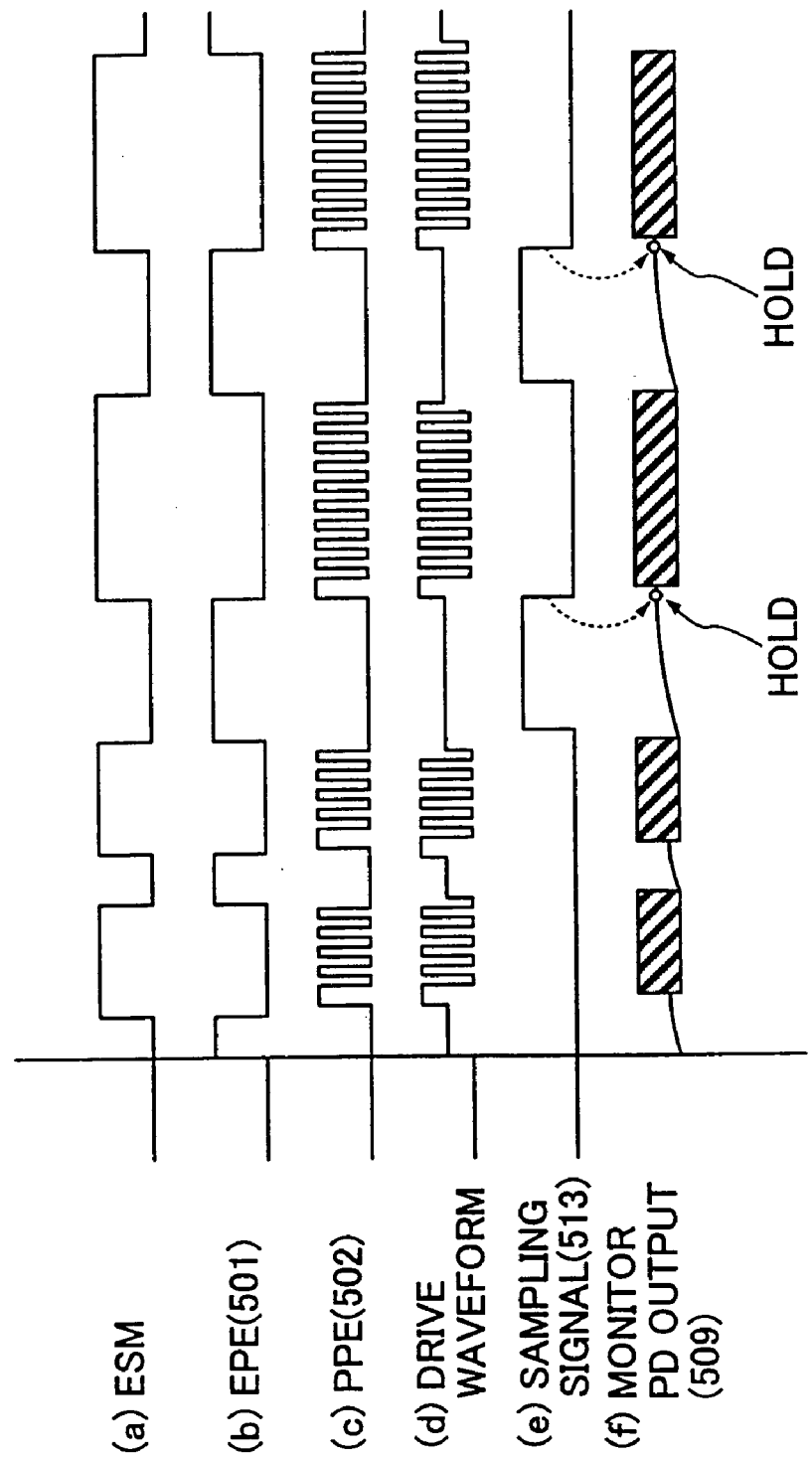
FIG. 34 is a time chart for explaining exemplary waveforms of the output signals of the CPU of the optical recording/reproducing apparatus of FIG. 30.

FIG. 31 shows a bias-level current driver in the optical recording/reproducing apparatus of FIG. 30. FIG. 32 shows an erase-level current driver in the optical recording/reproducing apparatus of FIG. 30. FIG. 33 shows a multi-pulse laser drive waveform of the optical recording/reproducing apparatus of FIG. 30. FIG. 34 is a time chart for explaining exemplary waveforms of the output signals of the CPU of the optical recording/reproducing apparatus of FIG. 30.

In the optical recording/reproducing apparatus of the present embodiment, the DVD-format code data is recorded onto a DVD-rewritable disk (or a phase-change recording medium) by focusing a laser beam emitted by a laser diode, on the recording layer of the disk. The recorded data is reproduced from the disk by the optical recording/reproducing apparatus. The optical recording/reproducing apparatus of the present embodiment employs the eight-to-sixteen modulation (ESM) scheme as the data modulation method in order to carry out the pulse-width modulation (PWM) recording process for the DVD-rewritable disk.

In the optical recording/reproducing apparatus of FIG. 30, the multi-pulse drive current in which data is modulated is supplied to the laser light source, and the laser light source emits the laser beam to the DVD-rewritable disk. A stream of data blocks, including marks and spaces, are recorded onto the recording layer of the disk by focusing the laser beam on the recording layer of the disk.

Generally, when recording data onto the phase-change recording media by using the multi-pulse laser driving, the optical recording/reproducing apparatus is required to maintain the accurate power levels of the laser optical power, including the peak power (Pw) corresponding to the peak-level drive current, the bias power (Pb) corresponding to the bias-level drive current, and the erase power (Pe) or space power corresponding to the erase-level drive current or space-level drive current.

A description will now be provided of the automatic power control (APC) process which is performed by the optical recording/reproducing apparatus of the present embodiment.

As shown in FIG. 30, the optical recording/reproducing apparatus of the present embodiment generally comprises a central processing unit (CPU) 1, a laser diode (LD) 2, a photodetector (PD) 3, a laser diode driver (LDD) 4, a current-voltage converter 5, a bias-level current driver (BCD) 57, an erase-level current driver (ECD) 58, and a peak-level current driver (PCD) 59. A digital-to-analog (D/A) converter 60 is provided between the CPU 1 and the BCD 57.

In the optical recording/reproducing apparatus of FIG. 30, the CPU 1 sets a peak-level increment current 507 at the output of the peak-level current driver (PCD) 59 by supplying a peak-level control (PLC) signal 505 to the PCD 59. The CPU 1 sets an erase-level increment current 506 at the output of the erase-level current driver (ECD) 58 by supplying an erase-level control (ELC) signal 504 to the ECD 58. The CPU 1 sets a bias-level drive current 508 at the output of the bias-level current driver (BCD) 57 by supplying a target power signal (TPS) 512 to the BCD 57 via the D/A converter 60.

Specifically, each of the ECD 58 and the PCD 59 is configured by using a digital-to-analog converter (DAC). The digital erase-level control signal from the CPU 1 is received at the ECD 58, and, in response to the control signal, the ECD 58 outputs the analog erase-level increment current 506 to the LDD 4. The digital peak-level control signal from the CPU 1 is received at the PCD 59, and, in response to the control signal, the PCD 59 outputs the analog peak-level increment current 507 to the LDD 4.

In the present embodiment, the ECD 58 is configured such that the ECD 58 selectively outputs one of a plurality of erase-level increment current signals to the LDD 4 through the signal line 506 in response to control signals output by the CPU 1. Specifically, the ECD 58 is constructed as shown in FIG. 32 (which will be explained later), and outputs the erase-level increment current 506 to the LDD 4.

The LDD 4 receives the bias-level drive current 508, the erase-level increment current 506 and the peak-level increment current 507, and determines the bias power Pb, the erase power Pe and the peak power Pw for the laser diode 2 from the received drive currents. In response to the control signals from the CPU 1, the LDD 4 supplies a selected one of the drive currents to the laser diode 2 at a controlled time.

In the optical recording/reproducing apparatus, the CPU 1 converts a sequence of input recording data blocks into an eight-to-sixteen modulation (ESM) signal as in the waveform indicated by (b) in FIG. 33. The CPU 1 further generates a multi-pulse laser driving waveform as in the laser drive waveform indicated by (c) in FIG. 33. In accordance with the multi-pulse laser driving waveform, the CPU 1 supplies an erase-power enable (EPE) signal 501 and a peak-power enable (PPE) signal 502 to the LDD 4 as indicated by (b) and (c) in FIG. 34.

When the erase-power enable (EPE) signal 501 is set in the high level (H), the LDD 4 supplies a sum of the bias-level drive current 508 and the erase-level increment current 506 to the LD 2. The LD 2 is driven by such erase-level drive current to output the laser beam at the erase power (Pe). When the peak-power enable (PPE) signal 502 is set in the high level (H), the LDD 4 supplies a sum of the bias-level drive current 508 and the peak-level increment current 507 to the LD 2. The LD 2 is driven by such peak-level drive current to output the laser beam at the erase power (Pw).

When the drive current is supplied from the LDD4 to the LD 2, the LD 2 outputs the laser beam onto the phase-change recording medium, so that the data is recorded onto or reproduced from the recording layer of the phase-change recording medium. The laser beam output by the LD 2 is received at the monitor photodetector (PD) 3. The monitor PD 3 outputs a monitor current that is proportional to the laser optical power of the received laser beam. The monitor current is supplied from the PD 3 to the current-voltage converter 5 via a signal line 509. The current-voltage converter 5 outputs a power-monitor signal (PMS) 510 based on the monitor current 509 supplied by the PD 3. The power monitor signal 510 is supplied from the current-voltage converter 5 to sample-hold circuits 727 and 728 of the BCD 57. By utilizing the power-monitor signal (PMS) 510 supplied by the current-voltage converter 5, the BCD 57 performs the automatic power control (APC) process in the optical recording/reproducing apparatus of the present embodiment.

As shown in FIG. 31, in the bias-level current driver (BCD) 57 of the present embodiment, two amplifiers 723 and 724 are provided, and the power-monitor signal (PMS) 510, output by the current-voltage converter 5, is supplied to each of the amplifiers 723 and 724. The sample/hold circuit 727 is connected to the output of the amplifier 723 via an analog switch 725, and the sample/hold circuit 728 is connected to the output of the amplifier 724 via an analog switch 726.

In the BCD 57 of FIG. 31, the amplifier 723, the switch 725 and the sample/hold circuit 727 form part of an APC output feedback loop circuit (indicated by the arrow A in FIG. 30) that is used when a normal recording process is performed. The APC output feedback loop circuit is comprised of the elements 723, 725 and 727, an inverting amplifier 731, a current control amplifier 732, the LDD 4, the LD 2, the monitor PD 3 and the current-voltage converter 5. The target power signal 512, output by the CPU 1 through the D/A converter 60, is supplied to the inverting input of the amplifier 731, and the reference voltage Vref is supplied to the non-inverting input of the amplifier 731. A sum of the output signal of the sample/hold circuit 727 and the output signal of the amplifier 731 is supplied to the inverting input of the amplifier 732, and the reference voltage Vref is supplied to the non-inverting input of the amplifier 732. The current-control amplifier 732 in the present embodiment is configured by using an integrator circuit. The output signal of the amplifier 732 is supplied as the bias-level drive current 508 to the LDD 4. In this manner, the APC output feedback loop is formed as indicated by the arrow A in FIG. 30.

In the BCD 57 of FIG. 31, the amplifier 724, the analog switch 726 and the sample/hold circuit 728 form a special power setting circuit that is used when a special power setting is performed to calculate a laser diode derivative efficiency (which will be explained later). The output signal of the sample/hold circuit 728 is converted at an analog-to-digital (A/D) converter 733 into a digital signal, and this digital signal is supplied from the BCD 57 to the CPU 1 as the digital erase-power signal 515.

In the BCD 57 of FIG. 31, the erase-level select (ELS) signal 514, output by the CPU 1, is supplied to each of two AND circuits 734 and 735, and the erase-power sample (EPS) signal 513, output by the CPU 1, is supplied to each of the AND circuits 734 and 735. The output signals of the AND circuits 734 and 735 control the open/close setting of the analog switches 725 and 726.

When a normal recording process is performed, the ELS signal 514, output by the CPU 1 to the BCD 57, is set to the low level (L). If the EPS signal 513 is set to the high level (H), the output signal of the AND circuit 734 sets the switch 725 to the high-level (H) condition so that the switch 725 is turned ON. If the EPS signal 513 is set to the low level (L), the output signal of the AND circuit 734 sets the switch 725 to the low-level (L) condition so that the switch 725 is turned OFF. The switch 726 is always set to the low-level (L) condition so that the switch 726 is turned OFF, regardless of whether the EPS signal 513 is set to the high level (H) or the low level (L). In this condition, the power monitor signal (PMS) 510 is sampled and held by the sample/hold circuit 727.

On the other hand, when the special power setting process is performed, the ELS signal 514, output by the CPU 1 to the BCD 57, is set to the high level (H). Regardless of whether the EPS signal 513 is set to the high level (H) or the low level (L), the output signal of the AND circuit 734 always sets the switch 725 to the low-level (L) condition so that the switch 725 is turned OFF. If the EPS signal 513 is set to the high level (H), the output signal of the AND circuit 735 sets the switch 726 to the high-level (H) condition so that the switch 726 is turned ON. If the EPS signal 513 is set to the low level (L), the output signal of the AND circuit 735 sets the switch 726 to the low-level (H) condition so that the switch 726 is turned OFF. In this condition, the power monitor signal (PMS) 510 is sampled and held by the sample/hold circuit 728.

As shown in FIG. 32, the erase-level current driver (ECD) 58 in the present embodiment generally comprises a first digital-to-analog converter (DAC) 836, a second digital-to-analog converter (DAC) 837, and a switch 838. The switch 838 has a high-level (H) condition and a low-level (L) condition. The erase-level select (ELS) signal 514, output by the CPU 1, is supplied to the switch 838, and one of the high-level (H) condition and the low-level (L) condition is selected at the switch 838 in accordance with the erase-level select (ELS) signal 514 supplied by the CPU 1.

The first DAC 836 has an input connected to the CPU 1 via the signal line 504, and has an output connected to the switch 838. When the low-level (L) condition of the switch 838 is selected according to the ELS signal 514 (or during the normal recording process), the ECD 58 supplies an output signal of the first DAC 836 to the LDD 4 as the erase-level increment current 506. The second DAC 837 has an input connected to the CPU 1 via the signal line 504a, and has an output connected to the switch 838. When the high-level (H) condition of the switch 838 is selected according to the ELS signal 514 (or during the special power setting process), the ECD 58 supplies an output signal of the second DAC 837 to the LDD 4 as the erase-level increment current 506.

A normal erase-level control (ELC) signal 504, which is output by the CPU 1 when producing the normal erase power (Pe) of the laser optical output, is received at the first DAC 836, and, in response to the normal ELC signal 504, the DAC 836 outputs the normal erase-level increment current (EIC) to the switch 838. Usually when the erase power (Pe) of the laser optical output is produced, the low-level (L) condition of the switch 838 is selected according to the ELS signal 514.

A second erase-level control (ELC) signal 504a, which is output by the CPU 1 during the special power setting process, is received at the second DAC 837, and, in response to the second ELC signal 504a, the DAC 837 outputs a second erase-level increment current (EIC) to the switch 838.

In the present embodiment, the frequency at which the execution of the special power setting process is initiated by the CPU 1 is smaller than the frequency at which the execution of the normal APC process is initiated by the CPU 1. An optimal value of the frequency of execution of the special power setting process may be experimentally determined depending on time-dependent variations of the derivative efficiency of the LD 2.

Figure 35:
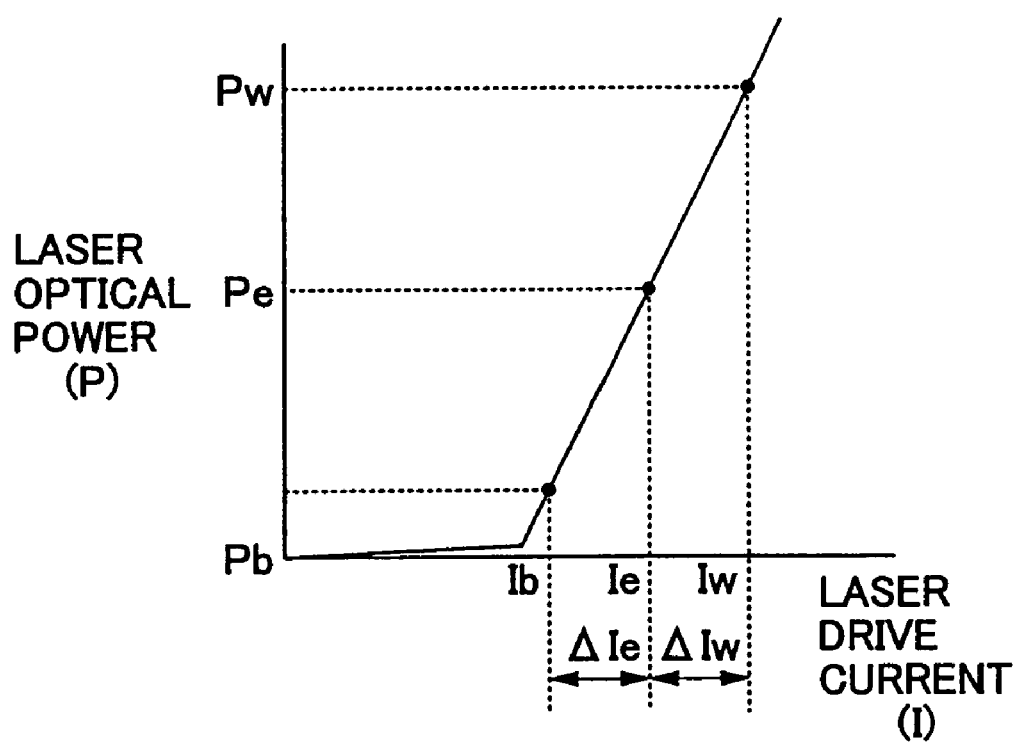
FIG. 35 is a diagram for explaining a laser diode derivative efficiency used by the optical recording/reproducing apparatus of FIG. 30.
Figure 36:
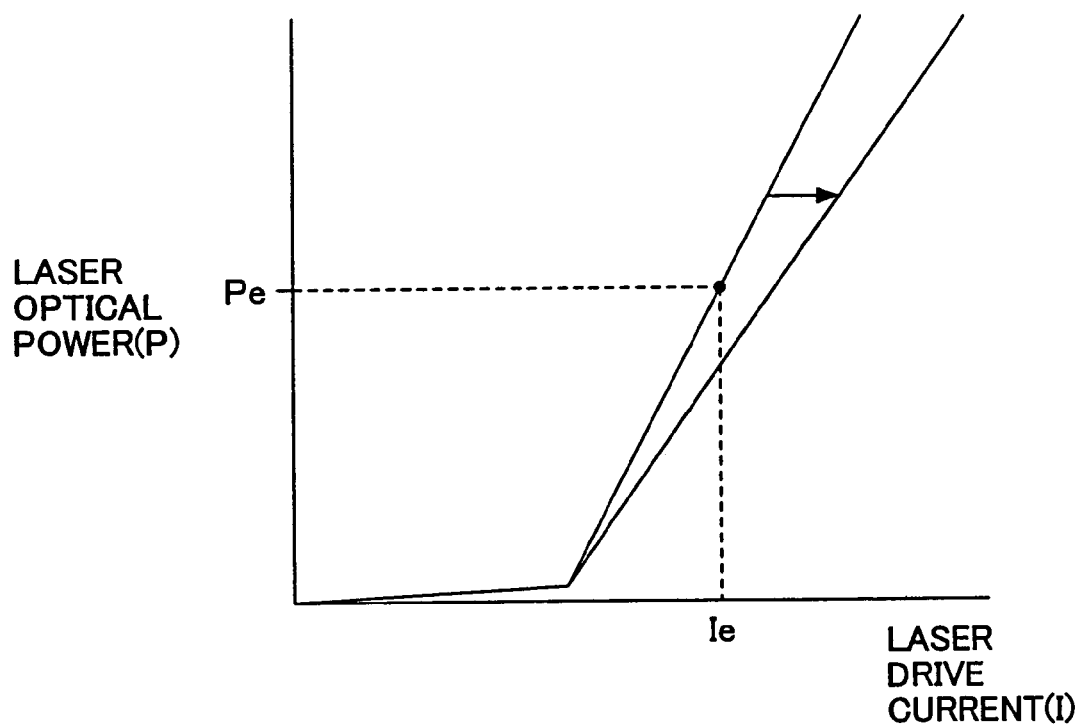
FIG. 36 is a diagram for explaining the optical power vs. drive current characteristics of the laser diode in the optical recording/reproducing apparatus of FIG. 30.

A description will now be provided of the normal APC process that is performed by the optical recording/reproducing apparatus of the present embodiment with reference to FIG. 35 and FIG. 36.

FIG. 35 shows a laser diode derivative efficiency used by the optical recording/reproducing apparatus of FIG. 30.

The derivative efficiency "η" of the LD 2 used by the optical recording/reproducing apparatus of the present embodiment, is defined as being a gradient $\Delta P/\Delta I$ of the optical power vs. drive current characteristic curve shown in FIG. 35.

Suppose that the bias-level drive current corresponding to the bias power Pb, the erase-level drive current corresponding to the erase power Pe, and the peak-level drive current corresponding to the peak power Pw are represented by "Ib", "Ie", and "Iw", respectively. As is apparent from the optical power vs. drive current characteristic curve of FIG. 35, the erase-level increment current "ΔIe" and the peak-level increment current "ΔIe+ΔIw" are represented by the following equations.

$$\Delta Ie=(Pe-Pb)/\eta$$

$$\Delta Ie+\Delta Iw=(Pw-Pe)/\eta$$

The erase-level increment current "ΔIe" and the peak-level increment current "ΔIe+ΔIw" can be calculated in accordance with the above equations. In this case, the derivative efficiency "η" of the LD 2 is predetermined, and the calculations of the erase-level increment current "ΔIe" and the peak-level increment current "ΔIe+ΔIw" are performed by using the predetermined derivative efficiency. As described above, the CPU 1 calculates the erase-level drive current "Ie" and the peak-level drive current "Iw" based on the corrected erase-level drive current and the derivative efficiency.

FIG. 36 shows the optical power vs. drive current characteristics of the laser diode in the optical recording/reproducing apparatus of FIG. 30.

As indicated in FIG. 36, the optical power vs. drive current characteristic curve tends to shift and bend to the right with increasing temperature, and the derivative efficiency of the laser diode (LD) 2 tends to vary with increasing temperature. If the derivative efficiency varies, the errors of the calculated bias-level drive current "Ib" and the calculated peak-level drive current "Iw" will not be negligible.

As previously described, the conventional apparatus (disclosed in Japanese Laid-Open Patent Application No. 9-171631) carries out the power control process in which the bottom-level drive current to the laser diode is corrected by using the detected peak power and the detected erase power, in order to take measures against a variation of the derivative efficiency. However, according to the above power control process of the conventional apparatus, a problem arises in that the formation of a mark on the recording layer of the disk when the laser diode is driven at the peak-level drive current in the non-pulse condition becomes deficient.

In order to eliminate the above problem of the conventional apparatus, the optical recording/reproducing apparatus of the present embodiment is configured so that the erase-level current driver (ECD) 58 selectively outputs one of the plurality of erase-level increment currents to the LDD 4 in response to the control signals supplied by the CPU 1. The respective power levels of the laser optical power when the individual erase-level increment currents are supplied to the LDD 4 are sampled and held by the sample/hold circuits of the BCD 57, and the corresponding erase power sample (EPS) signals 515 are received at the CPU 1. Then, the CPU 1 calculates a derivative efficiency of the LD 2 based on the erase power samples (EPS).

Figure 37:
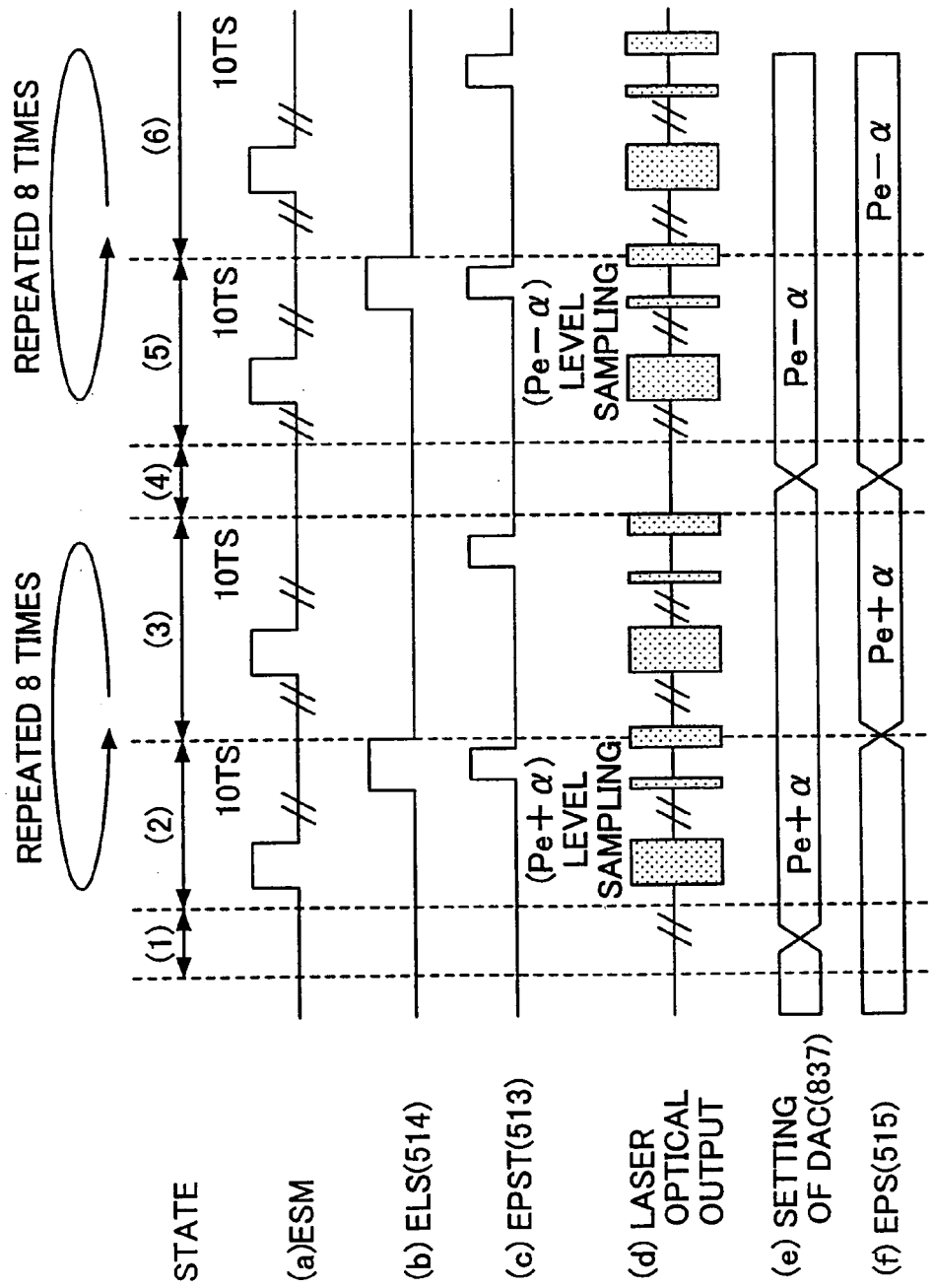
FIG. 37 is a time chart for explaining exemplary waveforms of the output signals of the elements of the optical recording/reproducing apparatus of FIG. 30.
Figure 38:
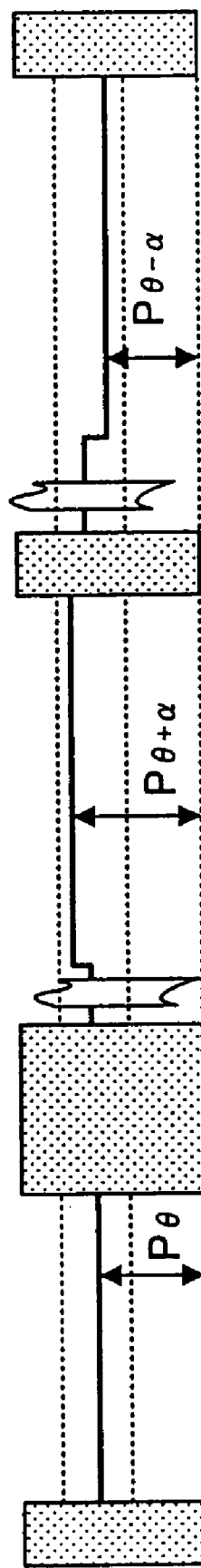
FIG. 38 is a diagram for explaining an example of detection of erase-level optical power at two sampling points used by the optical recording/reproducing apparatus of FIG. 30.
Figure 39:
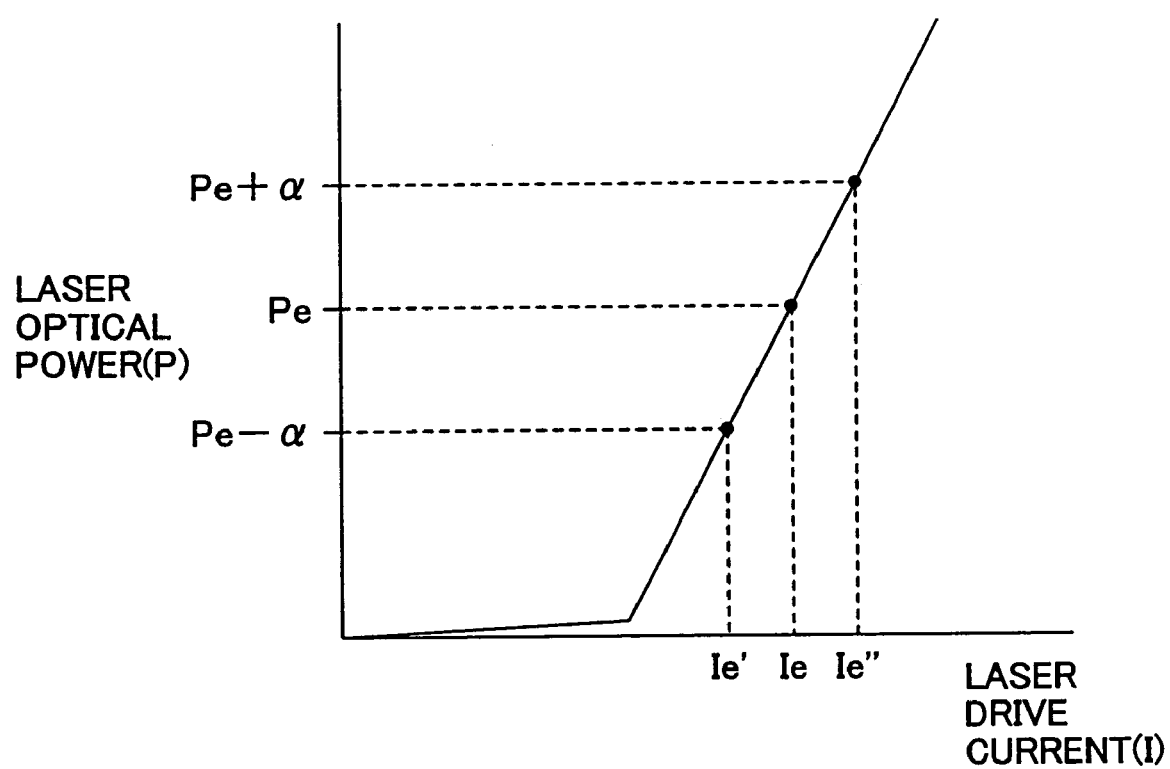
FIG. 39 is a diagram for explaining a calculation of a laser diode derivative efficiency that is performed by the optical recording/reproducing apparatus of FIG. 30.

A description will now be provided of the special power setting process that is performed by the optical recording/reproducing apparatus of the present embodiment with reference to FIG. 37 through FIG. 39.

FIG. 37 is a time chart for explaining exemplary waveforms of the output signals of the elements of the optical recording/reproducing apparatus of FIG. 30. FIG. 38 shows an example of detection of erase-level optical power at two sampling points used by the optical recording/reproducing apparatus of FIG. 30. FIG. 39 shows a calculation of a laser diode derivative efficiency that is performed by the optical recording/reproducing apparatus of FIG. 30.

At a start of the special power setting process, the CPU 1 outputs the second ELC signal 504a to the second DAC 837, and the second DAC 837 outputs a second EIC to the switch 838. The high level (H) condition of the switch 838 is selected according to the ELS signal 514, and the second EIC, supplied by the ECD 58, results in a first erase power "Pe+α" of the laser beam of the LD 2. See the state (2) indicated in FIG. 37 and the detection of erase-level optical power shown in FIG. 38.

In the above-described condition, when recording a 10T space data "10TS" onto the disk, the CPU 1 sets the ELS signal 514 in the low level (L), and the DAC 837 supplies the second EIC to the LDD 4 as the EIC signal 506. Hence, only during the 10T period, the first erase power "Pe+α" of the laser beam of the LD 2 is produced.

In the above-described condition, a corresponding first erase power sample (EPS) signal 114, output by the ADC 7, is received by the CPU 1. The CPU 1 stores the received EPS signal in a portion of the memory that is different from a memory portion in which the EPS signal obtained during the APC process is stored.

Immediately after the 10T space data is recorded onto the disk, the CPU 1 sets the ELS signal 514 to the low level (L). The low-level (L) condition of the switch 838 is selected according to the ELS signal 514 so as to produce the normal erase power "Pe" of the laser beam of the LD 2. See the state (3) indicated in FIG. 37 and the detection of erase-level optical power shown in FIG. 38.

In the present embodiment, the state (2) and the state (3) are repeated 8 times, and an average of the first erase power values "Pe+α" obtained through the repeated processed is calculated for the purpose of increasing the accuracy of the derivative efficiency calculation.

Usually, the peak power and the erase power of the laser diode are set to the optimal values when performing a laser power calibration on the phase-change recording disk, so as to retain good jitter characteristics when reproducing the data from the disk. If an erase power of the laser beam of the LD 2, different from the normal erase power Pe, is produced for a too long time, the jitter characteristics will deteriorate. In the present embodiment, immediately after the 10T space data is formed on the disk with the first erase power, the switch 838 is returned to the low-level (L) condition so as to produce the normal erase power. Hence, the deterioration of the jitter characteristics will be negligible.

Following the above repeated processes of the state (2) and the state (3), the CPU 1 sends another second ELC signal 504a to the second DAC 837, and the second DAC 837 outputs another second EIC to the switch 838. The high-level (H) condition of the switch 838 is selected according to the ELS signal 514, and the second EIC, supplied by the ECD 58, results in a second erase power "Pe−α" of the laser beam of the LD 2. See the state (5) indicated in FIG. 37 and the detection of erase-level optical power shown in FIG. 38.

In the above-described condition, when recording a 10T space data "10TS" onto the disk, the CPU 1 sets the ELS signal 514 in the low state (L), and the DAC 837 supplies the second EIC to the LDD 4 via the switch 838 as the erase-level increment current 506. Hence, only during the 10T period, the second erase power "Pe−α" of the laser beam of the LD 2 is produced.

In the above-described condition, a corresponding second erase power sample (EPS) signal 515, output by the A/D converter 733 of the BCD 57, is received at the CPU 1. The CPU 1 stores the received second EPS signal in the memory that is different from the EPS signal obtained during the APC process is stored.

Immediately after the 10T space data is recorded onto the disk, the CPU 1 sets the ELS signal 514 to the low level (L). The low-level (L) condition of the switch 838 is selected according to the ELS signal 514 so as to produce the normal erase power "Pe" of the laser beam of the LD 2. See the state (6) indicated in FIG. 37 and the detection of erase-level optical power shown in FIG. 38.

In the present embodiment, the state (5) and the state (6) are repeated 8 times, and an average of the second erase power values "Pe−α" obtained through the repeated processed is calculated for the purpose of increasing the accuracy of the derivative efficiency calculation.

The CPU 1 calculates a derivative efficiency "η" of the LD 2 based on the first and second erase-power sample (EPS) signals (Pe+α, Pe−α) and the corresponding erase-level drive currents (Ie", Ie'), in accordance with the following equation.

$$\eta = \{(Pe + \alpha) - (Pe - \alpha)\} / (Ie'' - Ie')$$
$$= 2\alpha / (Ie'' - Ie')$$

See the optical power vs. drive current characteristics shown in FIG. 39 for an example of the calculation of the derivative efficiency used by the present embodiment.

If the setting of the second DAC 837 for the second erase-power output can be performed timely, the first erase-power "Pe+α" laser driving and the second erase-power "Pe−α" laser driving may be performed within a period the 10T space data is output. Alternatively, an intermediate period of the 10T space data output at the normal erase power level may be interposed between the period of the first erase-power "Pe+α" laser driving and the period of the second erase-power "Pe−α" laser driving. In either case, in order to calculate an accurate derivative efficiency, the first and second erase-power laser driving must be performed within a comparatively short period.

The reason why the first erase-power "Pe+α" and the second erase-power "Pe−α" are sampled for the calculation of the derivative efficiency is to make use of a proper erase-level range of the laser driving permitted for erasing data from the phase-change recording medium.

Usually, the erase power of the laser diode with respect to the phase-change recording disk is set to the optimal value when performing a laser power calibration process on the disk. The optimal value of the erase power, which is set by the laser power calibration process, normally lies around at the middle point of the proper erase-level range of the disk.

In order to obtain an accurate derivative efficiency of the laser diode with a smaller calculation error, it is desirable to make the difference between the erase-power levels at the two sampling points as large as possible. In the above-described embodiment, the first erase-power "Pe+α" and the second erase-power "Pe−α", which fall within the proper erase-level range, are sampled and the derivative efficiency is calculated accordingly. The optical recording/reproducing apparatus of the present embodiment can provide accurate calculation of the derivative efficiency with little calculation errors and prevent the deterioration of the overwriting characteristics and the deficiency of the erasing.

Further, in the present embodiment, the CPU 1 calculates the bias power "Pb" and the peak power "Pw" based on the calculated derivative efficiency in a manner similar to the above APC process shown in FIG. 35. Accordingly, the optical recording/reproducing apparatus of the present embodiment is effective in maintaining the accurate recording power levels of the laser optical power, including the peak power Pw, the erase power Pe and the bias power Pb even when the light receiving module with the limited bandwidth is used. The optical recording/reproducing apparatus is effective in preventing the deficient formation of a mark on the disk when recording data onto the disk.

Further, the optical recording/reproducing apparatus of the present embodiment is configured so that the erase-level current driver (ECD) 58 selectively outputs one of the plurality of erase-level increment currents to the LDD 4 through the signal line 506 in response to the control signals supplied by the CPU 1. The respective power levels of the laser optical power when the individual erase-level increment currents are supplied to the LDD 4 are sampled and held by the sample/hold circuit, and the corresponding erase power sample (EPS) signals are received by the CPU 1. Then, the CPU 1 calculates a derivative efficiency of the LD 2 based on the erase power samples (EPS) at the plural sampling points. Therefore, the optical recording/reproducing apparatus of the present embodiment is effective in maintaining the accurate recording power levels of the laser optical power even when the light-receiving module with the limited bandwidth is used. The optical recording/reproducing apparatus is effective in preventing the deficient formation of a mark on the disk when recording data onto the disk.

Further, the optical recording/reproducing apparatus of the present embodiment is configured so that one of the plurality of erase-level increment currents, supplied from the ECD 58 to the LDD 4, is changed to another during a period a long space data having a data length longer than a predetermined time is formed on the medium, and the erase-level increment current is returned to the original erase-level increment current immediately after an end of the period. Therefore, the deterioration of the jitter characteristics will be negligible.

Further, the optical recording/reproducing apparatus of the present embodiment is configured so that the first erase-power "Pe+α" and the second erase-power "Pe−α", which are obtained by increasing or decreasing the normal erase power "Pe" by the value of α, are sampled for the calculation of the derivative efficiency. Therefore, it is possible to positively utilize the proper erase-level range of the laser driving permitted for erasing data from the recording medium.

Further, the optical recording/reproducing apparatus of the present embodiment is configured such that the first erase-power "Pe+α" and the second erase-power "Pe−α", which are obtained by increasing or decreasing the normal erase power "Pe" by the value of α, are included in the proper erase-level range for the recording medium. The optical recording/reproducing apparatus of the present embodiment is effective in preventing the deterioration of the overwriting characteristics and the deficiency of the erasing.

In the above-described embodiment, a single sample/hold circuit 727 and a single sample/hold circuit 728 are provided in the bias-level current driver 57. Alternatively, plural sample/hold circuits 727 and plural sample/hold circuits 728 may be provided in the bias-level current driver 57.

The present invention is not limited to the above-described embodiments and variations, and modifications may be made without departing from the scope of the present invention.

Further, the present invention is based on Japanese priority application No. 11-208723, filed on Jul. 23, 1999, Japanese priority application No. 11-227922, filed on Aug. 11, 1999, Japanese priority application No. 2000-139531, filed on May 12, 2000, and Japanese priority application No. 2000-222428, filed on Jul. 24, 2000, the entire contents of which are hereby incorporated by reference.

What is claimed is:

1. An optical recording/reproducing apparatus including a semiconductor laser for recording a sequence of data blocks onto an optical recording medium by using a laser driving current waveform to control emission of a laser beam by a semiconductor laser, and reproducing the data blocks from the medium, the waveform including a sequence of mark and space data portions each having a data length that corresponds to a multiple of a period of a channel clock based on a recording data modulation method, the optical recording/reproducing apparatus comprising:

a semiconductor laser driver supplying a selected one of a plurality of drive currents, including at least a bias-level drive current and a peak-level drive current, to the semiconductor laser to control the emission of a laser beam by the laser;

a bias-level current driver for selectively outputting one of a plurality of bias-level drive currents to the laser driver in response to control signals, the plurality of bias-level drive currents including a first drive current supplied to the laser driver during an automatic power control APC process and a second drive current supplied to the laser driver during an automatic current control ACC process;

a switching unit; and a control unit selectively executing one of the APC process and the ACC process on the current driver by supplying the control signals to the current driver, the control unit outputting a sampling signal to the current driver in response to a power-monitor signal of the laser beam emitted by the laser when recording data onto the recording medium, wherein, when the control unit outputs the sampling signal within a predetermined time, the control unit continuously executes the APC process on the current driver so that the current driver supplies the first drive current to the laser driver, and when the control unit does not output the sampling signal over a period exceeding the predetermined time, the control unit terminates the execution of the APC process and starts the execution of the ACC process by using the switching unit that operates in response to the control signals supplied to the current driver, so that the current driver supplies the second drive current to the laser driver.

2. The optical recording/reproducing apparatus according to claim 1, wherein the semiconductor laser driver is configured to supply a selected one of the plurality of drive currents, including the bias-level drive current, the peak-level drive current and an erase-level drive current, to the semiconductor laser so as to control the emission of a laser beam by the laser.

3. The optical recording/reproducing apparatus according to claim 1, wherein the control unit is configured such that, after the execution of the ACC process is started, the control unit immediately restarts the execution of the APC process.

4. The optical recording/reproducing apparatus according to claim 1, further comprising:

a peak-level current driver outputting a peak-level increment current to the laser driver in response to a peak-level control signal supplied by the control unit; and an erase-level current driver outputting an erase-level increment current to the laser driver in response to an erase-level control signal supplied by the control unit.

5. The optical recording/reproducing apparatus according to claim 1, wherein the current driver includes a monostable multivibrator that receives the sampling signal output by the control unit, and the multivibrator outputs a control signal to the switching unit.

6. The optical recording/reproducing apparatus according to claim 1, wherein the current driver includes a counter unit having a clock and a counter that receives the sampling signal output by the control unit, the clock outputting a clock signal at a predetermined frequency, and, when the number of the clock signals counted by the counter exceeds a predetermined value, the counter unit outputs a control signal to the switching unit.

7. The optical recording/reproducing apparatus according to claim 1, further comprising a detection unit detecting a first power sample signal at a first sampling point of the waveform from the laser beam emitted when the first increment current is supplied to the laser driver, and the detection unit detecting a second power sample signal at a second sampling point of the waveform from the laser beam emitted when the second increment current is supplied to the laser drive.

8. The optical recording/reproducing apparatus according to claim 7, further comprising a calculation unit calculating a derivative efficiency of the laser based on the first and second power sample signals detected by the detection unit, so that the drive currents of the laser driver, supplied to the laser, are controlled based on the calculated derivative efficiency.

9. The optical recording/reproducing apparatus according to claim 1, wherein the control unit outputs the sampling signal to the current driver when a data length of a space data to be recorded onto the recording medium exceeds a predetermined time.

10. The optical recording/reproducing apparatus according to claim 1, further comprising:

an erase-level current driver selectively outputting one of a plurality of erase-level increment currents to the laser driver in response to erase-level control signals, the plurality of erase-level increment currents including a first erase-level increment current supplied to the laser driver during the automatic power control process and a second erase-level increment current supplied to the laser driver during a special power setting process;

a detection unit detecting a first power sample at a first sampling point of the waveform from the laser beam emitted when the first increment current is supplied to the laser driver, and the detection unit detecting a second power sample at a second sampling point of the waveform from the laser beam emitted when the second increment current is supplied to the laser driver; and a calculation unit calculating a derivative efficiency of the laser based on the first and second power sample signals detected by the detection unit, so that the drive currents of the laser driver, supplied to the laser, are controlled based on the calculated derivative efficiency.

11. The optical recording/reproducing apparatus according to claim 10, wherein the erase-level current driver comprises:

a switch having a first state and a second state, one of which is selected at the switch in response to an erase-level select signal;

a first digital-to-analog converter, connected to the switch, which supplies the first erase-level increment current to the laser driver via the switch when the first state is selected; and a second digital-to-analog converter, connected to the switch, which supplies the second erase-level increment current to the laser driver via the switch when the second state is selected.

12. The optical recording/reproducing apparatus according to claim 10, wherein the erase-level current driver is configured so that the first erase-level increment current, supplied from the erase-level current driver to the laser driver, is changed to the second erase-level increment current during a period a space data having a data length larger than a predetermined time is formed on the medium.

13. The optical recording/reproducing apparatus according to claim 10, wherein the erase-level current driver is configured so that the first and second erase-level increment currents supplied to the laser driver result in first and second erase powers of the laser optical output that are obtained by increasing or decreasing a normal erase power of the laser optical output by a predetermined value.

14. The optical recording/reproducing apparatus according to claim 13, wherein the erase-level current driver is configured so that the first and second erase powers of the laser optical output, which are obtained by increasing or decreasing the normal erase power of the laser optical output by the predetermined value, are included in a proper erase-level rage for the medium.

15. The optical recording/reproducing apparatus according to claim 10, wherein the calculation unit is configured so that, when a difference between a normal erase power sample obtained by the first erase-level increment current and an upper limit of a proper erase-level range for the medium is less than a reference value, the calculation unit calculates a derivative efficiency of the laser based on the normal erase power sample and an erase power sample that is obtained by decreasing the normal erase power sample by a predetermined value, and when the difference between the normal erase power sample and a lower limit of the proper erase-level range is less than the reference value, the calculation unit calculates a derivative efficiency of the laser based on the normal erase power sample and an erase-power sample that is obtained by increasing the normal erase power sample by the predetermined value.

* * * * *